(12) United States Patent
Kikuchi et al.

(10) Patent No.: US 8,966,492 B2
(45) Date of Patent: Feb. 24, 2015

(54) SERVICE PROVISION QUALITY CONTROL DEVICE

(75) Inventors: Shinji Kikuchi, Minato-ku (JP);
Yoshihiro Kanna, Minato-ku (JP);
Yohsuke Isozaki, Minato-ku (JP)

(73) Assignee: NEC Corporation, Tokyo (JP)

( * ) Notice: Subject to any disclaimer, the term of this patent is extended or adjusted under 35 U.S.C. 154(b) by 1196 days.

(21) Appl. No.: 12/865,685

(22) PCT Filed: Jan. 30, 2009

(86) PCT No.: PCT/JP2009/051573
§ 371 (c)(1),
(2), (4) Date: Jul. 30, 2010

(87) PCT Pub. No.: WO2009/096519
PCT Pub. Date: Aug. 6, 2009

(65) Prior Publication Data
US 2011/0004885 A1    Jan. 6, 2011

(30) Foreign Application Priority Data

Jan. 31, 2008    (JP) ................................. 2008-021544

(51) Int. Cl.
*G06F 17/50* (2006.01)
*H04L 12/24* (2006.01)

(52) U.S. Cl.
CPC .......... *H04L 41/5096* (2013.01); *H04L 41/147* (2013.01); *H04L 41/5025* (2013.01)
USPC ............. 718/104; 705/7.31; 703/13; 370/328

(58) Field of Classification Search
CPC ............................. G06F 9/52; H04L 41/5096
USPC ............ 705/10, 1, 28, 7, 11; 703/2; 709/219, 709/224, 201; 713/300; 379/265.02; 370/252, 230, 328, 235
See application file for complete search history.

(56) References Cited

U.S. PATENT DOCUMENTS

| | | | | |
|---|---|---|---|---|
| 6,741,698 | B1* | 5/2004 | Jensen | 379/265.02 |
| 7,092,929 | B1* | 8/2006 | Dvorak et al. | 705/28 |
| 7,116,639 | B1* | 10/2006 | Gail et al. | 370/252 |
| 7,222,245 | B2* | 5/2007 | Singh | 713/300 |
| 7,324,966 | B2* | 1/2008 | Scheer | 705/28 |
| 7,430,498 | B2* | 9/2008 | Butterfield et al. | 703/2 |

(Continued)

FOREIGN PATENT DOCUMENTS

| | | |
|---|---|---|
| JP | 2001-290516 A | 10/2001 |
| JP | 2004-528775 T | 9/2004 |

(Continued)

*Primary Examiner* — Thomas Lee
*Assistant Examiner* — Aurel Prifti
(74) *Attorney, Agent, or Firm* — Sughrue Mion, PLLC

(57) ABSTRACT

A service provision quality control device according to the present invention includes a simulation processing unit which predicts a group of state predicting vector values on the basis of vector values of a current state and a past state of measurement statistic, a judging unit which judges whether a control operation is necessary or not on the basis of the state predicting vector value and a target state vector value whose control target is agreed service level, and an adjusting unit which adjusts evaluation condition of an execution environment repeatedly until control deviation becomes not larger than a predetermined value under the condition that iteration number is not larger than a predetermined value which is corresponding to an upper limit value.

8 Claims, 25 Drawing Sheets

(56) References Cited

U.S. PATENT DOCUMENTS

| | | |
|---|---|---|
| 2002/0145981 A1 | 10/2002 | Klinker et al. |
| 2003/0208523 A1* | 11/2003 | Gopalan et al. ............... 709/201 |
| 2004/0015367 A1* | 1/2004 | Nicastro et al. .................. 705/1 |
| 2004/0230475 A1* | 11/2004 | Dogan et al. ..................... 705/10 |
| 2005/0165925 A1* | 7/2005 | Dan et al. ...................... 709/224 |
| 2005/0188075 A1* | 8/2005 | Dias et al. ..................... 709/224 |
| 2005/0222885 A1* | 10/2005 | Chen et al. ........................ 705/8 |
| 2006/0013134 A1* | 1/2006 | Neuse ............................ 370/230 |
| 2006/0229935 A1* | 10/2006 | Subbloie et al. ................ 705/11 |
| 2007/0180061 A1* | 8/2007 | Bantz et al. ................... 709/219 |
| 2007/0288212 A1* | 12/2007 | Messmer et al. .................. 703/6 |
| 2008/0126148 A1* | 5/2008 | Buco et al. ........................ 705/7 |
| 2008/0298240 A1* | 12/2008 | Lee et al. ....................... 370/235 |
| 2010/0254312 A1* | 10/2010 | Kennedy ....................... 370/328 |
| 2013/0272121 A1* | 10/2013 | Stanwood et al. ............ 370/230 |

FOREIGN PATENT DOCUMENTS

| | | |
|---|---|---|
| JP | 2004-362449 A | 12/2004 |
| JP | 2005-184165 A | 7/2005 |
| JP | 2005-196601 A | 7/2005 |
| JP | 3750621 B2 | 12/2005 |
| JP | 2006-508427 A | 3/2006 |
| JP | 2007-148469 A | 6/2007 |
| WO | 2006/045337 A1 | 5/2006 |
| WO | WO 2006045337 A1 * | 5/2006 |

* cited by examiner

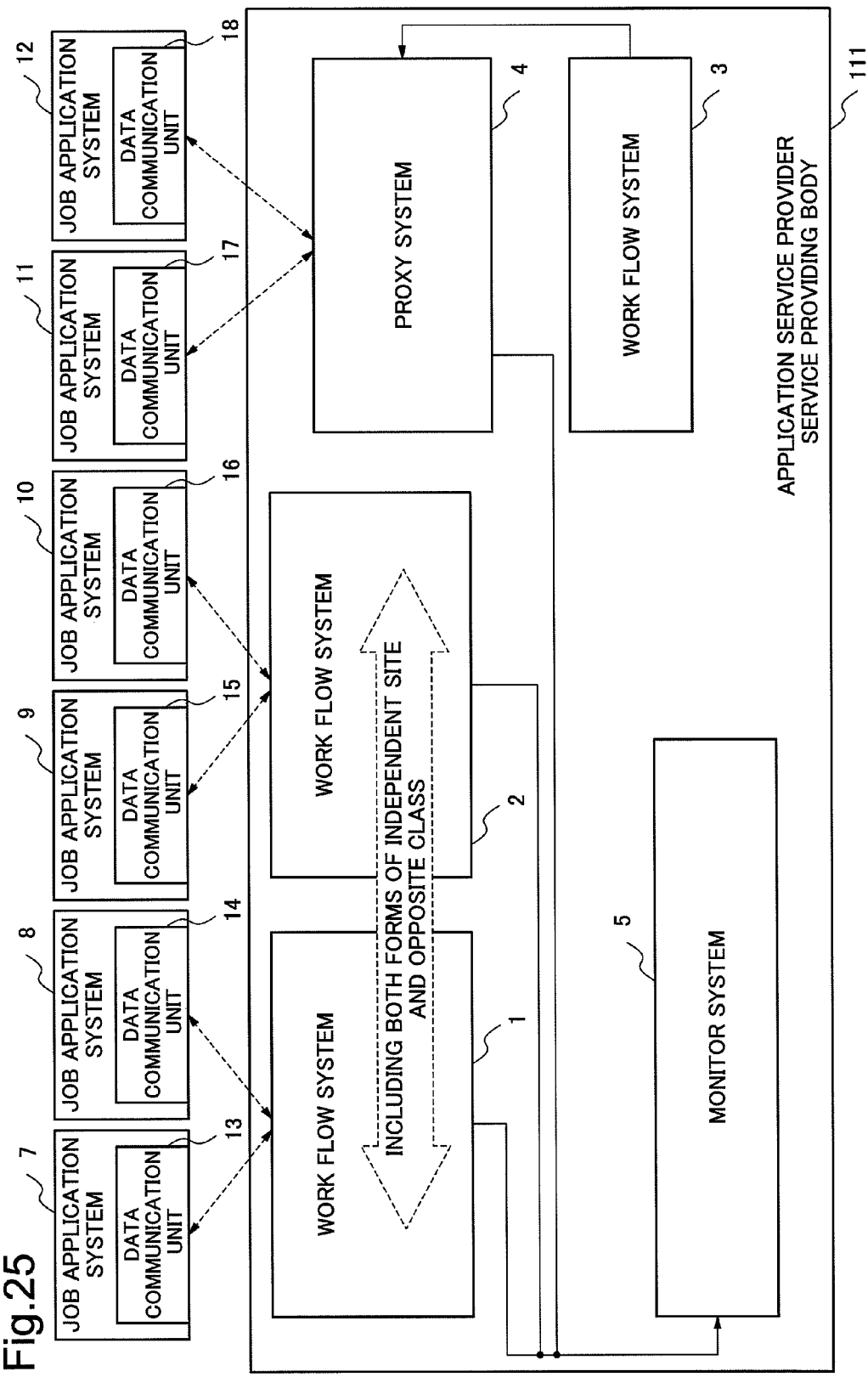

SERVICE PROVISION QUALITY CONTROL DEVICE

TECHNICAL FIELD

The invention relates to a feed forward control method, a service provision quality control device, system, program and recording medium therefore for maintaining service providing quality based on agreed service level which is agreed as a contract between a service receiving user who starts a business process and a service provider, who provides a business process and a group of services which are called from the business process, and the invention is used for maintaining the service when a group of plural job application systems are defined as a group of services with no regard to using the Internet or not, and arbitrarily associated by use of a work flow managing system and a business process managing system, and then, executed and operated as the business process.

BACKGROUND ART

It is necessary to stabilize a service and a business process with complicated structure in which the service and the business process are executed through binding and combining a plurality of communication relations, in addition to a mere communication traffic control which is generated based on a process request, in order to maintain service providing quality based on agreed service level which is agreed as a contract between a service receiving user who starts a business process, and a service provider who provides a business process and a group of services which are called by the business process, when a group of plural job application systems is defined as a group of services, and arbitrarily associated by use of a workflow managing system and a business process managing system, and then, executed and operated as the business process.

Therefore, it is necessary that three technologies of a traffic control technology, a simulation technology and a control method technology are merged.

Patent document 1 entitled "Prior resource assigning method using business process definition" discloses that through predicting future amount of usage of computer resources, computer resource is assigned appropriately in advance. That is, the patent document 1 discloses an invention related to a method for predicting the future amount of usage of computer resources.

The invention disclosed in the patent document 1 includes a method for predicting the amount of usage of computer resources by use of call relationship between the services extracted from business process definition. According to the method, in a step of predicting the amount of usage of computer resources, an amount of predicted usage of the computer resources is calculated before a new business process is distributed to a system, and a computer, which is different from a service executing computer whose amount of predicted usage of the compute resources is larger than a predetermined value, is assigned to the service executing computer as a new service executing computer.

According to the invention disclosed in the patent document 1, it is possible to predict the conventional amount of usage of computer resources appropriately when a business program is distributed, and to realize an operation that a computer, whose resources are insufficient on the basis of the predicted amount of usage of computer resources, is detected and then, and a computer resource is added to the computer which has the insufficient resource.

Patent document 2 entitled "Service providing device, service coordinating apparatus, service providing method, service coordinating method, program, and computer-readable storage medium which stores program" relates to a service providing apparatus, a service coordinating apparatus, a service providing method or a service coordinating method and particularly, relates to a service cooperation control.

The invention disclosed in the patent document 2 includes a storage apparatus for storing SLA (Service Level Agreement) information which indicates service providing condition of a plurality of services, a receiving unit for receiving a request information to request providing each service of cooperative services which are corresponding to combined services out of plural services as a group, a cooperative service managing unit for managing a current provision state of each service of the cooperative services and judging whether it is possible to provide each service of the cooperative services, which are requested by the received request information, on the basis of condition indicated by SLA information which is stored in the storage apparatus, and an executing unit for executing provision of each service of the cooperative services which are requested by the received request information received by the receiving unit. An object of the invention disclosed in the patent document 2 is to provide an apparatus which can execute provision of service with guaranty of a response requirement, in particular, out of user requirements through combining a plurality of services.

Patent document 3 entitled "Policy simulators for autonomous management systems" relates to a system for managing a group of computers autonomously and particularly, relates to a means for simulating an autonomous management policy.

According to the invention disclosed in the patent document 3, a simulator, which analyses behavior of the autonomous management system, is input a system configuration, a setting of load balancing, load condition of the system, performance information of software, transitional behavior of the software and the autonomous management policy of a verification object, and then, calculates behavior (amount of usage of resources, response time and throughput) in consideration of a transient phenomenon which is generated in the system at a certain time, and applies the autonomous management policy to the behavior and judges a system configuration and a setting of load balancing which are used at a next time, and executes simulation related to the next time on the basis of the changed system configuration and the setting of load balancing. An object of the invention disclosed in the patent document 3 is to verify validity of policy quickly and with low cost when making the policy.

Patent document 4 entitled "Traffic control apparatus and service system thereof" which relates to a method of data communication between a client apparatus and a server by use of the client apparatus, the server and a data communication relaying system in a distributed information system, and relates to a service of server access which uses the method of data communication.

According to the invention disclosed in the patent document 4, request of the client apparatus to the server is executed via a traffic control apparatus, and the traffic control apparatus, which includes a means for controlling the request from the client apparatus, a means for judging data receiving capability of the client apparatus and a means for controlling simultaneous connections to the server, controls number of simultaneous connections of the server so as to use resource of the server sufficiently and not to transfer many requests in excess of performance of the server. That is, in the case that it is predicted that it takes a time, which is longer than a predetermined time, to provide a requested service, the request from the client apparatus is rejected, and in the case that it is predicted that it takes a time, which is shorter than the predetermined time, to provide the requested service, the request is accepted. As a result, the invention disclosed in the patent document 4 keeps throughput of the server and prevents the server from being downed under a situation of various network properties of the client apparatus. Furthermore, the invention disclosed in the patent document 4 enables providing a service so that the client apparatus is not in a waiting state for an uncertainly long time when accesses are concentrated to the server.

Patent document 5 entitled "Traffic control method and system thereof" relates to maintenance of service quality of a network. According to the invention, whose object is to maintain quality of service between apparatuses on the network, a traffic control apparatus is arranged between at least one client and at least one group of servers which provide service to the client via the network. Moreover, line usage rate of each of plural lines, which exist between the client and the group of servers, and data communication capability of the line are monitored. In the case that the data communication capability declines, the traffic control apparatus specifies a line, which suffers from a bottleneck, out of plural lines on the basis of monitor information on the line usage rate, and executes a traffic control to the line which is in the bottleneck.

Patent document 6 entitled "Monitoring and control system, simulation method of control apparatus and storage medium" relates to a monitoring and control system and a simulation method of a control apparatus which have a function to transfer data and to execute management and cooperation of an operation executing state of each apparatus in the monitoring and control system.

An object of the invention disclosed in the patent document 6 is to reflect a simulation test result and a control design result easily and stably in order to improve quality, reliability and control performance of the monitoring and control system. Moreover, the invention provides the monitoring and control system in which a control apparatus for executing monitoring and control through inputting an amount of control from a control object such as a plant, a control designing unit for designing a control parameter and control software, a maintenance tool for inputting the designed control parameter and the designed control software to the control apparatus, a control apparatus model for executing control through emulating the designed control parameter and the designed control software, a control object model for executing the emulation result on dynamic characteristics of the control object, indicating unit for storing and indicating operating data of the control object and data of executing result of the control object model, and managing unit for combining, coordinating, and executing a part of or a whole of the control design unit, the control apparatus model, the control object model and the data indicating unit on the basis of necessity, are connected each other via network.

[Patent document 1] Japanese Patent Application Laid-Open No. 2007-148469

[Patent document 2] Japanese Patent Application Laid-Open No. 2004-362449

[Patent document 3] Japanese Patent Application Laid-Open N 2005-196601

[Patent document 4] Japanese Patent Application Laid-Open No. 2005-184165

[Patent document 5] Japanese Patent Publication No. 3750621

[Patent document 6] Japanese Patent Application Laid-Open No. 2001-290516

DESCRIPTION OF THE INVENTION

Problem to be Solved by the Invention

The above-mentioned patent documents 1 to 6 are roughly classified into three categories, that is, the first category relating to a traffic control technology, the second category relating to a simulation technology and the third category relating to a control method. However, each of categories is suffered from a problem.

The first problem is "lack of an evaluation function of a proper control plan", that is, it is impossible to realize a desired control since a different control object is assumed.

The second problem is "lack of a control-oriented evaluation function and a control-oriented execution function", that is, it is impossible to realize a desired control since a part of functions is lacked.

The third problem is "lack of a correcting function and a verifying function of a control plan", that is, it is impossible to guarantee execution of a desired control since it is impossible to prove validity of a complicated control plan.

According to the invention disclosed in the patent document 1, after service calling relationship is grasped, a current usage state of computer resources is grasped, and then, a future demand of computer resources is calculated. In the case that a situation, in which computer resource is lacked, is predicted, an operation for adding computer resources is executed. However, an amount of handled measurement is limited to the predicted amount of usage of computer resources and is not SLA which a computer user and a service provider should agree, according to the invention disclosed in the patent document 1.

For this reason, the invention disclosed in the patent document 1 is limited in that simulation or the like has a simple structure, and an action, which is defined in advance, is set to execution condition used at a time when an event occurs, and the action is executed through only judgment whether a value, which the event indicates at a certain point of time, satisfies the execution condition.

However, in the case that SLA is assumed, quality of service is defined on the basis of various components, and consequently, only computer resource is not the control object.

For this reason, it is necessary not only to judge whether the value, which the event indicates, satisfies the execution condition at a certain timing but also to predict and to verify the execution result through simulating the execution result. However, the patent document 1 does not define such a component. This is corresponding to "lack of a correcting function and a verifying function of a control plan".

The invention disclosed in the patent document 2 is a method to exchange number of processes, which is defined in SLA, between a service coordinator and a service provider, and process is executed within the scheme.

However, according to the invention disclosed in the patent document 2, SLA to be realized is limited to the number of processes per unit time, and other general SLA such as average response time, request rejecting rate, MTBF (Mean Time Between Failures) or the like is not taken into consideration.

Moreover, complex structure related to quality of service and call relationship which the patent document 1 takes into consideration, and a scheme of simulation or the like for measuring time fluctuation of the average response time and the request rejecting rate, and for predicting a state of the control object are not defined as a component.

In the case of a complicated object, a scheme such as a simulation or the like is required. However, according to the invention disclosed in the patent document 2, it is impossible to realize a series of processes, that is, from a process for measuring a situation to a process for predicting a state of the control object, and moreover, it is impossible to realize an appropriate control on the basis of state of service quality at a certain arbitrary point of time. This is corresponding to "lack of an evaluation function of a proper control plan".

The invention disclosed in the patent document 3 relates to a simulator for grasping a state of a system, and particularly, it is possible to handle a time-variant state and a transient phenomenon.

However, information, which is handled in the invention, is mainly related to server and storage, and not to SLA which a computer user and a service provider should agree. Moreover, an object of the invention is to verify the applied policy rather than to control service providing quality.

For this reason, there is no specific definition on the policy and a function related to control of service providing quality is not included in the invention. For this reason, specific processes, which include a process from measuring a situation to a process for predicting a state of the control object obtained as the simulation result, a process of control and execution are not clarified, and a plan to cope with maintaining SLA is indefinite. This is corresponding to "lack of a control-oriented evaluation function and a control-oriented execution function"

According to the invention disclosed in the patent document 4, all communication messages, which occur, are captured by use of a client apparatus, a server and a data communication relaying system, and discard of a communication message, waiting, and control of number of simultaneous connections are executed on the basis of the measurement result.

According to the invention disclosed in the patent document 4, it is possible to determine control contents through comparing a result of multiplying average response time of a process request, which designates a destination address, by number of process requests stored in an inside queue with maximum waiting time as one of the evaluation.

However, it is difficult for the method, which uses a simple evaluating method and simple control contents, to cope with a complex structure related to the service quality and the call relation.

In the case of a complicated object, simulation is required. However, the invention disclosed in the patent document 4 can realize only traffic control for a group of process requests which is formed by gathering process requests merely, and therefore, it is difficult to control a service, which has a complex structure since the service is executed through combining the process requests complexly, on the basis of a state of quality at an arbitrary point of time. Since the control object is limited dependently on the purpose, the problem of the patent document 4 is also corresponding to "lack of an evaluation function of a proper control plan".

According to the invention disclosed in the patent document 5 similar to the patent document 4, a traffic control apparatus, which executes relaying, is arranged to capture a communication message which occurs, and to secure bandwidth through monitoring line usage rate of each of plural lines and data communication capability of the line. That is, the traffic control apparatus executes control for maintaining service quality between apparatuses on the network.

However, it is difficult to cope with a complex structure related to the service quality and the call relation by use of a simple evaluating method and simple control contents for the invention disclosed in the patent document 5.

In the case of a complicated object, simulation is required. However, the invention disclosed in the patent document 5 can realize only traffic control for data communication circuits, and therefore, it is difficult to control a service, which has a complex structure since the service is executed through combining those complexly, on the basis of a state of quality at an arbitrary point of time. Since a control object is limited dependently on the purpose, the problem of the patent document 5 is also corresponding to "lack of an evaluation function of a proper control plan".

Since the invention disclosed in the patent document 6 targets a control in a plant mainly, the invention has a different aim from one of control of service quality in the information and telecommunication field. Accordingly, while a simulation test can be executed appropriately on the basis of necessity, it is not assumed that the simulation is executed with an aim of control.

For example, the simulation test is accompanied usually with a certain amount of calculation cost, but there is no function to define restriction on the cost in the invention disclosed in the patent document 6. Moreover, there is no function to give a policy on a problem of which plan should be executed with priority when executing control in the invention disclosed in the patent document 6.

For this reason, specific processes, which include a process from measuring a situation to a process for predicting a state of a control object, and a control executing process, are not clarified, and consequently, a plan to cope with maintaining SLA is indefinite according to the invention disclosed in the patent document 6. This is corresponding to "lack of a control-oriented evaluation function and a control-oriented execution function"

Thus, in the case that a service based on the agreed service level is provided, technology which solves the problems of "lack of an evaluation function of a proper control plan", "lack of a control-oriented evaluation function and a control-oriented execution function" and "lack of a correcting function and a verifying function of a control plan" is not provided.

The invention is conceived in consideration of the above mentioned problems and an object of the invention is to provide a feed forward type control method, a service provision quality control device, a system, a program and a storage medium thereof in which a control function for maintaining service providing quality based on agreed service level which is agreed as a contract between a service receiving user who starts a business process, and a service provider who provides a business process and a group of services which are called by the business process, is realized through solving the problems of "lack of an evaluation function of a proper control plan", "lack of a control-oriented evaluation function and a control-oriented execution function" and "lack of a correcting function and a verifying function of a control plan", when a plurality of groups of job application systems are defined as a group of services with no regard to using the Internet or not, and arbitrarily associated by use of a work flow managing system and a business process managing system, and then, executed and operated as the business process.

Means for Solving the Problem

In order to achieve the above-mentioned object, the present invention provides, as a first exemplary embodiment, a service provision quality control device, whose object is to maintain service providing quality related to description of a whole work flow, or to maintain agreed service level which is contracted per plural users, on the basis of a function to integrate and monitor execution of a distributed component work flow of the whole work flow which maintains and manages and controls activation states of a group of plural job application systems, and definition of operation order, under an environment that a plurality of work flow managing systems, each of which is equipped with a work flow engine, manage and execute each of the component work flows independently and distributedly, is characterized by including a service provision quality control device which includes:

means for storing agreed service level information which is defined as a target state vector value of a control target per description of the whole work flow and which indicates service providing condition of the whole work flow;

measurement statistic data calculating means for calculating measurement statistic which can be measured and calculated with only statistical process and which is related to a component work flow or a service called by the component work flow;

state observing means for sampling the measurement statistic in a predetermined sampling period and calculating a current state vector value, which is measurement statistic at the latest sampling time, and a past state vector value which is measurement statistic at a sampling time previous to the latest sampling time by a predetermined period;

simulation processing means for predicting a group of state predicting vector values, each of which is composed of a component state vector and has the same meaning as the target state vector value has, on the basis of the current state vector value and the past state vector value of the measurement statistic through compensating the group of state predicting vector values by extrapolation at a future sampling time;

policy description managing means for managing policy description on a control operation;

judging means for calculating control deviation after comparing sequentially the state predicting vector value which is predicted by the simulation processing means, and the target state vector value whose control target is the agreed service level, and for judging whether a control operation is necessary or not;

adjusting means for changing virtually an execution environment, which is described in the whole work flow, within own apparatus in the case that the control operation is required, and re-executing the simulation processing means and the judging means afterward, on the basis of the policy description managed by the said policy description managing means and adjusting evaluation condition of the execution environment repeatedly until the control deviation becomes not larger than a predetermined value under the condition that iteration number is not larger than a predetermined number which is corresponding to an upper limit number; and means for fixing change of the execution environment in the case that it is not judged that the control operation is necessary any longer on the basis of a result on adjustment of evaluation condition by the adjusting means.

In order to achieve the above-mentioned object, the present invention provides, as a second exemplary embodiment, a service provision quality control system characterized by comprising:

a plurality of work flow processing apparatuses each of which
includes a storing means for storing description of a component work flow and a work flow engine to execute the component work flow; and the service provision quality control apparatus based on agreed service level according to the first exemplary embodiment of the present invention.

In order to achieve the above-mentioned object, the present invention provides, as a third exemplary embodiment, a feed forward type control method which is characterized by comprising:

a process for defining measurement statistic data which can be measured and calculated with only statistical process out of a control object defined clearly and a physical phenomenon related to the control object, and for defining a target state vector value which is a control target of the control object and can not be measured directly;

a process for sampling the measurement statistic data in a predetermined sampling period and calculating a current state vector value which is measurement statistic at the latest sampling time, and a past state vector value which is measurement statistic at a sampling time previous to the latest sampling time by a predetermined sampling period;

a process for simulating and predicting a group of state predicting vector values, each of which is composed of a component state vector and has the same meaning as the target state vector value has, on the basis of the current state vector value and the past state vector value after compensation by extrapolation at a future sampling time;

a process for calculating control deviation after comparing sequentially the state predicting vector value which is predicted in the simulation, and the target state vector value each other, and for judging whether a control operation is necessary or not;

a process for determining tentatively an amount of control operation so that the control deviation may become satisfactory;

a process for executing new simulation, which has the same meaning as the simulation has, after adding the amount of control operation determined tentatively, and calculating a state predicting vector value which is composed of a component state vector and which has the same meaning as the target state vector value has, and afterward calculating new control deviation through comparing the state predicting vector value with the target state vector value, and adding an amount of control operation determined tentatively and making condition strict repeatedly until an amount of control operation is fixed under the condition that iteration number is not larger than a predetermined number which is corresponding to an upper limit number, in the case that an additional amount of control operation is necessary; and a process for executing a control operation in the case that it is not necessary to add the amount of control operation.

In order to achieve the above-mentioned object, the present invention provides, as a fourth exemplary embodiment, a service provision quality control method which includes:

a process for defining agreed service level information, which has measurement statistic data which is related to a service and which can be measured and calculated with only statistical process, and which indicates service providing condition, as a target state vector value of a control target;

a process for calculating a current state vector value, which is measurement statistic at the latest sampling time, and a past state vector value which is measurement statistic at a sampling time previous to the latest sampling time by a predetermined period, on the basis of the measurement statistic data on the service;

a process for simulating and predicting a group of state predicting vector values, each of which is composed of a component state vector and has the same meaning as the target state vector value has, on the basis of the current state vector value and the past state vector value which are measurement statistic after compensation by extrapolation at a future sampling time;

a process for calculating control deviation after comparing sequentially the state predicting vector value which is predicted, and the target state vector value each other, and for judging whether a control operation is necessary or not;

a process for determining tentatively number of service execution processing systems, increase or decrease of assignment of hardware resources, and increase or decrease of an amount of restrained input messages, as a control operation to make the control deviation satisfactory, in the case that the control operation is required;

a process for executing prediction again by new simulation, which is equivalent to the simulation, through adding virtually an operation, which is determined tentatively, to set number of service execution processing systems, and to increase or decrease assignment of hardware resources and to increase or decrease an amount of restrained input messages, and comparing the prediction result with the agreed service level, which indicates the service providing condition, to judge whether the prediction result satisfies the agreed service level, and executing virtually a new operation to set number of service execution processing systems, and to increase or decrease assignment of hardware resources, and to increase or decrease an amount of restrained input messages repeatedly until the agreed service level is satisfied under the condition that iteration number is smaller than a predetermined value which is corresponding to an upper limit value, in the case that an operation, which is to set number of service execution processing systems and to increase or decrease assignment of hardware resources and to increase or decrease an amount of restrained input messages, is necessary; and a process for executing actually a control operation to set number of service execution processing systems and to increase or decrease assignment of hardware resources and to increase or decrease an amount of restrained input messages, in the case that said agreed service level is satisfied.

In order to achieve the above-mentioned object, the present invention provides, as a fifth exemplary embodiment, a service provision quality control program based on agreed service level, characterized by making a computer work as:

means for associating a group of events, which occur when a component work flow is executed, with a whole work flow clearly, and storing the group of events in an event storing means in association with a group of events except the group of events, under an environment that a plurality of work flow managing systems, each of which is equipped with a work flow engine, manage and execute independently and distributedly the component work flow of the whole work flow which maintains and manages and controls activation states of a group of plural job application systems and operation order;

means for defining agreed service level, which indicates service providing condition, as a target state vector value of a control target per description of the whole work flow on the basis of a function to integrate and monitor execution of the distributed component work flow;

calculating means for calculating measurement statistic data which can be measured and calculated with only statistical process and which is related to a component work flow and a service which is called by the component work flow.

means, which is related to observing a state, for sampling data, which is calculated by the measurement statistic data calculating means, in a predetermined sampling period, and for calculating a current state vector value, which is measurement statistic at the latest sampling time, and a past state vector value which is measurement statistic at a sampling time previous to the latest sampling time by a predetermined period;

simulation processing means for predicting a group of state predicting vector values, each of which is composed of a component state vector and which has the same meaning as the target state vector value has, on the basis of the current state vector value and the past state vector value of the measurement statistic through compensating the group of state predicting vector values by extrapolation at a future sampling time;

means for managing policy description on a control operation;

means for calculating control deviation after comparing sequentially the state predicting vector value, which is predicted by the simulation processing means, and the target state vector value, whose control target is the agreed service level, and for judging whether a control operation is necessary or not;

means for increasing or decreasing tentatively number of work flow engines which execute a specific component work flow in a plurality of work flow systems, on the basis of the policy description, and re-executing the simulation and the judgment whether the control operation is necessary or not after increasing or decreasing virtually number of the work flow engines which is determined tentatively, and adjusting a new evaluation condition, which is to increase or decrease number of the work flow engines, repeatedly until the control deviation becomes satisfactory under the condition that iteration number is not larger than a predetermined number which is corresponding to an upper limit number, in the case that it is judged that it is necessary to increase or decrease number of the work flow engines newly;

means related to an adjustment operation to change a process into a process for increasing or decreasing number of the work flow engines actually in the case that it is judged that the control operation is necessary no longer on the basis of a result on adjustment of the evaluation condition by the adjusting means.

In order to achieve the above-mentioned object, the present invention provides, as a sixth exemplary embodiment, a storage medium which stores the service provision quality control program of the fifth exemplary embodiment of the present invention.

The Effect of the Invention

The present invention can provide a feedforward control method, a service provision quality control device, a system, a program and a storage medium thereof, which maintain service providing quality based on agreed service level which is agreed as a contract between a service receiving user who starts a business process, and a service provider who provides a business process and a group of services which are called by the business process, when a group of a plurality of job application systems are defined as a group of services and associated each other by use of a work flow managing system and a business process managing system, and then, executed and operated as the business process.

BEST MODE FOR CARRYING OUT THE INVENTION

As shown in FIG. 1, an service provision quality control device 500, aims to maintain and manage activation states of a group of plural job application systems and definition of operation, to collect and manage description of a distributed component work flow under an environment that a plurality of work flow managing systems which is equipped with a work flow engine manages and executes independently and distributedly, each of the component work flow of the work flow which is controlled, to synthesis description of the distributed component work flow which are collected, to regenerate description of a whole work flow, and to maintain agreed service level contracted per service provision quality related to description of the whole work flow or plural users with a function to integrate and monitor execution of the distributed component work flow.

The service provision quality control device 500 includes:

an agreed service level information storing unit 501 for storing agreed service level information which is defined as a target state vector value of a control target per description of the whole work flow and which indicates service providing condition of the whole work flow;

a measured statistic data calculating unit 502 for calculating measurement statistic, which can be measured and calculated with only statistical process and which is related to the component work flow or a service called by the component work flow;

a state observing unit 503 for sampling the measurement statistic in a predetermined sampling period and calculating a current state vector value which is measurement statistic at the latest sampling time, and a past state vector value which is measurement statistic at a sampling time previous to the latest sampling time by a predetermined sampling period;

a simulation processing unit 504 for predicting a group of state predicting vector values, each of which is composed of a component state vector and has the same meaning as the target state vector value, on the basis of the current state vector value and the past state vector value through compensating the group of state predicting vector values by extrapolation at a future sampling time:

a policy description managing unit 505 for managing policy description on a control operation;

a judging unit 506 for calculating control deviation after comparing sequentially the state predicting vector value which is predicted by the simulation processing unit 504, and the target state vector value whose control target is the agreed service level, and for judging whether the control operation is necessary or not;

an adjusting unit 507 for changing virtually the execution environment, which is described in the whole work flow, within own apparatus in the case that the control operation is required, and re-executing the simulation processing unit 504 and the judging unit 505 afterward on the basis of the policy description managed by the policy description managing unit 505, and adjusting an evaluation condition of the execution environment repeatedly until the control deviation becomes not larger than a predetermined value under the condition that iteration number is smaller than a predetermined number which is corresponding to an upper limit number; and a fixing unit 508 for fixing the change of execution environment in the case that it is judged that the control operation is necessary no longer on the basis of the result on adjustment of the evaluation condition by the judging unit 506.

As shown in FIG. 2, the service provision quality control device 500 is connected to a plurality of work flow processing apparatuses 600, each of which includes a wf definition 602 which stores description on the component work flow, and a work flow engine 601 which executes the component work flow. A service provision quality control system includes the service provision quality control device 500 and a plurality of work flow processing apparatuses 600.

According to the configuration mentioned above to the service provision quality control device 500, solves the problems of "lack of an evaluation function of a proper control plan", "lack of a control-oriented evaluation function and a control-oriented function", and "lack of a correcting function and a verifying function of a control plan" and maintains service providing quality based on agreed service level which is agreed as a contract between a service receiving user who starts a business process, and a service provider who provides a business process and a group of services which are called by the business process, when a group of plural job application systems is defined as a group of services and arbitrarily associated by use of a work flow managing system and a business process managing system, and then, executed and operated as the business process.

Hereinafter, a preferred exemplary embodiment of the present invention will be described.

[A First Exemplary Embodiment of the Present Invention]

A first exemplary embodiment, in which the present invention is implemented preferably, will be described in the following.

FIG. 3 shows an example of an environment to which a service provision quality control device is applied, according to the exemplary embodiment of the present invention. The service provision quality control device of the exemplary embodiment of the present invention is applied to a general network environment in which a large network has a configuration that routers or the like combine a plurality of sub-networks including the Internet under a group of management policies and security policies which the sub-network has.

A sub-network 101 is connected to a sub-network 102 and a sub-network 103 via a router 106. Moreover, the sub-network 102 is connected to a sub-network 105 via a router 108. Furthermore, the sub-network 105 is connected to a sub-network 104 via a router 107.

It may be preferable that the sub-networks 101 to 105 compose the Internet or may be a local network which an enterprise and a group manage.

The routers 106 to 108 are based on an original policy, and in the case that the routers 106 to 108 connect the Internet to a local network, it may be preferable that each of routers 106 to 108 is equipped with a firewall function.

Job application systems 7 to 12 are connected to anyone of sub-networks 101 to 105. Similarly, work flow systems 1 to 3 which execute a work flow process through connecting the job application systems 7 to 12 each other, and a Proxy system 4 which executes various controls in a configuration on the network, are connected to any one of the sub-networks 101 to 105. Moreover, a monitor system 5, which provides a main function of the service provision quality control device on the basis of the agreed service level, is also connected to any one of the sub-networks 101 to 105.

It is assumed in FIG. 3 that the sub-network 101, to which the job application systems 7 and 8 and the work flow system 1 are connected, is arranged in one organization or one department.

Moreover, it is assumed in FIG. 3 that the sub-network 103, to which the job application systems 9 and 10 and the work flow system 2 are connected, is arranged in one organization or one department.

Furthermore, it is assumed in FIG. 3 that the sub-network 104 to which the job application systems 11 and 12 and the Proxy system 4 are connected, and the sub-network 105 to which the work flow system 3 is connected, are arranged in one department respectively.

Moreover, it is assumed in FIG. 3 that the sub-network 102 is a network outside the organization such as the Internet or the like. Then, the monitor system 5, which provides a common function, is connected to the sub-network 102.

FIG. 4 shows a configuration of the service provision quality control device according to the exemplary embodiment of the present invention.

The service provision quality control device includes a plurality of work flow systems 1 and 2 based on the distributed work flow managing method, the work flow system 3 which is arranged with original mounting, the Proxy system 4 which executes mediation of the work flow system 3 to the distributed work flow managing method, a managing console 81 which sorts out and integrates and stores various event information after collecting the various event information from the work flow systems 1 and 2 and Proxy system 4, and a related repository 6. Further, the service provision quality control device may make a plurality of work flow systems 3 with the original mounting to be arranged and the Proxy system 4 to execute mediation of them all together.

As shown in FIG. 4, the work flow system 1 communicates with a plurality of job application systems 7 and 8. The work flow system 2 communicates with a plurality of job application systems 9 and 10. Moreover, the work flow system 3 communicates with a plurality of job application systems 11 and 12 via the Proxy system 4.

The job application systems 7 to 12 have data communication units 13 to 18 respectively.

As shown in FIG. 5, the work flow system 1 includes an adaptor 19 to communicate with the data communication unit 13, and also includes another adaptor 20 to communicate with the data communication unit 14. These adaptors handle absorption of difference between protocols and an operation executed at a time, when communication with the job application systems 7 and 8, which becomes necessary as a result of controlling an operation sequence by the work flow engines 29 and 29' included in the work flow system 1, is executed.

Further, in the case that the work flow engines 29 and 29' communicate via adaptors 19 and 20, the work flow system 1 makes the work flow engines 29 and 29' to communicate via an operation proxy 48. This works as one of control apparatus units, when control is executed. Further, the work flow system 1 may mount functions of the adaptors 19 and 20 are mounted in the operation proxy 48.

Similarly, as shown in FIG. 6, the work flow system 2 includes an adaptor 21 to communicate with the data communication unit 15, and also includes another adaptor 22 to communicate with the data communication unit 16. These adaptors handle absorption of difference between protocols and an operation executed at a tome when communication with the job application systems 9 and 10, which becomes necessary as a result of controlling an operation sequence by a work flow engine 32 included in the work flow system 2, is executed.

Further, in the case that the work flow engine 32 communicates via the adaptors 21 and 22, the work flow system 2 makes the workflow engine 32 to communicate via an operation proxy 49. This works as one of control apparatus units, when control is executed. Further, the work flow system 2 may mount functions of the adaptors 21 and 22 are mounted in the operation proxy 49.

Similarly, as shown in FIG. 7, the work flow system 3 includes an adaptor 23 to communicate with the data communication unit 17, and also includes another adaptor 24 to communicate with the data communication unit 18. These adaptors handle absorption of difference between protocols and an operation executed at a time when communication with the job application systems 11 and 12, which becomes necessary as a result of controlling an operation sequence by a work flow engine 37 included in the work flow system 3, is executed.

Further, since the work flow system 3 includes an existing work flow engine with original mounting, communication between the data communication unit 17 and the adaptor 23, and communication between the data communication unit 18 and the adaptor 24 are executed via a proxy unit 35 in the Proxy system 4.

It may be preferable that the work flow systems 1 to 3 are configured to be mounted on one computer and it may be also preferable that the work flow systems 1 to 3 are configured to be distributed to a plurality of computers.

Behavior of the work flow engines 29 and 29' is defined in a workflow definition 31 included in the work flow system 1. It may be preferable that the work flow engines 29 and 29' are other program executing units mounted with a virtualization technique or a grid. It may be also preferable that the work flow engines 29 and 29' are plurally activated in one executing unit image such as a thread and a program process. Moreover, it may be preferable that the work flow engines 29 and 29' executes the same work flow definition and it may be also preferable that the work flow engines 29 and 29' share and execute a part of a certain work flow definition each other. The form of work flow engines 29 and 29' is decided on the basis of the work flow system 1. Further, activation and suspension of the work flow engines 29 and 29' are controlled by an environment of the work flow system 1.

The work flow definition 31 defines a next state of the work flow engines 29 and 29', and kinds of a process requesting message and a process response message, which the work flow engines 29 and 29' should issue, in the case that an event related to the process request message and the process response message issued from other work flow system 2 which is arranged distributedly and the work flow system 3 which communicates via the Proxy system 4 occurs, and in the case that an event related to the process request message and the process response message which are issued as a result of communications with a plurality of the job application systems 7 and 8 occurs.

Usually, the work flow definition 31 describes only behavior which the workflow engines 29 and 29' execute, and is described in a process description, a service description or the like including WS-BPEL (Web Service Business Process Execution Language) and WDSL (Web Service Definition Language) which are in the standardized form.

Behavior of the work flow engine 32 is defined in a work flow definition 34 included in the work flow system 2. Here, the work flow definition 34 defines a next state of the work flow engine 32, and kinds of a process requesting message and a process response message, which the work flow engine 32 should issue, in the case that an event related to the process request message and the process response message issued from other work flow system 1 which is arranged distributedly, and the work flow system 3 which communicates via the Proxy system 4 occurs, and in the case that an event related to the process request message and the process response message which are issued as a result of communications with a plurality of the job application systems 9 and 10 occurs.

Usually, the work flow definition 34 describes only behavior of the work flow engine 32, and is described in a description including a process description, a service description or the like such as WS-BPEL) and WDSL which are in the standardized form.

Behavior of the work flow engine 37 is defined in a work flow definition 39 included in the work flow system 3. Here, the work flow definition 39 defines a next state of the work flow engine 37, and kinds of a process requesting message and a process response message, which the work flow engine 37 should issue, in the case that an event related to the process request message and the process response message issued from other work flow systems 1 and 2 and transferred via the Proxy system 4 occurs, and in the case that an event related to the process request message and the process response message which are issued by the job application systems 11 and 12 and transferred via the Proxy system 4 occurs.

Further, since the work flow system 3 includes an existing work flow engine with original mounting, the work flow definition 39 may not be described in WS-BPEL and WSDL which are in the standardized form. In this case, a workflow definition and service definition acquiring unit 59 mentioned later converts the work flow definition 39 into the standardized form such as WS-BPEL, WSDL or the like.

The event related to the process requesting message and the process response message issued by the work flow system 1 is detected by a plurality of event extracting units which plurally exist in the work flow system 1. All communications between the data communication unit 13 and the adaptor 19 are detected by a Msg event extracting unit 25 mounted in the adaptor 19. Similarly, all communications between the data communication unit 14 and the adaptor 20 are detected by a Msg event extracting unit 26 mounted in the adaptor 20. Behavior of the work flow engines 29 and 29' is detected by an Eng event extracting unit 30.

Event information extracted by the Msg event extracting units 25 and 26 and the Eng event extracting unit 30 is held temporarily in an event data holding unit 40 of the work flow system 1 and transferred properly to the monitor system 5 by a common data sending unit 41.

The event related to the process requesting message and the process response message issued by the work flow system 2 is detected by a plurality of event extracting units which exist in the work flow system 2. All communications between the data communication unit 15 and the adaptor 21 are detected by a Msg event extracting unit 27 mounted in the adaptor 21. Similarly, all communications between the data communication unit 16 and the adaptor 22 are detected by a Msg event extracting unit 28 mounted in the adaptor 21. Behavior of the workflow engine 32 is detected by an Eng event extraction unit 33.

Event information extracted by the Msg event extracting units 27 and 28 and the Eng event extracting unit 33 is held temporarily in an event data holding unit 42 of the work flow system 2 and transferred properly to the monitor system 5 by a common data sending unit 43.

Since the work flow system 3 includes an existing work flow engine with original mounting, collecting a group of events related to the process request message and the process response message, which are issued by the work flow system 3, is processed by use of a different processing method from one for the events on the process request message and the process response message issued by the work flow systems 1 and 2. Since communication between the data communication unit 17 and the adaptor 23 is executed via the proxy unit 35, the event related to the process request message and the process response message, which occurs, is detected by a Prx event extracting unit 36 which is connected to the proxy unit 35 of the Proxy system 4. The event related to the process request message and process response message which is issued in communication between the data communication unit 18 and the adaptor 24 is also detected by the Prx event extracting unit 36.

Event information extracted by the event detecting unit 36 is held temporarily in an event data holding unit 45 of the Proxy system 4.

In contrast, behavior of the work flow engine 37 is detected by an Eng event extracting unit 38 which is arranged in the work flow system 3. Afterward, the work flow system 3 sends properly data on the event to the Proxy system 4 by using a common data sending unit 47, which is arranged in the work flow system 3.

Afterward, the Proxy system 4 collects data on the event by use of an own common data receiving unit 46 and holds temporarily the data in the event data holding unit 45 of the Proxy system 4.

All data on the event, which is held temporarily in the event data holding unit 45, are transferred properly by a common data sending unit 44 to the monitor system 5.

As shown in FIG. 8, the monitor system 5 has the work flow definition and service definition acquiring unit 59, a work flow definition synthesizing unit 60, a synthetic work flow definition 61, an event data receiving unit 62, an event data associating unit 63, a measurement control quantity managing unit 64, an event and statistics storing data database (DB) 65, a meta-data managing unit 66, measurement statistic data calculating unit 67, a performance data managing unit 68, an activation control unit 69, a state observing unit 70, a simulation processing unit with compensation function 71, a target state vector value managing unit 72, a detecting unit 73, an evaluation condition adjusting unit 74, a policy description managing unit 75, an adjustment operating unit 76, a measured state vector value processing unit 77, a long-term compensation detecting unit 78, a buffer unit 79 and an execution condition designating unit 80.

The work flow definition and service definition acquiring unit 59 receives the work flow definitions 31, 34 and 39, and executes a conversion partially. The work flow definition and service definition acquiring unit 59 can access to the repository 6 which is arranged in the external side. The work flow definition synthesizing unit 60 synthesizes a work flow definition which integrates all work flow definitions acquired by the work flow definition and service definition acquiring unit 59. The synthetic work flow definition 61 stores and manages the synthetic work flow definition which is synthesized.

The event data receiving unit 62 receives all data on the event from the work flow systems 1 and 2 and the Proxy system 4. The event and statistics storing DB65 sorts out and associates and holds all event data, which the event data receiving unit 62 receives, with reference to the synthetic work flow definition 61 which stores and manages the integrated and synthesized work flow definition. The measurement control quantity managing unit 64 manages the event and statistics storing DB65. The event data associating unit 63 executes an actual process of the association mentioned previously.

The meta-data managing unit 66 extracts a work flow definition, which is integrated and synthesized, and component description thereof from the synthetic work flow definition 61 and the repository 6, and manages them on a memory in order to improve calculation ability, when a group of measurement statistic corresponding to a group of various parameters, from which a fact can be derived and grasped with only statistical process not through executing prediction by use of simulation, such as an amount of transferred messages per unit time, number of messages which are discarded due to communication failure, number of processes of the integrated and synthesized work flow or the like.

The measurement statistic data calculating unit 67 extracts related event data among all event data stored in the event and statistic storing DB 65, and calculates a group of measurement statistic with reference to the integrated and synthesized workflow definition and the component description thereof which are managed by the meta-data managing unit 66. After the measurement statistic data calculating unit 67 calculates the group of measurement statistic, the performance data managing unit 68 manages the calculation result on a memory, in order to process the calculation result at high speed in the following evaluation and calculation step. The measurement statistic data calculating unit 67 is corresponding to the measurement statistic data calculating unit 502 in the configuration shown in FIG. 1.

The activation control unit 69 activates the execution condition designating unit 80 managing various execution conditions and a group of various parameter values which are designated by the managing console 81 and which are referred to when the service provision quality control device 2 is operated, and activates the simulation processing unit with compensation function 71 mentioned later or the like through designating a sampling frequency in order to predict a state by simulation on the basis of the measurement statistic and to execute control on the basis of the predicted state.

The state observing unit 70 obtains a group of vector values, which are composed of a group of measurement statistic sampled at the latest sampling time in a sampling period for control and sampled before more than one sampling period, from the performance data managing unit 68 in association with information obtained from the meta-data managing unit 66 and maintains and manages them for predicting state related to the agreed service level of object for control at a certain time. The state observing unit 70 is corresponding to the state observing unit 503 in the configuration shown in FIG. 1.

The target state vector value managing unit 72 executes management with a group of vector values and a group of target values, which should be realized by the service provision control device and which are related to the agreed service level. The target state vector value managing unit 72 is corresponding to the agreed service level storing unit 501 in the configuration shown in FIG. 1. After the simulation processing unit with compensation function 71 designates the group of vector values which are composed of the group of measurement statistic, and the amount of operation which should be given to the various control apparatuses mentioned later, the simulation processing unit with compensation function 71 executes state prediction and evaluation of the agreed service level, which is at an arbitrary point of time, on the basis of the group of vector values and the amount of operation. The simulation processing unit with compensation function 71 is corresponding to the simulation processing unit 504 in the configuration shown in FIG. 1. The detecting unit 73 compares the group of vector values on the state of the agreed service level which the simulation processing unit with compensation function 71 predicts and evaluates and which is at an arbitrary point of time, with the group of vector values of group of target values on the agreed service level which the target state vector managing unit 72 manages, and then, calculates control deviation. The detecting unit 73 is corresponding to the judging unit 506 in the configuration shown in FIG. 1.

In the case that the control deviation, which the detecting unit 73 calculates, does not satisfy the group of vector values of the group of target values on the agreed service level, the evaluation condition adjusting unit 74 determines tentatively, when necessary, an amount of operation, which should be given to various control apparatus units, and executes prediction and evaluation by use of the simulation processing unit with compensation function 71 repeatedly until iteration number reaches to a designated permissible number, and executes adjustment on the control plan in order to satisfy the group of vector values of group of target values on the agreed service level. The evaluation condition adjusting unit 74 is corresponding to the adjusting unit 507 in the configuration shown in FIG. 1. The policy description managing unit 75 manages a policy or the like to which the evaluation condition adjusting unit 74 should refer to when the evaluation condition adjusting unit 74 determines an amount of operation tentatively. The policy description managing unit 75 is corresponding to the policy description managing unit 505 in the configuration shown in FIG. 1.

The adjustment operating unit 76 instructs an actual amount of operation to each of various control apparatus units, in the case that the control deviation, which the detecting unit 73 calculates, reaches to level, which satisfies the group of vector values of group of target values on the agreed service level which is agreed per plural service users, or in the case that the control deviation reaches to the level which satisfies the group of vector values of group of target values on the agreed service level, after the evaluation condition adjusting unit 74 executes the adjustment and then, determines the amount of operation which is given to each of various control apparatus units. The adjustment operating unit 76 is corresponding to the fixing unit 508 in the configuration shown in FIG. 1. When the adjustment operating unit 76 instructs the actual amount of operation, the buffer unit 79 holds the group of vector values, which the simulation processing unit with compensation function 71 predicts and evaluates, on the state of agreed service level at the designated point of time.

The measured state vector value processing unit 77 calculates the group of measured vector values corresponding to the group of vector values, which is related to the state of agreed service level and which the simulation processing unit with compensation function 71 predicts and evaluates, on the basis of all event data which are stored in the event and statistics storing DB65, through going back to the past event data, and manages the calculation result, in order to maintain correctly a group of fixed parameter values to which the simulation processing unit with compensation function 71 refers when the simulation processing unit with compensation function 71 predicts and evaluates the group of vector values on the state of agreed service level which is at the designated point of time.

The long-term compensation detecting unit 78 updates and maintains the policy or the like, which the policy description managing unit 75 manages and to which the evaluation condition adjusting unit 74 refers when the evaluation condition adjusting unit 74 determines the amount of operation tentatively, through comparing the group of measured vector values, which is managed by the measured state vector value processing unit 77 and which is corresponding to the group of vector values on the state of agreed service level, with the group of vector values, which is held by the buffer unit 79 after the prediction and evaluation by the simulation processing unit with compensation function 71 and which is related to the state of agreed service level which is at a plurality of points of time.

The group of vector values on the state of the agreed service level is synthesized and defined by the work flow definition synthesizing unit 60 on the basis of all work flow definitions such as work flow definitions 31, 34 and 39 or the like and is defined in a unit which is managed as the synthetic work flow definition 61. Accordingly, in the case that there are a plurality of service users, monitor system 5 holds a plurality of groups of vector values, since some of work flows, which are positioned at the same level as one of the work flow definition 31, are different each other.

In the case that the adjustment operating unit 76 instructs the actual amount of operation to various control apparatus units, it may be possible that a plurality of control operations are executed. For example, since the work flow system 1 includes the other work flow engine 29' which is equivalent to the work flow engine 29, work flow system 1 may be possible to execute an additional activation and suspension of the work flow engine 29' according to a situation of the processing load.

Furthermore, in the case of the work flow system 1, the operation proxy 48 also works as one of the control apparatus units. For this reason, the operation Proxy 48 includes a compulsive discard unit 50, an input restraining unit 51 and a queue managing unit 52.

In the case that the work flow engines 29 and 29' in the work flow system 1 communicate via adaptors 19 and 20, the communication is executed via the operation proxy 48. Then, transferring of the message during the communication may be restrained temporarily by the input restraining unit 51 and may be stored in the queue managing unit 52, or the message during the communication, which is stored in the queue managing unit 52, is discarded by use of the compulsive discard unit 50 as far as the agreed service level is satisfied.

As a result, in the case the job application systems 7 and 8, for example, are in a bottleneck for the process, work flow system 1 can realize rectification of transferring of the messages by the restraint, the discard or the like. When a whole of unit, which is managed as the synthetic workflow definition 61, is executed in cooperation with the operation proxy 49 and the proxy unit 35 mentioned later, which work as a control apparatus unit as well, a position of the bottleneck is specified and the rectification is promoted. As a result, the service provision quality control device can improve throughput of the whole of unit.

The operation proxy 49 of the work flow system 2 also works as one of the control apparatus units with the same aim as one of the work flow system 1. For this reason, the operation Proxy 49 includes a compulsive discard unit 53, an input restraining unit 54 and a queue managing unit 55.

With the same aim as one of the work flow system 1, the proxy unit 35 of the Proxy system 4, via which communication between the adaptor 23 of the work flow system 3 and the data communication unit 17, and communication between the adaptor 24 of the work flow system 3 and the data communication unit 18 are executed, also works as one of the control apparatus units.

For this reason, the proxy unit 35 includes a compulsive discard unit 56 corresponding to the compulsive discard unit 50, an input restraining unit 57 corresponding to the input restraining unit 51 and a queue managing unit 58 corresponding to the queue managing unit 52.

An operation of the service provision quality control device will be described in the following according to the exemplary embodiment of the present invention.

<Definition>

Here, all service set called by the work flow definition 31, 34 or the like are denoted as the following symbol (A). A natural number set, which is used, for example, for indicating a component of a matrix, is denoted as the following symbol (B). In contrast, in the case that time and various parameter values are real number, the real number set is denoted as the following symbol (C).

[Definition 1]

S ... (A)

N ... (B)

R ... (C)

A component work flow, which is corresponding to the work flow definitions 31 and 34 or the like and which composes the work flow synthesized by the work flow synthesizing unit 60, means a sub set of a direct product expressed by a tuple of the following formula (1).

[Definition 2]

$$\forall_{ebp}\{ebp \in EBP \subseteq (CONT \times S_o \times S_d \times N_c \times N_i)\} \quad (1)$$

A context set, which means under what a work flow definition the activation is executed, is denoted as the following symbol (D), and a call originating side service set and a call destination side service set are denoted as the following symbols (E) and (F) respectively. Moreover, the following symbol (G), which is a natural number (not smaller than 0) set, means an accumulated number of calls, and the following symbol (H) which is a natural number (not smaller than 0) set, means repeated calls number. The following relation formula (2) exists between the call originating side service set and the call destination side service set.

[Definition 3]

CONT ... (D)

$S_o$ ... (E)

$S_d$ ... (F)

$N_c$ ... (G)

$N_i$ ... (H)

[Definition 4]

$$S = S_o \cup S_d \quad (2)$$

A component work flow definition is expressed as the following formula (3) using a power set of component work flow.

[Definition 5]

$$\forall_{cbp}(cbp \in CBPB \subseteq 2^{EBP}) \quad (3)$$

Here, process defining function: name, which specifies an arbitrary work flow definition, means one to one mapping expressed as the following formula (4).

[Definition 6]

$$\text{name}: \{\forall_{cbp} \exists m(m \in N \wedge cbp \in CBP); cbp \Leftrightarrow m\} \quad (4)$$

<Operation when Measuring>

An operation of the service provision quality control device on the basis of the agreed service level at a time when the service provision quality control device executes measurement will be described by use of FIG. 9, FIG. 10, FIG. 11 and FIG. 15.

A procedure, which is executed at by the service provision quality control device a time when collecting event information from a usual work flow engine arranged distributedly for measuring quality of service, will be described with reference to FIG. 9.

In the case that the work flow engines 29 and 29' communicate with the job application system 7, the work flow engines 29 and 29' send a process request message m1 to the operation proxy 48 on the basis of the work flow definition 31. Since the process request message m1 may be generated on the web service or the like, the process request message m1 is defined by use of XML (eXtensible Markup Language) or the like.

When the operation proxy 48 receives the process request message m1, the operation proxy 48 executes any one out of executions to store the process request message m1 in the queue managing unit 52 after the input restraining unit 51 restrains the process request message m1 temporarily, and to discard the process request message m1 by use of the compulsive discard unit 50 after storing the process request message m1 in the queue managing unit 52, and to send a process request message m2, which has equivalent contents to ones of the process request message m1, to the adaptor 19, on the basis of contents of the process request message m1.

The execution, which the operation proxy 48 should select out of restraining, discarding or sending to the adaptor 19, is determined on the basis of contents of a group of control messages on the amount of operation which the adjustment operating unit 76 instructs to various control apparatus units.

The adjustment operating unit 76 designates a group of process request messages for restraining, a type of group of process response messages, an amount of operation which indicates quantitative degree of restraining, or the like to the input restraining unit 51 by a restraining message c52.

The adjustment operating unit 76 designates a group of process request messages for discarding, a type of group of process response messages, an amount of operation which indicates quantitative degree of restraining such as discard rate, or the like to the compulsive discard unit 50 by a control message c51.

The group of process request messages and the group of process response messages, which are not designated by the control messages c51 and c52, are regarded to be designated to execute usual communication without executing a specific operation.

The group of control messages on the amount of operation, which the adjustment operating unit 76 instructs to various control apparatus units, includes a control message c50 which the adjustment operating unit 76 instructs to an environment of the work flow 1.

When the environment of the work flow system 1 receives the control message c50, the environment of the work flow system 1 evaluates activation and suspension of the work flow engines 29 and 29', and sends a control command c53 for executing activation and suspension of the work flow engine 29, and change of contents of the control or the like on the basis of necessity, and additionally, sends a control command c54 for executing control of activation and suspension of the work flow engine 29', change of process contents or the like The adaptor 19 converts the process request message m2 into a communication protocol and a procedure which the job application system 7 can accept, and sends the converted process request message m2 to the data communication unit 13 of the job application system 7 as a new process request message m3.

The data communication unit 13 receives the process request message m3, and transfers the process request message m3 to the job application system 7. If necessary on the basis of the result, a new process response message m4 is generated and returned to the adaptor 19 from the data communication unit 13.

The adaptor 19 converts the process response message m4 into a communication protocol and a procedure, which are specified in advance, and returns the converted process response message m5 to the operation proxy 48 as a process response message m5.

When the operation proxy 48 receives the process response message m5, the operation proxy 48 executes any one out of executions to store the process response message m5 in the queue managing unit 52 after the input restraining unit 51 restrains the process response message m5 temporarily, and to discard the process response message m5 by use of the compulsive discard unit 50 after the queue managing unit 52 stores the process response message m5, and to return the process request message m1 as a process response message m6, which has equivalent contents to ones of the process response message m5, to the work flow engine 29 or 29' which is in a state of waiting for receiving after sending the process request message m1, on the basis of contents of the process response message m5.

When the work flow engine 29 receives the process response message m6, the work flow engine 29 determines next behavior on the basis of the work flow definition 31. For example, in the case that the work flow engine 29 communicates with the job application system 8 according to the result, the work flow engines 29 sends a process request message m7 to the operation proxy 48 in this case on the basis of the work flow definition 31. Since the process request message m7 also may be generated on the web service or the like, the process request message m7 is defined by use of XML or the like.

When the operation proxy 48 receives the process request message m7, the operation proxy 48 executes any one out of executions to store the process request message m7 in the queue managing unit 52 after the input restraining unit 51 restrains the process request message m7 temporarily, and to discard the process request message m7 by use of the compulsive discard unit 50 after the queue managing unit 52 stores the process request message m7, and to transfer a process request message m8, which has equivalent contents to ones of the process request message m7, to the adaptor 20 on the basis of contents of the process request message m7.

The adaptor 20 converts the process request message m8 into a communication protocol and a procedure which the job application system 8 can accept, and sends the converted process request message m8 to the data communication unit 14 of the job application system 8 as a process request message m9.

The data communication unit 14 receives the process request message m9, and transfers the process request message m9 to the job application system 8. If necessary on the basis of the result, a new process response message m10 is generated and returned to the adaptor 20 from the data communication unit 14.

The adaptor 20 converts the process response message m10 into a communication protocol and a procedure, which are specified in advance, and returns the converted process response message m10 to the operation proxy 48 as a process response message m11.

When the operation proxy 48 receives the process response message m11, the operation proxy 48 executes any one out of executions to store the process response message m11 in the queue managing unit 52 after the input restraining unit 51 restrains the process response message m11 temporarily, and to discard the process response message m11 by use of the compulsive discard unit 50 after the queue managing unit 52 stores the process response message m11, and to return a process response message m12, which has equivalent contents to ones of the process response message m11, to the work flow engine 29 which is in a state of waiting for receiving after sending the process request message m7, on the basis of contents of the process response message m11.

While the work flow engine 29 determines next behavior on the basis of the work flow definition 31, the work flow engine 29 may communicate with another work flow system 2 in some cases. In the case, the work flow engine 29 sends a process request message m86 to the operation proxy 48 to transfer the process request message m86 to the work flow system 2 which is destination on the basis of the work flow definition 31. Since the process request message m86 also may be generated on the web service or the like, the process request message m86 is defined by use of XML or the like.

When the operation proxy 48 receives the process request message m86, the operation proxy 48 executes any one out of executions to store the process request message m86 in the queue managing unit 52 after the input restraining unit 51 restrains the process request message m86 temporarily, and to discard the process request message m86 by use of the compulsive discard unit 50 after the queue managing unit 52 stores the process request message m11, and to transfer a process request message m25, which has equivalent contents as the process request message m86 has, to the work flow system 2 on the basis of contents of the process request message m86.

The work flow system 2 sends a processing response message m26 to the operation proxy 48 in reply to the process request message m25.

When the operation proxy 48 receives the process response message m26, the operation proxy 48 executes any one out of executions to store the process response message m26 in the queue managing unit 52 after the input restraining unit 51 restrains the process response message m26 temporarily, and to discard the process response message m26 by use of the compulsive discard unit 50 after the queue managing unit 52 stores the process response message m26, and to return a process response message m87, which has equivalent contents to ones of the process response message m26, to the work flow engine 29 which is in a state of waiting for receiving after sending the process request message m86, on the basis of contents of the process response message m26.

Events on the process request message and the process response message, which are issued in the work flow system 1, are extracted by a plurality of event extracting units which exist in the work flow system 1. Specifically, the adaptor 19 includes the Msg event extracting unit 25.

When the adaptor 19 receives the process request message m2, the Msg event extracting unit 25 detects the receiving of process request message m2 and stores the receiving of process request message m2 as an event m17 on the message. When the adaptor 19 converts the process request message m2 into a communication protocol and a procedure, which the job application system 7 can accept, and sends the converted process request message m2 as the process request message m3, the Msg event extracting unit 25 detects the sending process request message m3 and stores the sending process request message m3 as an event m18 on the message.

Similarly, when the adaptor 19 receives the process response message m4 from the data communication unit 13, the Msg event extracting unit 25 detects the receiving of process response message m4 and stores the receiving of process response message m4 as an event m19 on the message. When the adaptor 19 converts the process response message m4 and sends the converted process response message m4 as the process response message m5 to the operation proxy 48, the Msg event extracting unit 25 detects the sending of process response message m5 and stores the sending of process response message m5 as an event m20 on the message.

Similarly, the adaptor 20 includes the Msg event extracting unit 26.

The Msg event extracting unit 26, similarly to the Msg event extraction unit 25, detects the process request message m8 and stores the detecting of process request message m8 as an event m21 on the message. Moreover, the Msg event extracting unit 26 detects the process request message m9 and stores the detecting of process request message m9 as an event m22 on the message. Moreover, the Msg event extracting unit 26 detects the process response message m10 and stores the detecting of process response message m10 as an event m23 on the message. Moreover, the Msg event extracting unit 26 detects the process response message m11 and stores the detecting of process response message m11 as an event m24 on the message.

Behavior of the work flow engines 29 and 29' is detected by the Eng event extracting unit 30. The Eng event extracting unit 30 handles a series of all events related to the messages which are issued and received by the work flow engines 29 and 29'.

The process request message m1, which is delivered to the operation proxy 48 from the work flow engine 29 to be transferred to the adaptor 19, is detect by the Eng event extracting unit 30, and the detection of process request message m1 is stored as an event m13 on the message in the engine. Similarly, the process response message m6, which is returned to the work flow engine 29 from the adaptor 19 via the operation proxy 48, is detected by the Eng event extracting unit 30, and the detection of process response message m6 is stored as an event m14 on the message in the engine.

Moreover, the process request message m7, which is delivered to the operation proxy 48 from the work flow engine 29 to be transferred to the adaptor 20, is detect by the Eng event extracting unit 30, and the detection of the process request message m7 is stored as an event m15 on the message in the engine. Similarly, the process response message m12, which is returned to the work flow engine 29 from the adaptor 20 via the operation proxy 48, is detected by the Eng event extracting unit 30, and the detection of process response message m12 is stored as an event m16 on the message in the engine.

Moreover, in the case of communicating with other work flow system 2, the Eng event extracting unit 30 executes similarly. The process request message m86, which is sent from the work engine 29 to the operation proxy 48 for communication with the work flow system 2, is detected by the Eng event extracting unit 30, and the detection of process request message m86 is stored as an event m27 on the message in the engine. Moreover, the process response message m87 corresponding to the process response message c52 issued by the work flow engine 2 is detected by the Eng event extracting unit 30 and the detection of process response message m87 is stored as an event m28 on the message in the engine.

The of events m17 to m20 on the messages stored in the Msg event extracting unit 25, the events m21 to m24 on the messages stored in the Msg event extracting unit 26, and the events m13 to m15, m27 and m28 on the messages in the engine which are detected by the Eng event extracting unit 30 are recorded and stored temporarily in the event data holding unit 40 of the work flow system 1. Afterward, an event data transferring message m29 is generated properly in a predetermined format by the common data sending unit 41, and afterward, sent to the monitor system 5.

The monitor system 5 includes the event data receiving unit 62 which receives all data on the event, and receives the event data transferring message m29.

While the collection of data on the event in the work flow system 1 and the transfer of the event data to the monitor system 5 have been described here, the case of the work flow system 2 is similar.

Next, a procedure to collect the event information from the existing work flow engine 37 with original mounting via the Proxy system 4 in order to measure quality of service will be described by use of FIG. 10.

In the case that the work flow engine 37 communicates with the job application system 11, the work flow engine 37 sends a process request message m30 to the adaptor 23 on the basis of the work flow definition 39. In the case that the process request message m30 may be generated on the web service or the like, the process request message m30 is defined by use of XML or the like. Moreover, since the work flow system 3 includes the existing work flow engine with original mounting, communication between the data communication unit 17 and the adaptor 23 and communication between the data communication unit 18 and the adaptor 24 are realized via the proxy unit 35 of the Proxy system 4, and not always realized on the Web service.

The adaptor 23 converts the process request message m30 into a communication protocol and a procedure, which the job application system 11 can accept, and sends the converted process request message m30 as a new process request message m31 to the data communication unit 17 of the job application system 11.

Communication between the work flow system 3 and the job application system 11 is realized via the proxy unit 35 of the Proxy system 4. Since the proxy unit 35 receives the process request message m31 firstly and then, re-sends the process request message m31 to the data communication unit 17 as a process request message m32, consequently, it is realized to send the process request message from the adaptor 23 to the data communication unit 17.

When the proxy unit 35 receives the process request message m31, the proxy unit 35 executes any one out of executions to store the process request message m31 in the queue managing unit 58 after the input restraining unit 57 restrains the process request message m31 temporarily, and to discard the process request message m31 by use of the compulsive discard unit 56 after storing the process request message m31 in the queue managing unit 58, and to re-send the process request message m31 as the process request message m32, on the basis of contents of the process request message m31.

The control execution, which the proxy unit 35 selects out of restraining, discarding or sending the process request message 32 to the data communication unit 17, is determined on the basis of contents of a group of control messages on the amount of operation which the adjustment operating unit 76 instructs to various control apparatus units.

The adjustment operating unit 76 designates a group of process request messages for restraining, a type of group of process response messages, an amount of operation which indicates quantitative degree of restraining, or the like to the input restraining unit 57 by a control message c56.

The adjustment operating unit 76 designates a group of process request messages for discarding, a type of group of process response messages, an amount of operation which indicates quantitative degree such as discard rate, or the like to the compulsive discard unit 56 by a control message c55.

The group of process request messages and the group of process response messages, which are not designated by the control messages c55 and c56, are regarded to be designated to execute usual communication without executing a specific operation.

When the data communication unit 17 receives the process request message m32, the data communication unit 17 transfers the process request message m32 to the job application system 11. If necessary according to the result, a new process response message m33 is generated, and sent to the adaptor 23 from the data communication unit 17 as a response.

In the case, communication between the job application system 11 and the work flow system 3 is realized via the proxy unit 35 of the Proxy system 4. Since the proxy unit 35 receives the process response message m33 firstly and then, re-sends the process response message m33 to the data communication unit 23 as a process response message m34, consequently, it is realized to send the process response message from the data communication unit 17 to the adaptor 23.

When the proxy unit 35 receives the process response message m33, the proxy unit 35 executes any one out of executions to store the process response message m33 in the queue managing unit 58 after the input restraining unit 57 restrains the process response message m33 temporarily, and to discard the process response message m33 by use of the compulsive discard unit 56 after storing the process response message m33 in the queue managing unit 58, and to re-send the process response message m33 as the process response message m34, on the basis of contents of the process response message m33.

When the adaptor 23 receives the process response message m34 from a proxy unit 35, the adaptor 23 converts the process response message m34 into a communication protocol and a procedure, which are specified in advance, and returns the converted process response message m34 to the work flow engine 37 as a process response message m35.

The work flow engine 37 determines a next behavior on the basis of the work flow definition 39. In the case that the work flow engine 37 communicates with the job application system 12 according to the determination result, the work flow engine 37 sends a process request message m36 to the adaptor 24 in this time on the basis of the work flow definition 39.

The adaptor 24 converts the process request message m36 into a communication protocol and a procedure which the job application system 12 can accept, and sends the converted process request message m36 to the data communication unit 18 of the job application system 12 as a process request message m37.

Since communication between the work flow system 3 and the job application system 11 is realized via the proxy unit 35 of the Proxy system 4, the proxy unit 35 receives the process request message m37 firstly and then, re-sends the process request message m37 to the data communication unit 18 as a new process request message m38. Consequently, it is realized to send the process request message from the adaptor 24 to the data communication unit 18.

When the proxy unit 35 receives the process request message m37, the proxy unit 35 executes any one out of executions to store the process request message m37 in the queue managing unit 58 after the input restraining unit 57 restrains the process request message m37 temporarily, and to discard the process request message m37 by use of the compulsive discard unit 56 after storing the process request message m37 in the queue managing unit 58, and to re-send the process request message m37 as the process request message m38, on the basis of contents of the process request message m37.

When the data communication unit 18 receives the process request message m38, the data communication unit 18 transfers the process request message m38 to the job application system 12. As a result, if necessary as a reply to the process request message m38, a new process response message m39 is generated and sent from the data communication unit 18 to the adaptor 24 as a response.

Also in this case, since communication between the job application system 12 and the work flow system 3 is realized via the proxy unit 35 of the Proxy system 4, the proxy unit 35 receives the process response message m39 firstly and then, re-sends the process response message m39 to the adaptor 24 as a process response message m40. Consequently, it is realized to send the process response message from the data communication unit 18 to the adaptor 24.

When the proxy unit 35 receives the process response message m39, the proxy unit 35 executes any one out of executions to store the process response message m39 in the queue managing unit 58 after the input restraining unit 57 restrains the process response message m39 temporarily, and to discard the process response message m39 by use of the compulsive discard unit 56 after storing the process response message m39 in the queue managing unit 58, and to re-send the process response message m39 as the process response message m40, on the basis of contents of the process response message m39.

When the adaptor 24 receives the process response message m40 from the proxy unit 35, the adaptor 24 converts the process response message m40 into a communication protocol and a procedure, which are specified in advance, and returns the converted process response message m40 as a process response message m41 to the work flow engine 37.

The work flow engine 37 determines next behavior on the basis of the work flow definition 39. In that case, it may be necessary for the work flow engine 37 to communicate with another work flow system 2 as the next behavior. In the case, the work flow engine 37 sends a process request message m88 whose destination is the work flow system 2 to the proxy unit 35 on the basis of the work flow definition 39 in this time. The process request message m88, which may not always be generated on the web service or the like, is defined in an arbitrary expression.

When the proxy unit 35 receives the process request message m88, the proxy unit 35 executes any one out of executions to store the process request message m88 in the queue managing unit 58 after the input restraining unit 57 restrains the process request message m88 temporarily, and to discard the process request message m88 by use of the compulsive discard unit 56 after storing the process request message m88 in the queue managing unit 58, and to send the process response message m88 as a process request message m48 to the work flow system 2, on the basis of contents of the process request message m88.

A result of the process request message m48 is returned to the proxy unit 35 as a process response message m49.

When the proxy unit 35 receives the process response message m49, the proxy unit 35 executes any one out of executions to store the process response message m49 in the queue managing unit 58 after the input restraining unit 57 restrains the process response message m49 temporarily, and to discard the process response message m49 by use of the compulsive discard unit 56 after storing the process response message m49 in the queue managing unit 58, and to return the process response message m49 as a process response message m89, which has equivalent contents to ones of the process response message m49, to the work flow engine 37 which is in a state of waiting for receiving after sending the process request message m88, on the basis of contents of the process response message m49.

Since the work flow system 3 includes the existing work flow engine with original mounting, a different method from a usual process method (method different from ones used in the work flow systems 1 and 2) is adopted to detect a group of events on the process request message and the process response message which are issued in the work flow system 3.

Since communication between the data communication unit 17 and the adaptor 23 is executed via the proxy unit 35, the event on the process request message and the process response message to occur is detected by the Prx event extracting unit 36 which is connected to the proxy unit 35 in the Proxy system 4. The event on the process request message and the process response message, which are issued in communication between the data communication unit 18 and the adaptor 24, is also detected by the Prx event extracting unit 36.

When the adaptor 23 sends the process request message m31, and the proxy unit 35 receives the process request message m31 and sends the process request message m31 to the data communication unit 17 as the process request message m32, the Prx event extracting unit 36 detects and stores the sending of process request message m32 as an event on message m50. Moreover, when the data communication 17 sends the process response message m33, and the proxy unit 35 receives the process response message m33 and then, sends the process response message m33 to the adaptor 23 as the process response message m34, the Prx event extracting unit 36 detects and stores the sending of process response message 34 as an event on message m51.

Similarly, when the adaptor 24 sends the process request message m37, and the proxy unit 35 receives the process request message m37 and then, sends the process request message m37 to the data communication unit 18 as the process request message m38, the Prx event extracting unit 36 detects and stores the sending of the process request message m38 as an event on message m52. Moreover, when the data communication 18 sends the process response message m39, and the proxy unit 35 receives the process response message m39 and then, sends the process response message m39 to the adaptor 24 as the process response message m40, the Prx event extracting unit 36 detects and stores the sending of the process response messages 40 as an event on message m53.

The event information extracted by the Prx event extracting unit 36 is stored temporarily in the event data holding unit 45 in the Proxy system 4.

In contrast, behavior of the work flow engine 37 is detected by the Eng event extracting unit 38 which is arranged in the work flow system 3.

For example, the process request message m30, which is delivered to the adaptor 23, is detected by the Eng event extracting unit 38, and is stored as an event on message m42 in the engine. Similarly, the process response message m35, which is delivered from the adaptor 23, is detected by the Eng event extracting unit 38, and is stored as an event on message m43 in the engine.

Moreover, the process request message m36, which is delivered to the adaptor 24, is detected by the Eng event extracting unit 38, and is stored as an event on message m44 in the engine. Similarly, the process response message m41, which is delivered from the adaptor 24, is detected by the Eng event extracting unit 38, and is stored as an event on message m45 in the engine.

Furthermore, in the case of communicating with another work flow system 2, the case is handled the event similarly. That is, the process request message m88, which is sent to the work flow system 2, is detected by the Eng event extracting unit 38 and stored as an event on message m46 in the engine. Moreover, the process response message m89, which is returned as a result of the process request message m88, is also detected by the Eng event extracting unit 38 and stored as an event m47 on the message in the engine.

Afterward, an event data transferring message m54 is generated in a predetermined format and data on the event is transferred properly to the Proxy system 4 by use of the common data sending unit 47 which is arranged in the work flow system 3.

Afterward, the Proxy system 4 receives the event data transferring message m54 on the event by use of the own common data receiving unit 46 and stores temporarily the event data transferring message m54 in the event data holding unit 45 in the Proxy system 4.

Afterward, an event data transferring message m55 is generated in a predetermined format and sent properly to the monitor system 5 by the common data sending unit 44.

The monitor system 5, which includes the event data receiving unit 62 to receive, all data on the event, receives the event data transferring message m55.

FIG. 11 shows an outline of a procedure executed at a time when the work flow definition, which is held independently by the workflow engine arranged distributedly, is collected, and the integrated and synthesized work flow definition is generated, and a procedure for processing the measured data and supplying in order to be used for control.

Moreover, FIG. 15 shows a control procedure by the service provision quality control device according to the exemplary embodiment of the present invention. A procedure for processing the measured data and supplying to use for control will be described by use of FIG. 11 and FIG. 15.

Behavior of the workflow engines 29 and 29', which are included in the work flow system 1, is defined by the work flow definition 31. The work flow definition 31, which describes only behavior of the work flow engines 29 and 29', is usually described in the process description, the service description or the like including WS-BPEL and WSDL which are in the standardized form.

Behavior of the work flow engine 32, which is included in the work flow system 2, is defined by the work flow definition 34. The work flow definition 34, which describes only behavior of the work flow engine 32, is usually described in the process description, the service description or the like including WS-BPEL and WSDL which are in the standardized form.

Behavior of the work flow engine 37, which is included in the work flow system 3, is defined by the work flow definition 39. Here, since the work flow system 3 includes an existing work flow engine with original mounting, the work flow definition 39 is not always described in WS-BPEL and WSDL which are in the standardized form.

The work flow definitions 31, 34 and 39 are transferred properly to the work flow definition and service definition acquiring unit 59 in the monitor system 5 as definition transferring messages m60, m61 and m62 respectively.

The workflow definition and service definition acquiring unit 59 judges the form of the definition transferring message, when the workflow definition and service definition acquiring unit 59 receives the definition transferring message m60, m61 and m62. If the definition transferring message m62, which is in the form different from the standardized form of WS-BPEL and WSDL, is received, the definition transferring message m62 is converted equivalently into WS-BPEL and WSDL, which are in the standardized form, by a process system which is included in the work flow definition and service definition acquiring unit 59 in advance, and afterward, the workflow definition and service definition acquiring unit 59 stores and manages the converted definition transferring message m62.

Even if a form, in which the work flow definition 39 is described, is different from the form of standardized description like WS-BPEL and WSDL, the form of the work flow definition 39 includes information which is almost equivalent to information which the standardized form of WS-BPEL and WSDL includes generally.

Therefore, according to the service provision quality control device of the exemplary embodiment of the present invention, information is limited to one in a form which can be converted equivalently into the standardized form of WS-BPEL and WSDL.

Afterward, the work flow definition and service definition acquiring unit 59 holds inside all information which are acquired through receiving and converting the definition transferring messages m60, m61 and m52 and which are corresponding to the workflow definitions 31, 34 and 39 based on the standardized form of WS-BPEL and WSDL. Further, it is possible to store the information in the repository 6 arranged outside.

The monitor system 5 includes the work flow synthesizing unit 60 to generate a new integrated work flow definition on the basis of information corresponding to the work flow definitions 31, 34 and 39 and other information which are managed by the work flow definition and service definition acquiring unit 59, and the synthetic workflow definition 61 which stores and manages the synthesized work flow definition.

The work flow synthesizing unit 60 activates the work flow definition and service definition acquiring unit 59 properly in order to acquire all workflow definitions which are components for the synthesis. The work flow definition and service definition acquiring unit 59 acquires not only the information corresponding to the work flow definitions 31, 34 and 39 which have been already held inside, but also all remaining work flow definition and service definition information m64, which are components of the integrated and synthesized work flow, through carrying out an inquiry m85 to the repository 6. In the case of a configuration which does include the repository 6, this inquiry is not carrying out.

Afterward, the work flow definition and service definition acquiring unit 59 delivers the information corresponding to the work flow definitions 31, 34 and 39, which are components of the integrated and synthesized work flow, and the information corresponding to the work flow definition and service definition information m64 as all work flow definition and service definition information m65, to the work flow synthesizing unit 60.

The work flow synthesizing unit 60 generates the integrated and synthesized work flow definition and delivers a set of integrated and synthesized work flow definition m66 to the synthetic work flow definition 61 together with all the work flow definition and service definition information m65 which is source information to generate the integrated and synthesized work flow definition. Further, the procedure, in which the work flow synthesizing unit 60 generates the integrated and synthesized work flow definition, can use the well known method such as a method disclosed in Japanese Patent Application Laid-Open No. 2007-257513.

Accordingly, the synthetic work flow definition 61 is managed in a state that the synthetic work flow definition 61 includes the information corresponding to the work flow definitions 31, 34 and 39, the information corresponding to all the work flow definition and service definition information m64, and the integrated and synthesized work flow definition.

The event information extracted by various event extracting units of the work flow system 1 is held temporarily in the event data holding unit 40 in the work flow system 1 and transferred properly to the monitor system 5 by the common data sending unit 41 as the event data transferring message m29. In the monitor system 5, the event data receiving unit 62, which receives all data on the event, receives and processes the event data transferring message m29.

The event information, which is extracted by various event extracting units of the work flow system 2, is held temporarily in the event data holding unit 42 of the work flow system 2 and transferred properly to the monitor system 5 by the common data sending unit 43 as an event data transferring message m63. In the monitor system 5, the event data receiving unit 62 receives and processes the event data transferring message m63.

In contrast, the event information extracted by various event extracting units of the Proxy system 4 is held temporarily in the event data holding unit 45 in the Proxy system 4.

Moreover, the event information extracted by various event extracting units in the work flow system 3, which cooperates with the Proxy system 4, is sent to the Proxy system 4 from the common data sending unit 47 in the work flow system 3 as the event data transferring message m54.

The common data receiving unit 46, which is installed in the Proxy system 4, receives the event data transferring message m54. Afterward, all event information included in the event data transferring message m54, is held temporarily in the event data holding unit 45.

All data on the event, which are held temporarily in the event data holding unit 45, is sent properly to the monitor system 5 by the common data sending unit 44 as the event data transferring message m55. In the monitor system 5, the event data receiving unit 62 receives and processes the event data transferring message m55.

The event data receiving unit 62 delivers all data on event m67 to the event data associating unit 63. Through the event data associating unit 63 retrieving and referring to service definition and process definition information m68, which is managed inside the event data associating unit 63, with reference to the synthetic work flow definition 61 which stores and manages the integrated and synthesized work flow definition, the event data associating unit 63 classifies correspondence of all data on event m67 to a message instance of the service process and associates all data on event m67 with the message instance of service process, and furthermore, executes association of all data on event m67 with a retrieved message instance after retrieving a group of message instances m69 which is managed by the current event and statistics storing DB65. Afterward, the associated all data on event m67 is stored in the event and statistics storing DB65 as a record of a new message instance m70.

Each of all data on event m67 is stored in and managed by the event and statistics storing DB65. Furthermore, after a group of measurement statistic corresponding to a group of various parameters, which can derive and grasp a fact with only statistical process, such as an amount of transferred messages per unit time for each service, number of messages which are discarded due to communication failure, or the like, is calculated, the calculated group of measurement statistic is also stored in and managed by the event and statistics storing DB65. The group of measurement statistic means the group of parameters representing behavior of the service.

Here, a service means an interface virtually defined as a data communication unit 13, which calls the job application system 7, and a data communication unit 14, which calls the job application system 8, by the service description of WSDL or the like.

Similarly, an interface virtually defined as a data communication unit 15, which calls the job application system 9, a data communication unit 16, which calls the job application system 10, and a data communication unit 18, which calls the job application system 11, by the service description of WSDL or the like is corresponding to a service.

The group of measurement statistic, which is corresponding to the group of various parameters per service, has not properties that prediction by use of simulation is necessary to execute calculation, such as number of processes of the integrated and synthesized work flows each of which has a complex structure combined by some selected services or the like, and the group of measurement statistic is limited to being able to be measured. Moreover, the group of measurement statistic may be determined dependently on a temporal component in some cases.

The group of various parameters, which have scalar quantity, is given as a matrix (Z) such as the following formula (5), where t means an arbitrary time. This formula is a matrix expression of all above-mentioned service sets which compose all observable (strictly, "measurable") selection parameter sets having scalar quantity at a time t and which is indicated by a symbol (A) and which is observable.

[Definition 7]

$$\forall t(t \in R, t_0 \leq t) \forall i(i \in N) \forall s(s \in S); \gamma_{(i,s)}(t) \in R \quad (5)$$

$$\gamma_{(i,s)}(t) \in R \ldots (Z)$$

In contrast, a group of vector values which means the group of parameters on the agreed service level mentioned later is obtained by non-linear mapping of matrix γ (i,s) (t) where t means time, and is defined as a set of evaluation parameters which is expressed by matrix (Y) given by the following formula (6). Further, the set of evaluation parameters are related to the work flow which has scalar quantity in components of all work flow definition sets indicated by the following symbol (I) and has scalar quantity and is related to the work flow.

[Definition 8]

$$\forall t(t \in R, t_0 \leq t) \forall j(j \in N) \forall m(m \in N \wedge name^{-1}(m) \in CBP); \Gamma_{(j,m)}(t) \in R \quad (6)$$

[Definition 9]

CBP ... (I)

$$\Gamma_{(j,m)}(t) \in R \ldots (Y)$$

Further, it may be preferable that the work flow definition in the formula (6) is any one out of the work flow definitions 31 and 34, and the work flow definition which the work flow synthesizing unit 60 integrates and synthesizes.

In order to improve process power for the above mentioned calculation, some pre-processes are executed. The pre-process is corresponding to Step S101 in FIG. 15.

As shown FIG. 11, the meta-data managing unit 66 extracts an integrated and synthesized work flow definition m73, information corresponding to all work flow definitions 31, 34 and 39 which are source information for generating the work flow definition m73, and all other work flow definition and service definition information m64 from the synthetic work flow definition 61 and the repository 6 as a set of definition information m74 and manages the set of definition information m74 on a memory.

Afterward, the meta-data managing unit 66 searches a relation between all integrated and synthesized work flow definitions m73 and the terminal service definition from the set of definition information m74. The relation is defined as, for example, an accumulated number of calls through taking a While loop, a conditioned branch or the like into account. The maximum number of the While loop is counted as a count unit and the conditioned branch is counted as one count unit respectively, and then, the accumulated number of calls is calculated through normalization by the maximum count units, and expressed by a matrix corresponding to the integrated and synthesized work flow definition and the terminal service definition. Afterward, this information is also managed on a memory.

The matrix is expressed as the formula (7) and (8), where the count number is denoted as a variable d.

[Definition 10]

$$D_{(s_n,m)} = \begin{bmatrix} d_{(s_1,1)}/d_{max} & \cdots & d_{(s_1,m)}/d_{max} \\ \cdots & \cdots & \cdots \\ d_{(s_n,1)}/d_{max} & \cdots & d_{(s_n,m)}/d_{max} \end{bmatrix} \quad (7)$$

$$\forall n(s_n \in S) \forall m(m \in N \wedge \text{name}^{-1}(m) \in CBP); \quad (8)$$
$$\{d_{(s_n,m)} \leq d_{max}\} \wedge \{(d_{(s_n,m)}, d_{max} \in N)\}$$

As shown FIG. 11, the measurement statistic data calculating unit 67, which calculates the group of the measurement statistic, calculates the group of measurement statistic per service definition. In the case that the integrated and synthesized workflow definition is coincident to other component work flow, the measurement statistic data calculating unit 67 calculates corresponding group of measurement statistic not only per component workflow definition but also per integrated and synthesized workflow definition if necessary and if possible. For this reason, the measurement statistic calculating unit 67 obtains a list of integrated and synthesized work flow m75 and all work flow definitions and service definitions m76, which are source information for generating each list m75, from the meta-data managing unit 66, and manages the list m75 and the work flow definitions and service definition m76 on a memory.

Afterward, in order to extract event data related to a calculation object out of all event data stored in the event and statistics storing DB65, the measurement statistic calculating unit 67 sends properly a retrieve request m71 to the measurement control quantity data managing unit 64 which manages the event and statistics storing DB65. Since the retrieve request m71 depends on the calculation contents, the retrieve request m71 may not always have the same contents. When the measurement control quantity data managing unit 64 receives the retrieve request m71, the measurement control quantity data managing unit 64 retrieves the event and statistics storing DB65 and sends the result to the measurement statistic data calculating unit 67. As a result, the measurement statistic data calculating unit 67 obtains a list of event data m72 related to the calculation object. This is corresponding to Step S102 in FIG. 15.

Afterward, the measurement statistic data calculating unit 67 calculates successively the group of parameters, which is calculated as the group of measurement statistic, with reference to the list of integrated and synthesized work flow definition m75 and all work flow definitions and service definitions m76 which are source information for generating each list m75. This is corresponding to Step S103 of FIG. 15.

Afterward, the calculated group of measurement statistic is stored in the measurement control quantity data managing unit 64 and the performance data managing unit 68. This is corresponding to Step S104 of FIG. 15. The above mentioned process is executed repeatedly plural times corresponding to number of parameters which compose and define the calculated group of measurement statistic (Step S105), as shown in FIG. 15.

Here, as a specific example, a case that current calculation values of parameters 1 and 2, calculation value including a temporal component, or the like is calculated will be exemplified. The measurement statistic calculating unit 67 starts to calculate the parameter 1.

In order to calculate the parameter 1 at a current point of time, the measurement statistic calculating unit 67 sends the retrieve request m71 to the measurement control quantity data managing unit 64 which manages the event and statistics storing DB65. Then, the measurement control quantity data managing unit 64 retrieves the event and statistics storing DB65, and consequently, the measurement statistic data calculating unit 67 obtains the list of event data m72 related to the calculation object (Step S102). Afterward, the measurement statistic data calculating unit 67 calculates the current value of the parameter 1 (Step S103).

Afterward, in order to maintain and manage the calculation result on the parameter 1 without making the calculation result on the parameter 1 volatilize, the calculation result on the parameter 1 is stored in the event and statistics storing DB65. That is, the measurement statistic data calculating unit 67 sends an update request m77, which includes the calculation result, to the measurement control quantity data managing unit 64. As a result, the calculation result on the parameter 1 is stored in the event and statistics storing DB65 together with time information (Step S104).

After calculating the parameter 1, in order to process the calculation result at high speed in the following evaluation step and calculation step, the measurement statistic data calculating unit 67 sends a management request m81, which is corresponding to the update request m77 and which includes the calculation result, to the performance data managing unit 68 which manages values on a memory. Consequently, the calculation result on the parameter 1 is managed by the performance data managing unit 68 together with the time information (Step S104).

Similarly, in order to calculate the parameter 2 at a current point of time (No in Step S105), the measurement statistic calculating unit 67 sends a retrieve request m71', which is different from the retrieve request m71, to the measurement control quantity data managing unit 64 which manages the event and statistics storing DB65. Then, the measurement control quantity data managing unit 64 retrieves the event and statistics storing DB65, and consequently, the measurement statistic data calculating unit 67 obtains a list of event data m72' related to the calculation object (Step S102). Afterward, the measurement statistic data calculating, unit 67 calculates current value of the parameter 2 (Step S103).

In order to store also the calculation result on the parameter 2 in the event and statistics storing DB65, the measurement statistic data calculating unit 67 sends an update request m78, which includes the calculation result, to the measurement control quantity data managing unit 64. As a result, the calculation result on the parameter 2 is stored in the event and statistics storing DB65 together with time information (Step S104).

After calculating the parameter 2, in order to process the calculation result at high speed in the following evaluation step and calculation step, the measurement statistic data calculating unit 67 sends a management request m82, which is corresponding to the update request m78 and which includes the calculation result, to the performance data managing unit 68 which manages values on a memory. Consequently, the calculation result on the parameter 2 is managed by the performance data managing unit 68 together with the time information (Step S104).

Similarly, in order to calculate an accumulated value and an average value of the parameter 1 up to a designated point of time or the current point of time (No in Step S105), the measurement statistic data calculating unit 67 sends a new retrieve request m71, which is partial modification of the retrieve request m71, to the measurement control quantity data managing unit 64 which manages the event and statistics storing DB65. Then, the measurement control quantity data managing unit 64, which receives the new retrieve request m71, retrieves the event and statistics storing DB65, and consequently, the measurement statistic data calculating unit 67 obtains the list of event data m72 related to the calculation object (Step S102). Afterward, the measurement statistic data calculating unit 67 calculates various values of the parameter 1 (Step S103).

In order to store also the calculation result on the parameter 1 at the designated point of time and the calculation result on the statistical process in the event and statistics storing DB65, the measurement statistic data calculating unit 67 sends an update request m79, which includes the calculation result, to the measurement control quantity data managing unit 64. Consequently, the calculation result on the parameter 1 at the designated point of time and the calculated result on the statistical process are stored in the event and statistics storing DB65 together with the time information (Step S104).

In order to process the calculation results, which are the calculation result on the parameter 1 at the designated point of time and the calculation result on the statistical process, at high speed in the following evaluation step and calculation step, the measurement statistic data calculating unit 67 sends a management request m83, which is corresponding to the update request m79 and which includes the calculation result on the measurement statistic, to the performance data managing unit 68 which manages values on a memory. Consequently, the calculation result on the parameter 1 at the designated point of time and the calculation result on the statistical process are managed by the performance data managing unit 68 together with the time information (Step S104).

Similarly, in order to calculate an accumulated value and an average value of the parameter 2 up to a designated point of time or the current point of time (No in Step S105), the measurement statistic data calculating unit 67 sends a new retrieve request m71', which is partial modification of the retrieve request m71', to the measurement control quantity data managing unit 64 which manages the event and statistics storing DB65. Then, the measurement control quantity data managing unit 64, which receives the new retrieve request m71', retrieves the event and statistics storing DB65, and consequently, the measurement statistic data calculating unit 67 obtains a list of event data m72' related to the calculation object (Step S102). Afterward, the measurement statistic data calculating unit 67 calculates various values of the parameter 2 (Step S103).

In order to store also the calculation result on the parameter 2 at the designated point of time and the calculation result of the statistical process in the event and statistics storing DB65, the measurement statistic data calculating unit 67 sends an update request m80, which includes the calculation result, to the measurement control quantity data managing unit 64. Consequently, the calculation result on the parameter 2 at the designated point of time and the calculated result on the statistical process are stored in the event and statistics storing DB65 together with the time information (Step S104).

In order to process the calculation results, which are the calculation result on the parameter 2 at the designated point of time and the calculation result on the statistical process, at high speed in the following evaluation step and calculation step, the measurement statistic data calculating unit 67 sends a management request m84, which is corresponding to the update request m80 and which includes the calculation result, to the performance data managing unit 68 which manages values on a memory. Consequently, the calculation result on the parameter 2 at the designated point of time and the calculation result on the statistical process are managed by the performance data managing unit 68 together with the time information (Step S104).

The above mentioned process is executed properly and repeatedly plural times. The iteration number is coincident to number of parameters (until Yes in Step S105) which compose and define the group of the measurement statistic. In particular, the calculation is executed periodically, since a parameter related to time is handled.

<Operation when Controlling>

An operation executed at a time when the service provision control device executes control, will be described in the following by use of FIGS. 12 to 21 according to the exemplary embodiment of the present invention.

FIGS. 12 and 13 shows an operation executed at a time when the service provision control device executes service quality control. FIGS. 15 to 17 are flowcharts showing a control procedure respectively. FIG. 18 is a flowchart showing a procedure executed at a time when selecting an operation candidate. FIGS. 19 to 21 are flowcharts showing a procedure to determine a control operation respectively.

When the state observing unit 70 receives an activation request c1 in a sampling period from the activation control unit 69, the state observing unit 70 obtains a current value, an accumulated value, an average value or the like which are related to a plurality of groups of parameters and which the performance data managing unit 68 manages on a memory. For example, a calculation result on a parameter 1 at a current point of time c4, an accumulated value and average value of the parameter 1 up to a current point of time c5, a calculation result on a parameter 2 at a current point of time c6, and an accumulated value and average value of the parameter 2 up to a current point of time c7 are exemplified. As mentioned above, the parameter 1 and the parameter 2, which have properties that a fact can be grasped with only statistical process, compose a group of parameters which means behavior of the service.

Furthermore, the state observing unit 70 obtains a list of integrated and synthesized work flow definition c2 which the meta-data managing unit 66 manages on a memory, and a set of definition information on all work flow definitions and service definitions c3 which are source information for generating each of list c2. Afterward, the state observing unit 70 totals up the parameter 1 and the parameter 2 per service definition and defines a vector value whose component is the parameter 1, the parameter 2, or the like. Afterward, the state observing unit 70 defines a matrix, which is generated through sequencing the vector value of group of services by all services, as the formula (5) mentioned above.

Then, the state observing unit 70 holds a matrix, which means a state at a sampling time, as a state matrix at sampling time c8. Meanwhile, state matrix at time previous to sampling time by one sampling period c9, which is equivalent to the state matrix c8 and which is sampled at a time previous to the sampling time of the state matrix c8 calculated to be held and managed, is also held continuously. This is corresponding to Step S106 of FIG. 15.

Afterward, the state observing unit 70 sends an invoke command c12, which includes "state matrix at sampling time c8", "state matrix at time previous to sampling time by one sampling period c9", "set of definition information c10 which defines all component work flows to call the service and which indicates relation between the group of services and the group of component work flows corresponding to the workflow definitions 31, 34 and 39 and which is corresponding to the set of definition information c3" and "set of integrated and synthesized work flow definition c11 corresponding to the list of integrated and synthesized work flow definition c2" as an argument and input, in order to invoke the simulation processing unit with compensation function 71.

The simulation processing unit with compensation function 71 predicts and calculates a group of vector values meaning group of parameters on agreed service level c14 for each set of integrated and synthesized work flow definition c11, on the basis of a time-corrected equivalent matrix which is introduced from the state matrix state matrix at sampling time c8 and the state matrix at time previous to sampling time by one sampling period c9. Further, a plurality of values is calculated through compensating simulation time.

FIG. 14 shows a configuration of the simulation processing unit with compensation function 71. The simulation processing unit with compensation function 71 includes one and more behavior functions inside. A plurality of behavior functions 120, each of which has a common image, are generated according to the simulation processing time. The behavior function 120 executes a procedure for prediction in the feed forward type control, and an activation management such as a management of execution number of the simulations which include a process for compensation of delay time due to the simulation processing time or the like.

The behavior function 120 includes three components.

The first component is a sequential machine simulating units 121 and 121' which simulate a behavior like sequential machine of the work flow and which are related to the definition on the component work flow, and the set of integrated and synthesized work flow definition c11 out of the set of definition information c10.

The second component is a service properties function calculating unit 124 which expresses behavior properties of the group of all terminal services out of the set of definition information c10 and simulates behavior under the designated condition.

The third component is a process system 130 which is installed in the behavior function 120 so that the simulation processing unit with compensation function 71 executes the calculation process of the group of vector values which are based on the parameters which are returned to the outside after the execution of simulation on the agreed service level.

While the service properties function calculating unit 124 handles the group of terminal services, which have observable and linear properties, through defining an equivalent behavior, the sequential machine simulating units 121 and 121' simulate the behavior like sequential machine which the work flow has, and handle only timing equivalently.

This operation can apply an operation which is based on a publicly known principle which refers to Seiichi Koizumi, Kazuya Koyama, "Workload-aware Business Process Simulation with Statistical Service Analysis and Timed Petri Net", Proceedings of the 2007 IEEE International Conference on Web Service (ICWS 2007), 2007.

A plurality of the sequential machine simulating units 121 and 121' are generated according to the number of definitions in the set of integrated and synthesized work flow definition c11, and execute independently processes except for a waiting process due to waiting restriction on the process. In contrast, only one service properties function calculating unit 124 is generated.

The service properties function calculating unit 124 holds properties data which are measured in advance and which are related to the behavior of the group of all terminal services. For example, properties data on behavior of the job application system 7 is expressed by a job application system behavior properties constant 125. This may, be simple scalar quantity and may be vector quantity or tensor quantity which is combination of decided parameter values.

Similarly, properties data on behavior of the job application system 8 is expressed by a job application system behavior properties constant 126. Similarly, properties data on behavior of the job application system 9 is expressed by a job application system behavior properties constant 127. Similarly, properties data on behavior of the job application system 10 is expressed by a job application system behavior properties constant 128.

When the service properties function calculating unit 124 is given a group of parameters of group of measurement statistic which is at a certain time, the service properties function calculating unit 124 calculates another group of parameters, which is an evaluation object, on the basis of the job application system behavior properties constants 125 to 128. For example, when arrival rate of a service request, which is requested per service, is given to the service properties function calculating unit 124 as the group of parameters, a group of parameters such as average response time or the like is calculated.

The service properties function calculating unit 124 calculates equivalent behavior. For this reason, even if a service has a complicated structure, the service is applicable as a model. However, the object is limited to one which has properties to be linear, observable, and able to define the equivalent behavior. For example, in the case that there is a certain relation, which is not defined explicitly, between the job application system 7 and the job application system 10, and some fluctuation is caused in the job application 10, as a cause-and-effect relationship, due to fluctuation of a group of parameters of the job application system 7, it is possible to handle the behavior properties or the like.

While it may be possible to hold the job application system behavior properties constants 125 to 128 fixedly, it is usual that these constants are set at the activation time and held in a memory as proper constants while the simulation processing unit with compensation function 71 is working.

Each of the sequential machine simulating units 121 and 121' is generated on the basis of each of integrated and synthesized work flow definitions. The sequential machine simulating units internally have groups of component work flow models 122 and 123 which the integrated and synthesized work flow definition calls. The group of component work flow models 122 and 123 are defined through executing the equivalent conversion of the work flow definitions 31, 34 and 39 which are information described in WS-BPEL.

A method for describing the group of component work flow models 122 and 123 is defined by Petri-net, the sequential machine or the like. In this case, it is assumed that Petri-net is used. Further, it may be preferable that the component work flow models 122 and 123 are realized by the sequential machine or other method.

In the case that the simulation processing unit with compensation function 71 operates, after receiving the invoke command c12, a plurality of sequential machine simulating units 121 and 121' are generated on the basis of number of definitions in the set of integrated and synthesized work flow definition c11, and the group of component work flow models 122 and 123, which the integrated and synthesized work flow definition calls, are generated in each of the sequential machine simulating units on the basis of the set of definition information c10.

In the case that the simulation processing unit with compensation function 71 starts processing, the sequential machine simulating unit 121 is activated and issues tokens of Petri-net to the group of component work flow models 122, which is at the first position, on the basis of service request arrival rate which is expected for each of the set of integrated and synthesized work flow definition c11. A plurality of tokens is issued.

In the case that an arbitrary token arrives at an arbitrary place and issuing condition for next action is satisfied, the sequential machine simulating unit 121 executes an action based on the case. In the case that an action is to call the job application system 8, the sequential machine simulating unit 121 calls the service properties function calculating unit 124 on the basis of the time compensated equivalent matrix which is introduced from the state matrix at time previous to sampling time by one sampling period c9 and the state matrix at sampling time c8. Afterward, the service properties function calculating unit 124 calculates another group of parameters, which is an evaluation object, and sends a group of parameters c80 to the process system 130 together with designation of the token. Afterward, the service properties function calculating unit 124 returns the process to the sequential machine simulating unit 121.

The average response time for the service request arrival rate, which is requested per service, or the like is corresponding to the group of parameters c80.

An action is executed according to the procedure mentioned above until entering into a state of Petri-net completion for one token. Moreover, a plurality of the processes mentioned above is executed simultaneously for a plurality of tokens.

The process system 130 receives the calculated group of parameters c80 together with the designation of token. Afterward, the processing system 130 gathers the group of parameters c80 generated plurally per token, executes a calculation process such as total sum per component of the group of parameters c80, and obtains a group of calculation parameters c81. The calculation process uses a different numerical formula on the basis of contents of the parameter. It is possible to simulate execution contents for one process of the integrated and synthesized work flow definition through repeating a series of above mentioned procedures.

Since a plurality of tokens are issued, through executing the statistical process for the group of calculation parameters c81, the process system 130 can calculate a group of vector values meaning group of parameters on agreed service level c14 for each set of integrated and synthesized work flow definition c11.

It is because that calculations, whose number is corresponding to total number of definitions in the set of integrated and synthesized workflow definitions c11, are executed by one simulation by the simulation processing unit with compensation function 71 since a plurality of sequential machine simulating units 121 and 121' are generated according to the number of definitions in the set of integrated and synthesized workflow definitions c11.

The simulation processing unit with compensation function 71, which receives the result, returns the group of vector values meaning group of parameters on agreed service level c14 to the outside after the simulation is executed.

Further, the behavior function 120 inside the simulation processing unit with compensation function 71 executes a procedure for the compensation of delay time due to the simulation processing time and for the prediction accompanied with the feed forward type control. Values of the group of vector values meaning group of parameters on agreed service level c14 for each set of integrated and synthesized work flow definitions c11, changes correspondingly to the compensation condition which is referred to in the compensation process.

A series of procedure accompanied with the activation of the simulation processing unit with compensation function 71 is corresponding to Steps S107 and S108 in FIG. 15.

Further, the group of parameters on the agreed service level, which is defined by a matrix which has the same form as the above mentioned formula (6) has, includes the compensation of delay time due to the simulation processing time, and the prediction accompanied with the feed forward type control. A method for compensating the delay time due to the simulation processing time and the prediction accompanied with the feed forward type control, and a definition of time base behavior will be described later by use of FIG. 22.

Afterward, the simulation processing unit with compensation function 71 executes repeatedly Steps S107 and S108 in FIG. 15 only p times (p is integer not smaller than 1) (Step S109). In the service provision quality control device, total number of prediction calculations by the simulation processing unit with compensation function 71 is a maximum of 2p at one sampling period of control. The prediction calculations are executed first p times successively in the step.

Afterward, a group of vector values c14', which has the same value as one of "group of vector values meaning group of parameters on agreed service level c14 for each set of integrated and synthesized work flow definitions c11" is outputted to the buffer unit 79 together with the time for use in a later evaluation process and then, managed and held. This is corresponding to Step S110 in FIG. 15.

Afterward, in order to evaluate the group of vector values c14, which means "the group of parameters on the agreed service level for each set of integrated and synthesized work flow definitions c11", the simulation processing unit with compensation function 71 sends a re-invoke command c15, which includes the group of vector values c14 as an argument and input, for activating the detecting unit 73 to the detecting unit 73.

The detecting unit 73 reads "group of vector values of group of target values on agreed service level c16" which is determined per plural service users and which the target state vector value managing unit 72 manages in advance, at the process of initializing after activation.

The group of vector values of group of target values on agreed service level c16 is composed of three main components. The first component is the group of vector values of the group of target values on the agreed service level. The second component is information corresponding to information on relative priority c62 which is inputted when the target state vector value managing unit 72 registers the group of vector values of group of target values on agreed service level c16 in the managing console 81. The third component is information corresponding relation information between groups of parameter values each of which composes the group of vector values of the group of target values on the agreed service level.

The formulated first component is given by the following formula (9).

[Definition 11]

$$\forall m(m \in N \wedge \text{name}^{-1}(m) \in CBP)^{\forall} j(j \in N); \Gamma^{Const}_{(j,m)} \in R \quad (9)$$

All component of the set of evaluation parameters, which have scalar quantity, of all work flows are given some designated evaluation value which is regarded not to be time variant but to be constant. This is defined as the target state vector value whose control target is the SLA information.

The second component, which is formulated by use of an arbitrary priority function pt (m), is given by the following formula (10).

[Definition 12]

$$\forall m(m \in N \wedge \text{name}^{-1}(m) \in CBP) \exists k \{k \in R \wedge (0 < k < 1)\}; pt(m) \to k \quad (10)$$

The third component, which is formulated by use of the priority function pp (j,m) between arbitrary parameters, is given by the following formula (11).

[Definition 13]

$$\forall m(m \in N \wedge \text{name}^{-1}(m) \in CBP)^{\forall} j(j \in N)^{\exists}$$
$$k\{k \in R \wedge (0<k<1)\}; pp(j,m) \to k \quad (11)$$

The detecting unit 73 calculates an eigenvalue of priority evaluation in advance on the basis of three components mentioned above.

With reference to FIG. 13, when the detecting unit 73 receives the re-invoke command c15 from the simulation processing unit with compensation function 71, the detecting unit 73 predicts and calculates a control deviation matrix newly on the basis of the eigenvalue of the priority evaluation (formula (9)), which is calculated on the basis of the group of vector values of group of target values on agreed service level c16, and the group of vector values c14 (formula (6)).

However, since the control deviation matrix includes a predicted value, a form of the formula (6) cannot be used simply, and the control deviation matrix is expressed by the predicted value which has the same form as the form of the formula (12). (notation (J) in the following means predicted value by use of compensation time Δt which means a time to compensate the simulation processing time.)

[Definition 14]

$$\overline{Dv_{(j,m)}}(t+\Delta t) = \begin{bmatrix} \frac{\Gamma_{(1,1)}(t+\Delta t) - \Gamma_{(1,1)}^{Const}}{|\Gamma_{(1,1)}^{Const}|} & \cdots & \frac{\Gamma_{(1,m)}(t+\Delta t) - \Gamma_{(1,m)}^{Const}}{|\Gamma_{(1,m)}^{Const}|} \\ \cdots & \cdots & \cdots \\ \frac{\Gamma_{(j,1)}(t+\Delta t) - \Gamma_{(j,1)}^{Const}}{|\Gamma_{(j,1)}^{Const}|} & \cdots & \frac{\Gamma_{(j,m)}(t+\Delta t) - \Gamma_{(j,m)}^{Const}}{|\Gamma_{(j,m)}^{Const}|} \end{bmatrix} \quad (12)$$

$$\overline{\Gamma_{(j,m)}(t+\Delta t)} \quad (J)$$

In the formula (12), the control deviation is expressed as a difference from the target value expressed by the formula (9). A special evaluation function is not used in the case of calculation of the control deviation. Definitions of various parameters are devised so as to enable to define the control deviation with a simple subtraction.

The control condition is judged based on the control deviation calculated by the formula (12) or the like. This is corresponding to Step S111 in FIG. 16. Since the procedure of Step 112 evaluates whether the group of vector values c14 is sufficient and exceeds all of the group of vector values of group of target values c16, the procedure is executed for every component of the group of vector values (Step S112).

Further, even if the group of vector values c14 is sufficient, the group of vector values c14 may not exceed all the group of vector values of group of target values c16 in some cases. In this case, it may be preferable, for example, to judge whether serious influence is caused, by use of relation information between the groups of parameter values which compose the group of vector values of group of target values on agreed service level c16.

In the case that after judgment on the control condition, it is found that the control deviation is not satisfactory or in the case that it is found that the control deviation was satisfactory previously but the control condition has not been changed, the detecting 73 makes the evaluation condition adjusting unit 74 activate (No in step S113). Further, in the case that the control deviation is not satisfactory, an output of Step S113 is [No] in FIG. 16. Moreover, in the case that the control deviation was satisfactory previously but the control condition has not been changed, the output of Step S113 is [Yes {control condition changing flag: not-set}] (Yes in step S113).

According to FIG. 13, the detecting unit 73 sends an invoke command c17 in order to activate the evaluation condition adjusting unit 74. When the detecting unit 73 sends the invoke command c17, the detecting unit 73 sends necessary information such as the eigenvalue of the priority evaluation which is expressed as the following formula (13), the prediction value of the compensation time, which is expressed as the above mentioned formula (12), for compensating the simulation processing time in the control deviation matrix, or the like as an argument. Further, before the sending of the invoke command c17, it is judged whether number of executions by the simulation processing unit with compensation function 71 within one sampling period for the control process is not smaller than a predetermined number. (Step S114).

[Definition 15]

$$Evp_{(j,m)} = \begin{bmatrix} pt_{(1)}pp_{(1,1)} & \cdots & pt_{(m)}pp_{(1,m)} \\ \cdots & \cdots & \cdots \\ pt_{(1)}pp_{(j,1)} & \cdots & pt_{(m)}pp_{(j,m)} \end{bmatrix} \quad (13)$$

In the case that the number of executions is not smaller than p (Yes in step S114) according to the result of the above-mentioned judgment, the operation is regarded as failure. As a result, the operation returns to a state in which the control condition is not changed as described in Step S115 in FIG. 16 and then, an alarm c91 is sent to execute Step S116 in FIG. 16.

On the other hand, in the case that the number of executions by the simulation processing unit with compensation function 71 is not larger than p (No in step S114) and the evaluation condition adjusting unit 74 is activated through receiving the invoke command c17, the control operation starts. The evaluation condition adjusting unit 74 executes a process corresponding to Step S117 in FIG. 16 on the basis of a procedure shown in FIG. 18.

A process in Step S117 will be described in detail in the following.

The evaluation condition adjusting unit 74 extracts and reads data on matrix value (matrix value defined by the above-mentioned formula (7)) which is calculated number of calling service definition c82 on the basis of the integrated and synthesized work flow definition and the list of all work flow definitions and service definitions, from the meta-data managing unit 66. This is corresponding to Step S201 in FIG. 18.

Moreover, the evaluation condition adjusting unit 74 obtains the predicted value of the compensation in time of simulation, which the detecting unit 73 designates as the argument when the detecting unit 73 sends the invoke command c17 and which is used in the control deviation matrix expressed as the formula (12). This is corresponding to Step S202 in FIG. 18.

Moreover, the evaluation condition adjusting unit 74 obtains the eigenvalue of the priority evaluation, which is expressed as the formula (13) and which the detecting unit 73 designates as the argument when the detecting unit 73 sends the invoke command c17. Since the formula (13) piles up evaluations, the formula (13) is calculated by a simple product of the formula (10) and the formula (11) here. This is corresponding to Step S203 in FIG. 18.

It is necessary to overlook a whole evaluation of the integrated process whose level is the integrated and synthesized work flow definition level so that the evaluation condition adjusting unit 74 may select the control operation object. This is expressed as the following formula (14), where t is an arbitrary time.

[Definition 16]

$$E_{(m,m)} \text{Evp}^T(j,m) \overline{Dv_{(j,m)}}(t+\Delta t) \tag{14}$$

The formula (14) includes product of a transposed matrix given by the formula (13) with a special matrix which has the Kronecker's δ(u,v) function expressed as the following formula (15). In the case of a diagonal component of a new matrix which is generated by the calculation, value of the special matrix is 1. In the other case, value of the special matrix is 0. As a result, a deviation vector, which has real number and for which evaluation of the integration process has been executed, at the arbitrary time t can be defined as the following formula (16) through extracting the diagonal component of the generated (m, m) matrix. Further, the deviation matrix applies a predicted value deviation matrix (formula (12)).

[Definition 17]

$$E_{(m,m)} = \begin{bmatrix} \delta_{(u,v)} & \cdots & 0 \\ \cdots & \cdots & \cdots \\ 0 & \cdots & \delta_{(u,v)} \end{bmatrix} \tag{15}$$

$(u, v \in N \wedge 1 \leq u, v \leq m)$

[Definition 18]

$$\exists_{t} \exists \Delta t (t \in R, t_0 \leq t, \Delta t \in R), \overline{dv_1(t+\Delta t)}, \tag{16}$$
$$\overline{dv_2(t+\Delta t)} \ldots \overline{dv_m(t+\Delta t)} \in R;$$
$$\overrightarrow{dv(t+\Delta t)} = \{\overline{dv_1(t+\Delta t)}, \overline{dv_2(t+\Delta t)} \ldots \overline{dv_m(t+\Delta t)}\}$$

As a result, the evaluation condition adjusting unit 74 can predict degree of influence of the service, which is caused at the compensated arbitrary time t+Δt, on the basis of the above-mentioned formula (16) and the formula (7). This is corresponding to Step S204 in FIG. 18.

Moreover, in order to evaluate evaluation sensitivity and bottleneck, the evaluation condition adjusting unit 74 extracts corresponding measurement statistic data c83 which is managed by the performance data managing unit 68. This is corresponding to Step S205 in FIG. 18.

Afterward, the evaluation condition adjusting unit 74 calculates modeling of the degree of influence of service according to the following formula (17) on the basis of an evaluation completing deviation vector (the formula (16)) and a matrix value (the formula (7)) which is calculation result on number of calls. This is corresponding to Step S206 in FIG. 18.

[Definition 19]

$$\overrightarrow{Evs(t+\Delta t)} = D_{(s_n,m)} \overrightarrow{dv(t+\Delta t)} \tag{17}$$

Afterward, the evaluation condition adjusting unit 74 defines a linear combination type evaluation formula expressed as the following formula (18) on the basis of the modeling of the degree of influence of service, which is calculated by the formula (17), and the measurement statistic data c83. While the degree of influence of service is predicted from a point of the whole process view, the prediction may not be proper from a point of sensitivity and bottleneck view in some cases. Accordingly, a parameter, which is a proper scalar quantity and which means a bottleneck, is selected from the formula (5) and expressed by the formula (18) as a vector on the terminal service. A weighting parameter of the linear combination, which is measured and designated at a time when calibration is executed before execution of the control, is the eigenvalue or an object parameter, which will be described later, at a time for the autonomous adjustment. This is corresponding to Step S207 in FIG. 18.

[Definition 20]

$$\forall_{t(t \in R, t_0 \leq t)} \forall_s (s \in S)^{\exists \Delta t}(\Delta t \in R); k_1 \overrightarrow{\gamma(t+\Delta t)} + k_2 \overrightarrow{Evs(t+\Delta t)} \tag{18}$$

Afterward, the evaluation condition adjusting unit 74 defines a non-linear mapping to rearrange order in a certain order. Then, the evaluation condition adjusting unit 74 compares components of the evaluation formula (18), which is expressed as the vector value of the service, and executes the service evaluation through mutual comparison or the like.

It may be preferable that a method for the mutual comparison applies a method of sorting based on magnitude of scalar quantity through regarding the vector component of the evaluation formula to be scalar quantity. By the above mention, the evaluation condition adjusting unit 74 specifies a service which should be control operation object. This is corresponding to Step S208 in FIG. 18.

Then, the evaluation condition adjusting unit 74 selects and designates a service which is a candidate for the operation object. This is corresponding to Step S209 in FIG. 18. By the above mention, the evaluation condition adjusting unit 74 completes the procedure for selecting the control operation object (Step S210).

Afterward, the evaluation condition adjusting unit 74 executes a process corresponding to Step S118 in FIG. 16. The process is to make a tentative operation condition severe through storing past records of the tentative amount of operation, which should be added, per failure until success, and designating the tentative amount of operation which should be added furthermore when the tentative operation fails, in the case that the evaluation condition adjusting unit 74 executes the evaluation p times by use of the simulation processing unit with compensation function 71 in order to determine an appropriate amount of operation. Here, information on a position of the service, to which the tentative operation is executed, is also read.

Afterward, the evaluation condition adjusting unit 74 executes a process corresponding to Step S119 in FIG. 16. FIGS. 19 to 21 are flowcharts showing details of the process. In order to obtain order of the execution of control operation and the evaluation function for control operation, the evaluation condition adjusting unit 74 obtains policy definition information for control operation c19 from the policy description managing unit 75.

Afterward, when the evaluation condition adjusting unit 74 starts the process from Step S301 in FIG. 19, the evaluation condition adjusting unit 74 obtains the information, which is grasped at Step S118 in FIG. 16, on the position of service to which the tentative operation is executed. This is selected among the group of services of the operation object which are specified in Step S208 in FIG. 18. This operation is corresponding to Step S302 in FIG. 19.

Afterward, the evaluation condition adjusting unit 74 judges whether there is any designation, which is designated at Step S118 in FIG. 16, on the amount of operation which has been executed already (Step S303). In the case of the first operation (No in Step S303), since the designation on the amount of operation, which has been executed already, does not exist in particular, the process advances towards the condition judgment on the control deviation (Step S307), which is a next step, by the detecting unit in Step S111 in FIG. 16.

On the other hand, in the case that the operation has been executed plural times (Yes in step S303), the evaluation condition adjusting unit 74 determines an applicable operation following the operation condition which has been executed (Step S304). This determination is executed on the basis of the policy definition information for control operation c19.

Here, in the case that there is the applicable operation to be executed next (existence in Step S304), the evaluation condition adjusting unit 74 advances the process towards the condition judgment on the control deviation, which is corresponding to a next judgment, by the detecting unit in Step S111 in FIG. 16 (Step S307).

On the other hand, in the case that there is no applicable operation even if position of the service, which has been already operated tentatively, is changed (no existence in Step S304), the process advances towards Step S305 in FIG. 19. While the designation on the amount of operation does not exist in this state, there is a possibility that there exists an applicable operation according to the result on the prediction calculation by one time simulation and on the judgment of the control condition by the detecting unit 73. Consequently, the evaluation condition adjusting unit 74 sends an alarm c84 in order to execute Step S305 in FIG. 19. Afterward, the evaluation condition adjusting unit 74 advances the process to Step S306 in FIG. 19 and completes to set a series of the tentative amount of setting for the group of control apparatus units.

In the case that there is the applicable operation following the operation condition which has been already executed, the evaluation condition adjusting unit 74 judges whether the control deviation is satisfactory in the condition judgment of the control deviation by the detecting unit in Step S111 in FIG. 16 (Step S307).

In the case that the control deviation is not satisfactory (No in step S307), the evaluation condition adjusting unit 74 selects [NO], and judges whether the judgment is executed through giving priority to the policy definition information for control operation c19 over a default designation as a next judgment (Step S312). Further, meaning of the default designation will be described latter. In the case of giving priority (Yes in step S312), [YES] is selected so that the process may advance towards Step S313 in FIG. 20. On the other hand, in the case of not giving priority (No in step S312), [NO] is selected so that the process may advance towards Step S315 in FIG. 20.

In the case that it is judged whether the control deviation is satisfactory in the condition judgment of the control deviation by the detecting unit 73 in Step S111 in FIG. 16 and consequently, if it is found that the control deviation is satisfactory, [YES] is selected (Yes in step S307), and moreover, to judge whether the condition judgment is executed through giving priority to the policy definition information for control operation c19 over the default designation as a next judgment (Step S308). In the case of giving priority (Yes in step S308), [YES] is selected so that the process advances towards Step S309 in FIG. 19. On the other hand, in the case of not giving priority (No in step S308), [NO] is selected so that the process advances towards Step S322 in FIG. 22.

In the case that the control deviation is satisfactory in the condition judgment of the control deviation by the detecting unit in Step S111 in FIG. 16 (Yes in Step S307), the execution environment is quite sufficient. Accordingly, it is necessary to judge whether it is possible to execute more efficient service execution. Therefore, it is evaluated whether it is possible to execute efficient usage of resources through reducing CPU resource, and memory resource or the like of the service execution processing system.

Here, there are at least four kinds of operation methods for the control operation.

A first operation method relates to a resource operation such as addition of the CPU resource and the memory resource of the service execution processing system. This is called "control operation method by resource operation". Specifically, when the environment of the work flow system 1 in FIG. 12 receives the control message c50, evaluation on the activation and suspension of the work flow engines 29 and 29' is executed, and the control command c53 for controlling the activation and suspension of the work flow engines 29 on the basis of the necessity, the change of contents of the process, or the like is sent, and the command c54 for controlling the activation and suspension of the work flow engines 29' on the basis of the necessity, the change of contents of the process, or the like is sent together with the command c53, according to the operation method.

A second operation method relates to execution of restraining the messages in the service execution processing system and particularly, relates to the execution of restraining the messages on the basis of rectification of the group of service processes which are at an upper position side than a process which is in a bottleneck. This is called "control operation method by rectification to cope with restriction". Specifically, when the proxy unit 35 receives an arbitrary message, the received arbitrary message is restrained temporarily by the input restraining unit 57 and stored in the queue managing unit 58 on the basis of contents of the arbitrary message, before a corresponding message is sent, according to the operation method.

A third operation method is to discard resources such as the CPU resource and the memory resource of the service execution processing system through discarding compulsively a service, which is in an execution state, within the agreement. Specifically, when the proxy unit 35 receives an arbitrary message, the received arbitrary message is restrained temporarily by the input restraining unit 57 and discarded compulsively by the compulsive discard unit 56, before a corresponding message is sent, according to contents of message. The specific process mentioned above is called "control operation method by compulsive discard".

A fourth operation method is to change order of calling the terminal services dynamically so as to satisfy the group of vector values of group of target values on agreed service level c16. A specific example of the method is realized through changing the call order and re-distributing the changed call order and consequently, enabling simultaneous executions of definition of calling the terminal service at a stage that the integrated and synthesized work flow is defined. This is called "control operation method by rearrangement".

The above-mentioned default designation means designation in the first, the second and the third operation methods, which are formed like Step S317, Step S321, Step S319, Step S320, Step S324 and Step S325 in FIG. 20 and FIG. 21, among four kinds of above-mentioned operation methods.

In contrast, the policy definition information for control operation c19 is defined as an arbitrary evaluation function which includes four kinds of the operation methods mentioned above. In the case that priority [YES], which means to give priority to the policy definition information for control operation c19, is selected in a step in which it is judged whether the condition judgment is executed through giving priority to the policy definition information for control operation c19 over the default designation, and the process advances towards Steps S313 and S314 in FIG. 20, the first, the second and the third operation methods among four kinds of above-mentioned operation methods are executed as well as the case of the default designation. Furthermore, if there is more efficient operation method, it is possible to use the operation method.

When the process advances towards Step S313 in FIG. 20, the amount of operation, which has been executed and which is grasped in the Step S118 in FIG. 16, is judged on the basis of the policy definition information for control operation c19. Afterward, a next operation is specified with another reference to the policy definition information for control operation c19, and the process advances towards Step 314 in FIG. 20.

When the process advances towards Step S309 in FIG. 19, the amount of operation, which has been executed already and which is grasped in the Step S118 in FIG. 16, is judged on the basis of the policy definition information for control operation c19. Afterward, a next operation is specified with another reference to the policy definition information for control operation c19, and the process advances towards Step 310 in FIG. 19.

In the case that the control deviation is not satisfactory in the condition judgment of the control deviation by the detecting unit 73 in Step S111 in FIG. 16 (No in Step S307), and priority is given not to the policy definition information for control operation c19 but to the default designation (No in step S312), the evaluation condition adjusting unit 74 advances the process to Step S315 in FIG. 20.

When the process advances towards Step S315, the amount of operation, which has been executed already and which is grasped in the Step 118 in FIG. 16, is judged on the basis of the policy definition information for control operation c19. Afterward, information on the next operation and on the position of service, to which the tentative operation is executed, is also judged, with another reference to the policy definition information for control operation c19.

In the case of the default designation, it is judged whether it is possible to reduce number of processed services per work flow engine from a point of configuration view through increasing numbers of work flow engines which communicate with the service to which the tentative operation is executed and related process systems (Step S316). Here, in the case that it is possible to increase the numbers of work flow engines and related process systems (Yes in step S316), [YES] is selected to advance towards Step S317 in FIG. 20.

In the case that it is impossible to increase the numbers of work flow engines which communicate with the service to which the tentative operation is executed and related process systems (No in step S316), [No] is selected to execute a judgment on a restraining operation (Step S316). The restraining operation is corresponding to the second operation method "control operation method by rectification to cope with restriction in four kinds of above-mentioned operation methods"

In the judgment on the restraining operation, in the case that the restraining operation has not been executed yet to the service which the tentative operation should be executed (No in step S318), [NO] is selected firstly in order to execute the restraining operation with priority, and then, the process advances towards Step S321. Since the restraining operation firstly restrains from inputting message to service execution processing system, discard of messages or the like is not executed and therefore, the restraining operation is so safe that the restraining operation is executed with priority.

Moreover, in the judgment on the restraining operation, in the case that the restraining operation has been executed already to the service which the tentative operation should be executed (Yes in step S318), [Yes] is selected in order to execute a compulsive discard operation since further restraining operation is judged to be not effective, and the process advances towards Step S319 in FIG. 20. Here, the compulsive discard operation is corresponding to the third operation method "control operation method by compulsive discard" in four kinds of above-mentioned operation methods.

In the case that the control deviation is satisfactory in the condition judgment of the control deviation by the detecting unit 73 in Step S111 in FIG. 16 (Yes in Step S307) and priority is given not to the policy definition information for control operation c19 but to the default designation (No in step S308), the evaluation condition adjusting unit 74 advances the process towards Step S322 in FIG. 21.

When the process advances towards Step S322, the amount of operation, which has been executed and which is grasped in the Step 118 in FIG. 16, is judged on the basis of the policy definition information for control operation c19. Afterward, information on the next operation and the position of service, to which the tentative operation is executed, is also judged, with another reference to the policy definition information for control operation c19.

The execution environment is quite sufficient in Step S322 as mentioned above. Therefore, in the case of the default designation, it is judged whether it is possible to make numbers of processed services per work flow engine to be efficient from configuration through decreasing numbers of work flow engines which communicate with the service to which the tentative operation is executed, and number of related process systems (Step S323). Here, in the case that it is possible to decrease the numbers (Yes in step S323), [YES] is selected and the process advances towards Step S324 in FIG. 21.

In the case that it is impossible to decrease the numbers of work flow engines which communicate with the service to which the tentative operation is executed and related process systems (No in step S323), [No] is selected and the process advances towards Step S325 in FIG. 21.

In Step S314 in FIG. 20, the evaluation condition adjusting unit 74 designates a next operation, which is designated by the policy definition information for control operation c19, and adds description on the tentative amount of operation, which should be added, to tentative control operation list designating information c21. Afterward, the operation advances towards Step S311 in FIG. 19.

In Step S321 in FIG. 20, the evaluation condition adjusting unit 74 designates the restraining operation in order to execute to restrain the message from being inputted into the service execution processing system to which the tentative operation should be executed. In that case, restraining time, ratio related to the restraining or the like, which are parameters of the restraining operation, is determined on the basis of an arbitrary evaluation function. Afterward, the evaluation condition adjusting unit 74 adds description on the tentative amount of operation, which should be added, to the tentative control operation list designating information c21. Afterward, the process advances towards Step S311 in FIG. 19.

In Step S319 in FIG. 20, the evaluation condition adjusting unit 74 designates the compulsive discard operation in order to execute the compulsive discard operation to the service to which the tentative operation should be executed. In that case, a parameter such as allowable number of the compulsive discards or the like is determined on the basis of an arbitrary evaluation function. Afterward, the evaluation condition adjusting unit 74 adds description on the tentative amount of operation, which should be added, to the tentative control operation list designating information c21. Afterward, the operation advances towards Step S311 in FIG. 19.

In Step S320 in FIG. 20, the evaluation condition adjusting unit 74 estimates a compensation work due to the compulsive discard operation.

Afterward, the evaluation condition adjusting unit 74 adds a simulation condition as description on the tentative a mount of operation, which should be added, to the tentative control operation list designating information c21 as description on the tentative amount of operation which should be added. Afterward, the process advances towards Step S311 in FIG. 19.

In Step S310 in FIG. 19, the evaluation condition adjusting unit 74 designates a next operation, which is designated by the policy definition information for control operation c19, and adds description on the tentative amount of operation, which should be added, to the tentative control operation list designating information c21. Afterward, the process advances towards Step S311 in FIG. 19.

In Step S324 in FIG. 21, the evaluation condition adjusting unit 74 designates an operation to decrease numbers of the work flow engines which communicate with the service to which the tentative operation is executed, and the related process systems. In that case, the numbers of work flow engines and related process systems process are determined on the basis of an arbitrary evaluation function. Afterward, the evaluation condition adjusting unit 74 adds description on the tentative amount of operation, which should be added, to the tentative control operation list designating information c21. Afterward, the process advances towards Step S311 in FIG. 19.

In Step S325 of FIG. 21, the evaluation condition adjusting unit 74 designates an operation for releasing the restraint on arrival rate to the designated service in order to change the restraint on inputting the messages in the service execution processing system to which the tentative operation should be executed. In that case, an evaluation on the release operation is executed on the basis of an arbitrary function and then, contents of the release operation are determined. Since the rectification collapses by releasing the restraint, there is a possibility that service position of the bottleneck may change. However, through releasing the unnecessary restraint, it is possible to increase relatively available capacity of the work flow engine, which communicates with the service to which the tentative operation should be executed, and the related process system.

Afterward, the evaluation condition adjusting unit 74 adds description on the tentative amount of operation, which should be changed or released, to the tentative control operation list designating information c21. Afterward, the process advances towards Step S311 in FIG. 19.

In Step S311 in FIG. 19, information, which is updated on the basis of the results of the processes of Steps S314, S317, S321, S319, S320, S310, S324 and S325, on a position of the tentatively operated service is added to the tentative control operation list designating information c21. Afterward, the process advances towards Step S306.

In Step S306 in FIG. 19, in the case that iteration number of evaluations which has been executed already does not reach to p, the evaluation condition adjusting unit 74 executes the time compensation and afterward, sends a re-invoke command c20, to which the tentative control operation list designating information c21 is added as an argument, for activating the simulation processing unit with compensation function c71, in order to execute a next evaluation. As a result, a process corresponding to Step S119 in FIG. 16 is completed.

Afterward, the evaluation condition adjusting unit 74 stores internally information, which is corresponding to the tentative control operation list designating information c21, in Step S120 in FIG. 16. As a result, a record of the tentative mount of operation, which has been added, and a record of the position of the service, to which the tentative operation has been executed, are stored every time in order to determine a proper amount of operation, in the case that p times evaluations are executed by use of the simulation processing unit with compensation function 71. Consequently, it is possible to specify the designation of the amount of operation which has been executed already and which is grasped in Step S118 in FIG. 16.

Afterward, the evaluation condition adjusting unit 74 sets a control condition changing flag in Step S121 in FIG. 16 in order to indicate that the control condition has been changed. Then, the evaluation condition adjusting unit 74 completes the process.

When the simulation processing unit 71 with compensation function 71 is activated by the re-invoke command c20, the simulation processing unit 71 with compensation function 71 inherits "state matrix at sampling time c8", "state matrix at time previous to sampling time by one sampling period c9", "set of definition information c10 which defines all component work flows calling service, and which defines the relation between the group of services and the group of component work flow corresponding to the workflow definitions 31, 34 and 39, and which is corresponding to the set of definition information c3", and "set of integrated and synthesized work flow definition c11 which is corresponding to list of integrated and synthesized work flow definition c2" which have been given already as the argument, and furthermore, refers to "tentative control operation list designating information c21".

Moreover, the simulation processing unit with compensation function 71 obtains the policy definition information for control operation c13, which is reference information of the tentative control operation list designating information c21 and which the policy description managing unit 75 manages, on the basis of necessity.

Afterward, the simulation processing unit with compensation function 71 applies Step S122 in FIG. 16 to all the integrated and synthesized work flow definitions on the basis of the set of integrated and synthesized work flow definition c11 which is corresponding to the list of integrated and synthesized work flow definition c2.

As a result, a matrix expressed as the following formula (19) is obtained. This formula is obtained through making $\gamma(I,s)(t+\Delta t1)$, which is corresponding to matrix expression of the set of all observable services (symbol (A) mentioned above) which compose a set of selection parameters each of which has scalar value at the compensated time $t+\Delta t1$ and is observable (strictly, "measurable"), fluctuated intentionally according to a certain policy and through executing non-linear mapping identical to the formula (6). Then, this means that components of all evaluation parameter sets (scalar quantity) and components of all process definitions sets (symbol (I) mentioned above) have real prediction number. In the case, since the time compensation value changes as mentioned later in FIG. 20, the time compensation value is time $t+\Delta t2$. Further, an identifier C means an evaluation after the control operation.

[Definition 21]

$$\forall t(t \in R, t_0 \le t) \forall j(j \in N) \forall m(m \in N \wedge \text{name}^{-1}(m) \in CBP)^{\exists} \Delta t_2$$
$$(\Delta t_2 \in R); \Gamma^C_{(j,m)}(t+\Delta t_2) \in R \quad (19)$$

Afterward, in order to re-evaluate group of vector values c14 meaning "group of parameters on agreed service level for each set of integrated and synthesized work flow definitions c11" which are re-calculated on the basis of the tentative control operation list designating information c21, the re-invoke command c15, which activates the detecting unit 73 and includes the group of vector values c14 as an argument and input, is re-sent (Yes in step S123).

In an initializing process after the activation, the detecting unit 73 reads in advance "group of vector values of group of target values on agreed service level c16", which is agreed per plural service users, from the target state vector value managing unit 72 similarly to the last time. Then, the detecting unit 73 calculates a new control deviation matrix and judges a control condition on the basis of the new control deviation similarly to the last time. This is corresponding to a loop which returns the process to Step S111 in FIG. 16.

In the case that, after the detecting unit 73 judges the control condition on the basis of the tentative control operation list designating information c21, it is found that the control deviation is satisfactory and the control condition has been changed (Yes in step S113), the detecting unit 73 activates the adjustment operating unit 76 instead of activating the evaluation condition adjusting unit 74. In FIG. 13, the detecting unit 73 sends an invoke command c18 in order to activate the adjustment operating unit 76. In this case, [YES {control condition changing flag set}] is designated in FIG. 16.

In order to issue an instruction on the actual amount of operation to the group of various control apparatus units after the activation, the adjustment operating unit 76 reads tentative control operation list designating information c22, which the evaluation condition adjusting unit 74 holds internally and which is corresponding to the tentative control operation list designating information c21, and fixes the tentative control operation list designating information c22. After converting the tentative control operation list designating information c22 into a control message, which handles the actual amount of operation, or the like, the adjustment operating unit 76 sends the converted message. This is corresponding to Step S124 in FIG. 16.

Afterward, since a series of process is complete, the adjustment operating unit 76 resets the control condition changing flag in Step S125 in FIG. 16 and returns the process to the initial state. Then, the adjustment operating unit 76 completes the process.

Afterward, when the group of various control apparatus units receives the control message, the group of various control apparatus units executes the actual control operation in Step S126 in FIG. 16.

As a specific example of the control message, the control message c52 which is sent to the input restraining unit 51 of the operation proxy 48, the control message c56 which is sent to the input restraining unit 57 of the proxy unit 35, or the like is exemplified, in the case of the restraining operation designated in Step S321 in FIG. 20. The control messages c52 and c56 designate a kind of group of process request messages for restraining, a specification of a kind of group of process response messages for restraining, metrics which expresses quantitative degree of restraining, or the like. When the control message c52 or c56 is received, the actual control operation is executed.

As another specific example of the control message, the control message c51 which is sent to the compulsive discard unit 50 of the operation proxy 48, the control message c55 which is sent to the compulsive discard unit 56 of the proxy unit 35, or the like is exemplified, in the case of the compulsive discard operation designated in Step S319 in FIG. 20.

The control messages c51 and c55 designate a kind of group of process request messages for discarding, a specification of a kind of group of process response messages for discarding, metrics which express quantitative degree such as discard rate, or the like is exemplified. When the control message c51 or c55 is received, the actual control operation is executed.

As further another specific example of the control message, the control message c50 which is sent to the environment of the work flow system 1 is exemplified, in the case of the operation for increasing and decreasing number of the work flow engines and the related process systems which are designated in Step S317 in FIG. 20.

When the environment of the work flow system 1 receives the control message c50, the environment of the work flow system 1 executes evaluation on the activation and suspension of the work flow engines 29 and 29' and sends the control command c53 for controlling the activation and suspension of the work flow engines 29, the change of contents of the process, or the like on the basis of necessity, and sends the command c54 for controlling the activation and suspension of the work flow engines 29'; the change of contents of the process, or the like together with the command c53 on the basis of necessity.

Afterward, the process of the service provision quality control device based on the agreed service level is returned to a point just after Step S101 in FIG. 15. The processes, which are executed in this period, are executed in one sampling period for the digital control.

<Explanation of Operation Executed at a Time of an Autonomous Adjustment According to the Most Preferable Embodiment of the Invention>

In FIG. 13, the activation control unit 69 activates a long-term compensation process, which is one of autonomous adjustments, in order to maintain correctly a group of fixed parameter values to which the simulation processing unit with compensation function 71 refers at a stage for predicting and evaluating the group of vector values on state of the agreed service level, which is agreed per plural service users, at the designated point of time.

The activation control unit 69 sends an invoke command c23 to activate the measured state vector value processing unit 77 for the long-term compensation process. This process is corresponding to Step S401 in FIG. 15 which is executed in reply to the completion of Step S104 in FIG. 15. This process is executed together with processes in FIG. 13. Further, a procedure 21 may not always be activated in every sampling period, and may be activated once in a plurality of sampling periods.

In FIG. 13, the measured state vector value processing unit 77 calculates a group of measured vector values corresponding to the group of vector values, which the simulation processing unit with compensation function 71 predicts and evaluates, on the states of the agreed service level on the basis of all event data or arbitrary valid event data, which are stored in the event and statistics storing DB65, through going back to the past of all event data or arbitrary valid event data.

In order to execute the process mentioned above, when the measured state vector value processing unit 77 receives the invoke command 23, the measured state vector value processing unit 77 obtains a list of integrated and synthesized work flow definitions c24 which the meta-data managing unit 66 manages on a memory, and a set of definition information of all work flow definitions and service definitions c25 which is source information for generating each of list c24.

Moreover, the measured state vector value processing unit 77 obtains the current values, the accumulated values and average values, or the like of plural groups of parameters which the performance data managing unit 68 manages on a memory. For example, a calculation result on the parameter 1 at the current point of time, and an accumulated value and average value on parameter 1 up to current point of time c26, and a calculation result on the parameter 2 at the current point of time, and an accumulated value and average value of parameter 2 up to current point of time C27 are exemplified.

Moreover, the measured state vector value processing unit 77 retrieves the event and statistics storing DB65 on the basis of the list of integrated and synthesized work flow definitions c24 and the set of definition information of all work flow definitions and service definitions c25 which are source information for generating each of list c24 and obtains related all event data c85. After calculating a group of parameters corresponding to the list of integrated and synthesized work flow definition c24 through going back to the past of all event data c85, the measured state vector value processing unit 77 converts the calculated group of parameters into a group of measured vector values on state of agreed service level c86.

The group of measured vector values on state of agreed service level c86 is different from the group of vector values, which the simulation processing unit with compensation function 71 predicts and evaluates at the designated point of time, on state of the agreed service level which is agreed per plural service users. The group of measured vector values on state of agreed service level c86 means a group of measured vector values which is obtained with another arbitrary method.

Afterward, the measured state vector value processing unit 77 records and holds the group of measured vector values on state of agreed service level c86. This is corresponding to Step S402 in FIG. 17.

Afterward, the measured state vector value processing unit 77 sends an invoke command c28 to activate the long-term compensation detecting unit 78. When the long-term compensation detecting unit 78 is activated, information corresponding to the group of measured vector values c86 is provided as a group of measured vector values c29 which is an argument embedded in the activation command c28. This is corresponding to Step S403 in FIG. 17.

The long-term compensation detecting unit 78 compares the group of measured vector values c29 corresponding to the group of measured vector values on state of agreed service level c86 which the measured state vector value processing unit 77 manages, with the group of vector values, which the buffer unit 79 holds and which the simulation processing unit with compensation function 71 predicts and evaluates, on state of agreed service level which is agreed per plural service users.

The long-term compensation detecting unit 78 obtains a group of vector values meaning group of parameters on agreed service level c30 from the buffer unit 79. The group of vector values c30 has contents identical to ones of group of vector values meaning group of parameters on agreed service level c14' for each of the set of integrated and synthesized work flow definition c11. This is corresponding to Step 404, which is executed after completion of Step S110 in FIG. 13, in FIG. 17.

Afterward, the long-term compensation detecting unit 78 compares the group of measured vector values c29 and the group of vector values meaning group of parameters on agreed service level c30. Consequently, in the case that an identification parameter of the policy definition information for control operation c19, which is managed by the policy description management unit 75 and is recorded as an arbitrary function including four operation methods according to the comparison result, the compensation condition formula, or the like is caused difference due to change dependent on passage of time, the long-term compensation detecting unit 78 sends a policy description updating command c31 and a compensation condition formula updating command c32 to the policy description managing unit 75.

This is corresponding to the weighting parameter of the linear combination which is designated by the above mentioned formula (18), or the like.

When the policy description managing unit 75 receives the policy description updating command c31 or the compensation condition formula updating command c32, the policy description managing unit 75 updates and maintains the identification parameter on the policy definition information for control operation c19, the compensation condition formula, or the like. By the above mention, it is possible to maintain a predetermined accuracy of the prediction and evaluation executed by the simulation processing unit with compensation function 71. This is corresponding to Step S405 in FIG. 17.

As mentioned above, the long-term compensation process, which the activation control unit 69 activates and the long-term compensation process detecting unit 78 executes, is completed.

<Explanation on Operation Executed at a Time of Initial Setting and at a Time of Setting According to the Most Preferable Exemplary Embodiment of the Invention>

An operation, which is executed at a time of initial setting and at a time of setting of the service provision quality control device based on the agreed service level, will be described specifically by use of FIGS. 12 and 13 in the following according to the exemplary embodiment of the present invention.

The monitor system 5 includes the execution condition designating unit 80 managing various execution conditions and various groups of parameter values which are referred to operate the service provision quality control device. The execution condition designating unit 80 manages a series of parameters such as the sampling period for activation control unit 69 which executes the digital control or the like, and address information or the like.

In the case of updating the parameters, which the execution condition designating unit 80 manages, by use of the managing console 81, an invoke command c65 is sent to the execution condition designating unit 80. The invoke command c65 designates the import to update the parameters of contents of command, a group of parameter names to be updated, a group of parameter values c66 to be updated or the like. A result of the update is managed by the execution condition designating unit 80, and is displayed on the managing console 81.

In the case of checking the parameter, which the execution condition designating unit 80 manages, by use of the managing console 81, the invoke command c65 is sent to the execution condition designating unit 80. The invoke command c65 designates the import to retrieve a group of parameters of contents of command, a group of parameter names to be retrieved, and a response form designating information c67. A result of the retrieving is displayed on the managing console 81.

The group of target values, which should be realized by the service provision control device and, which are related to the agreed service level which is decided per plural service users, is managed as the group of vector values by the target state vector value managing unit 72. This is a part of so called SLA.

The group of vector values of the group of target values on the agreed service level has the same structure as the group of vector values of group of target values on agreed service level c16 has, and is composed of three main components.

The first component is just the group of vector values of the group of target values on the agreed service level. The second component is corresponding to information on relative priority. The third component is corresponding to relative information between the groups of parameter values each of which composes the group of vector values of group of target values on the agreed service level.

In the case of updating the parameters, which the target state vector value managing unit 72 manages, by use of the managing console 81, an invoke command c64 is sent to the target state vector value managing unit 72. A result of the update is managed by the target state vector value managing unit 72, and is displayed on the managing console 81.

The invoke command c64 includes a group of vector values of group of target values on agreed service level c63, specific information c87 on c63, or the like as an argument. In this case, the specific information c87 is corresponding to the integrated and synthesized work flow definition m73 which is managed by the meta-data managing unit 66, and all work flow definitions and service definition information which are source information for generating the integrated and synthesized work flow definition m73.

The argument of the invoke command c64 includes the information on relative priority c62 which is associated with the specific information c87 and which is related to the integrated and synthesized work flow designated by the specific information c87 and is related to other work flow and other service, and the relative information between groups of parameter values c88 which compose the group of vector values of group of target values on agreed service level c63 associated with the specific information c87.

In the case of retrieving the parameter, which the target state vector managing unit 72 manages, by use of the managing console 81, an invoke command c89 is sent to the target state vector managing unit 72.

The invoke command c89 includes the specific information c87 and response form designating information c90 which designates a form of response to the specific information c87 as an argument. A result of the retrieving is displayed on the managing console 81.

Contents of control, which should be realized by the service provision quality control device, are managed by the policy description managing unit 75, and include four kinds of operation methods. The contents of control are defined as the policy definition information for control operation c19 and expressed by the identification parameter, the compensation condition formula, or the like in the policy description managing unit 75. It is necessary that initial control data for the service provision quality control device is designated from outside.

In the case of updating the initial control data, which is managed by the policy description managing unit 75, by use of the managing console 81, an invoke command c60 is sent to the policy description managing unit 75. The invoke command 60 includes a group of designated parameter values c61 as an argument. A result of the update is managed by the policy description managing unit 75, and is displayed on the managing console 81.

<Explanation of Control Method>

FIG. 23 show a configuration including function modules each of which executes a control method for realizing service provision quality control on the basis of the agreed service level according to the exemplary embodiment of the present invention.

The function modules, which execute the control method, include a control object 200 such as service provision quality, agreed service level which is agreed per plural service users or the like, a control apparatus unit 223 which operates control and maintenance for the control object 200 through executing an actually determined operation, a measurement statistic data calculating unit 203 calculating various groups of measurement statistic to express physical phenomena, which are measurable with only statistical process and without prediction by use of simulation, out of physical phenomena on the controlled object 200 of traffic of message per unit time or the like, a meta-data managing unit 201 managing a formal meaning on an event which means a physical phenomenon or the like, a measurement control quantity data managing unit 204 managing all occurred events which are associated each other, and a performance data managing unit 202 which manages a calculation result on the group of measurement statistic in order to use the calculation result in the following calculation.

The function modules, which execute the control method, include furthermore an activation control unit 205 which designates the sampling period in order to execute digital control and then, activates various modules, and a state observing unit 206 which obtains various information from the performance data managing unit 202 and calculates and holds a group of vector values of group of measurement statistic, which is measured at the latest sampling time for the digital control, as a current state vector value 207, and a group of vector values of group of measurement statistic, which is measured at a time previous to the sampling time by one sampling period, as a past state vector value 208 in order to predict a state of the control object 200 at an arbitrary point of time.

The function modules, which execute the control method, include furthermore a simulation processing unit with compensation function 211 which determines tentatively an amount of operation to provide various control apparatus units 223 mentioned later on the basis of a target state vector value 216 expressing a group of target values on the control target of the control object 200 by a group of vector values, the current state vector value 207 and the past state vector value 208, and which predicts and evaluates afterward a state on the control object 200 at an arbitrary point of time on the basis of the tentative amount of operation, and a detecting unit 217 which calculates control deviation through comparing a predicted state vector value 215, which is predicted by the simulation processing unit with compensation function 211, on a state of the control object 200 at an arbitrary point of time, with the target state vector value 216, and which executes a judgment.

The function modules, which execute the control method, include furthermore an evaluation condition adjusting unit 218 which determines tentatively an amount of control operation to provide the control apparatus unit 223 when the control deviation requires the control operation, and holds temporarily the amount of control operation as candidate operation vector quantity 221, and calculates a change condition vector value 212 on the basis of the candidate operation vector quantity 221, and executes prediction and evaluation afresh up to allowable designated times by use of the simulation processing unit with compensation function 211, and executes the designation and the adjustment of the amount of control operation repeatedly until the control deviation reaches to a level that the control deviation does not require control operation any more, and a policy describing unit 219 which is referred to when the evaluation condition adjusting unit 218 determines the amount of control operation tentatively.

The function modules, which execute the control method, include furthermore an adjustment operating unit 220 which converts the candidate operation vector quantity 221, which is the amount of operation determined tentatively, into a finally determined amount of control operation, that is, a definite operation vector 222 in the case that it is necessary to control operation of control deviation which the detecting unit 217 calculates.

The function modules, which execute the control method, include furthermore a measured state vector value processing unit 209 which checks accounts of the group of measured vector values corresponding to the state vector value of the control object on the basis of all events through going back to the past of all events in order to maintain properly compensation condition 210, the policy describing unit 219 or the like, which are referred at the prediction stage so that the simulation processing unit with compensation function 211 may predict and evaluate the state on the control object with accuracy at a designated point of time, and which calculates a measured state vector 213, and a long-term compensation detecting unit 214 which updates and maintains the compensation condition 210 and the policy describing unit 219 on the basis of the measured state vector 213.

In the case that the function modules, which execute the control method, are defined as larger-scale function modules, the function modules are classified into a measuring device 224, a state predicting device 225, an adjusting device 226, a control device 227 and a long-term compensation device 228. The measuring device 224 is classified into the meta-data managing unit 201, the performance data managing unit 202, the measurement statistic data calculating unit 203 and the measuring control quantity data managing unit 204, each of which is corresponding to a function module.

The state predicting device 225 includes the activation control unit 205, the state observing unit 206, the current state vector value 207, the past state vector value 208, a part of function of the simulation processing unit with compensation function 211, and the compensation condition 210.

The adjusting device 226 includes a part of function of the simulation processing unit with compensation function 211, the compensation condition 210, the predicted state vector 215, the target state vector 216, the detecting unit 217, the change condition vector 212, the evaluation condition adjusting unit 218 and the policy describing unit 219.

The control device 227 includes the control apparatus unit 223, the candidate operation vector 221, the definite operation vector 222 and the adjustment operating 220.

The long-term compensation device includes the measured state vector 213, the measured state vector value processing unit 209, the compensation condition 210, the long-term compensation detecting unit 214 and the predicted state vector value 215.

The meta-data managing unit 201 is corresponding to the meta-data managing unit 66 in the monitor system 5 in FIG. 13.

The performance data managing unit 202 is corresponding to the performance data managing unit 68 in the monitor system 5 in FIG. 13.

The measurement statistic data calculating unit 203 is corresponding to the measurement statistic data calculating unit 67 in the monitor system 5 in FIG. 13.

The measurement statistic data managing unit 204 is corresponding to the measurement control quantity data managing unit 64 in the monitor system 5 in FIG. 13.

The activation control unit 205 is corresponding to the activation control unit 69 in the monitor system 5 in FIG. 13.

The state observing unit 206 is corresponding to the state observing unit 70 in the monitor system 5 in FIG. 13.

The current state vector value 207 is corresponding to the state matrix at sampling time $c_8$ in the monitor system 5 of FIG. 13.

The past state vector value 208 is corresponding to the state matrix at time previous to sampling time by one sampling period $c_9$ in the monitor system 5 in FIG. 13.

The simulation processing unit with compensation function 211 is corresponding to the simulation processing unit with compensation function 71 in the monitor system 5 in FIG. 13.

The compensation condition 210, which is used by the simulation processing unit with compensation function 71 which has a same name in the monitor system 5 of FIG. 13, is not defined explicitly in particular in FIG. 13.

The predicted state vector value 215 is corresponding to the group of vector values $c_{14}$ in the monitor system 5 in FIG. 13.

The target state vector value 216 is corresponding to the group of vector values of group of target values on agreed service level $c_{16}$. Further, $c_{16}$ is managed by the target state vector value managing unit 72 in the monitor system in FIG. 13 and the agreed service level is agreed per plural service users.

The detecting unit 217 is corresponding to the detecting unit 73 in the monitor system 5 in FIG. 13.

The change condition vector value 212 is corresponding to a part of the tentative control operation list designating information $c_{21}$, which is handled by the evaluation condition adjusting unit 74 in the monitor system 5 in FIG. 13, on the description on the tentative amount of operation.

The evaluation condition adjusting unit 218 is corresponding to the evaluation condition adjusting unit 74 in the monitor system 5 in FIG. 13.

The policy describing unit 219 is corresponding to the policy or the like which is managed by the policy description managing unit 75 in the monitor system 5 in the FIG. 13 and which the evaluation condition adjusting unit 74 refers to when the evaluation condition adjusting unit 74 determines the amount of operation tentatively.

The control apparatus unit 223 is corresponding to the compulsive discard unit 56 and the input restraining unit 57 in the Proxy system 4 in FIG. 13.

The candidate operation vector quantity 221 is corresponding to the tentative control operation list designating information $c_{22}$ which is handled by the evaluation condition adjusting unit 74 in the monitor system 5 in FIG. 13.

The definite operation vector value 222 is corresponding to the tentative control operation list designating information $c_{22}$ which is handled by the evaluation condition adjusting unit 74 in the monitor system 5 in FIG. 13.

The adjustment operating unit 220 is corresponding to the adjustment operating unit 76 in the monitor system 5 of FIG. 13.

The measured state vector value 213 is corresponding to the group of measured vector values $c_{29}$ in the monitor system 5 in FIG. 13.

The measured state vector value processing unit 209 is corresponding to the measured state vector value processing unit 77 in the monitor system 5 in FIG. 13.

The long-term compensation detecting unit 214 is corresponding to the long-term compensation detecting unit 78 in the monitor system 5 in FIG. 13.

An operation of each function module will be described in the following.

The measurement control quantity data managing unit 204 associates an event meaning the physical phenomena, which are measurable with only statistical process and without prediction by use of simulation, out of physical phenomena on the control object 200, with time as a scalar quantity on the basis of an arbitrary context and then, inputs the associated event as an event information $i_{30}$.

The measurement statistic data calculating unit 203 calculates various groups of measurement statistic expressing the physical phenomena, which are measurable with only statistical process and without prediction by use of simulation, out of physical phenomena on the control object 200. The calculation is executed in a unit of category to which the event, which means the physical phenomenon and which is managed by the meta-data managing unit 201, belongs. In case of FIG. 13, the unit of category means service definition.

The measurement statistic calculating unit 203 calculates the group of measurement statistic per category unit. For this reason, the measurement statistic calculating unit 203 obtains information such as formal meaning i3 on the category unit and the management unit handled by the control object 200 from the meta-data managing unit 201. This information is corresponding to number of dimensions of vector value. Moreover, information i4 is corresponding to the list of integrated and synthesized work flow definition m75 and all work flow definitions and service definitions m76 which are source information to generate the list of integrated and synthesized work flow definition m75 in FIG. 13.

Afterward, the measurement statistic data calculating unit 203 extracts data on event i1 from the measurement statistic data managing unit 204 managing the associated event which is managed per information such as formal meaning i3 corresponding to information i4. Then, the measurement statistic data calculating unit 203 calculates successively a group of parameters i2 which is defined as the group of parameters defined as the group of measurement statistic. The data on event i1 is corresponding to the list of event data m72 which is related to the calculation object in FIG. 13.

Afterward, the group of parameters i2 which is defined as the calculated group of measurement statistic is delivered to the performance data managing unit 202. The group of parameters i2, which is defined as the calculated group of measurement statistic, is corresponding to the update request m77 in FIG. 13. The process is executed repeatedly and the iteration number is coincident to number of parameters which composes and defines the group of measurement statistic. The process is managed together with time.

When the state observing unit 206 receives an activation request i9 from the activation control unit 205 according to the sampling period, the state observing unit 206 obtains current value, accumulated value, and average value on group of parameters i6 or the like which compose and define a plurality of measurement statistic managed by the performance data managing unit 202. The activation request i9 is corresponding to the activation request c1 in FIG. 13, and the current value, accumulated value, and average value on group of parameters i6 or the like is corresponding to the calculation result C4 or the like in FIG. 13.

Moreover, the state observing unit 206 obtains information such as formal meaning i5 on the category unit and the management unit handled by the control object 200 from the meta-data managing unit 201. The information i5 is corresponding to the list of integrated and synthesized work flow definition c2 and the set of definition information of all work flow definitions and service definitions c3 which are source information to generate each of the list c2.

Afterward, the state observing unit 206 totals the current value, accumulated value and averaged value on group of parameters i6 or the like per category unit, and calculates a group of vector values of group of measurement statistic per the category unit, and defines a matrix, which is generated through sequencing the group of vector values in all category units, as the formula (5) mentioned above.

Moreover, the state observing unit 206 generates and holds a current state vector value i7 identical to the current state vector value 207 which is composed of the group of measurement statistic measured at the latest sampling time, and a past state vector value i8 identical to the past state vector value 208 which is composed of the group of measurement statistic measured at a time previous to the latest sampling time by one sampling period.

Afterward, the state observing unit 206 activates the simulation processing unit with compensation function 211 as an argument and input of information i10 which is equivalent to a current state vector value i11 identical to the current state vector value 207, a past state vector value i12 identical to the past state vector value 208, and the information such as formal meaning i5 on the category unit and the management unit handled by the control object 200. The information i10 is corresponding to the argument of the invoke command c12 in FIG. 13.

The simulation processing unit with compensation function 211 refers to a setting steady-state value i13 of the compensation condition 210, and executes the simulation, which includes the procedure for prediction in the feed forward type control and the process for compensation of delay time due to the simulation processing time, less than predetermined times, and calculates a predicted value i14, and generates the predicted state vector value 215 on the state of the control object 200 at an arbitrary point of time. This predicted state vector value 215 is corresponding to the group of vector values meaning group of parameters values on agreed service level c14 in FIG. 13.

The simulation processing unit with compensation function 211 executes the compensation of the delay time due to the simulation processing time, and calculation for the prediction in the feed forward type control. FIG. 22 shows behavior of a time base process.

In FIG. 22, a horizontal axis 250, which means observable and actually continuous time of real number, is expressed as variable t of real number. Meanwhile, a curve 251 indicates a trace of change of a scalar quantity of a scalar function corresponding to an arbitrary component of a vector function which indicates the state of the control object 200 and includes the observable and actually continuous t of real number as a variable.

Period 253, which means the sampling period for the digital control, is defined as constant T. Time 252, which means a time value indicating q'th sampling time, is expressed as the following formula (20), where T is the sampling period and q is a variable number. Similarly, time 254, which means a time value indicating (q+1)'th sampling time, is expressed as the following formula (21).

$$t(q+1)=t_0+T(q-1) \quad (20)$$

$$t(q)=t_0+Tq \quad (21)$$

Time 255 means an average measurement evaluation time and means detailedly, an average time cost which is necessary to calculate condition on the control operation by use of the simulation processing unit with compensation function 211. This is denoted as constant Te(ave). Control operation period is expressed as a constant fC̣. It is desirable that the constant fC̣ is 0. Time 256, which usually represents a sum of the average measurement period and the average control operation period, is expressed as the following formula (22).

$$\Delta + T_e^{(ave)} \quad (22)$$

According to the exemplary embodiment of the present invention, the simulation processing unit with compensation function 211 executes calculations for prediction up to 2p times (p is an arbitrary constant of integer) within one sampling period.

In this case, the constant p is corresponding to the maximum iteration number of executions in which the detecting unit 217 compares the predicted state vector 215, which is related to the control object 200 at an arbitrary point of time and which is predicted by the simulation processing unit with compensation function 211, with the target state vector 216, and calculates the control deviation to execute the judgment.

According to the control method, the control deviation is calculated and judged up to maximum p times by use of the detecting unit 217. The reason is that since the state of control object 200 at an arbitrary point of time is not formulated easily due to, for example, nonlinearity, it is very difficult to calculate the prediction value, and therefore, it is assumed that the trial and error method is permitted in the control operation though holding the policy to some extent.

In some cases, after the detecting unit 217 judges, the control deviation may not satisfy the judgment condition after completion of calculating the control deviation p times. In this case, the time 256 means the longest permissible measurement evaluation period, and means the permissible limit time in which the simulation processing unit with compensation function 211 can execute the calculation predetermined times. The time 256 is expressed as the following formula (23), where the longest permissible measurement evaluation period is denoted as Te(ma x).

$$t = t_o + T(q-1) + T_e^{(max)} \quad (23)$$

According to the control method, there exists a constituent module, which needs a large amount of calculations, such as the simulation processing unit with compensation function 211. For this reason, it is necessary to execute some kind of compensation for the delay time due to the process time. This is called "compensation for delay due to process time". This is important from two points of view.

The first point of view is the setting condition of the constant p. It is necessary to set upper limit of the constant p in consideration of the delay time due to the process time so that p may be realized. It is necessary to set the constant p so that the following formula (24) is satisfied, where the average process time including all processes of the simulation processing unit with compensation function 211, the detecting unit 217 and the evaluation condition adjusting unit 218 is denoted as constant Tc.

$$T_e^{(ave)}/2p < Tc \quad (24)$$

The second is mentioned in the following. It is necessary to execute the time compensation for a time when the simulation processing unit with compensation function 211 is activated, in order to calculate and judge the control deviation by use of the detecting unit 217. The "compensation for delay due to process time" becomes important as influence of the simulation processing unit with compensation function 211 on the process cost becomes severe.

For this reason, according to the control method of the exemplary embodiment of the present invention, the average measurement evaluation period Te(ave) divided by total number 2p of prediction calculations which are executed by the simulation processing unit with compensation function 211, is defined as a unit time. The first unit time 258 is expressed as the following formula (25).

$$t = t_o + T(q-1) + T_e^{(max)}/2p \quad (25)$$

According to the control system, out of the total number 2p of the prediction calculations executed by the simulation processing unit with compensation function 211, the prediction calculations are executed continuously first half p times, and the prediction calculation on the state of the control object 200 at a point of time when the evaluation condition adjusting unit 218 sets the amount of control operation tentatively are executed second half p times.

On the other hand, in the case of the calculations executed second half p times, the state of the control object 200 is predicted and calculated under a situation in which the evaluation condition adjusting unit 218 sets the amount of control operation tentatively through inputting the state, which has been predicted and calculated first half p times, of the control object 200 at the designated point of time when the prediction and calculation are executed at first half p times.

Specifically, the time compensation is executed by use of the linear extrapolation at time 259 calculated by the following formula (26), on the basis of the matrix values (K) and (L), that is, values of matrix, which is expressed as the above mentioned formula (5), at points of time $t=t0+T(q-2)$ and $t=t0+T(q-1)$ respectively. That is, the value, which is expressed as the following formula (27), is predicted by use of the simulation processing unit 211 with compensation function 211. Further, display form (Z) means a predicted value.

$$t = t_0 + T(q-1) + T_e^{(ave)}/2p \quad (26)$$

[Definition 22]

$$\gamma_{(i,s)}(t_0 + T(q-2)) \in R \quad (K)$$

$$\gamma_{(i,s)}(t_0 + T(q-1)) \in R \quad (L)$$

[Definition 23]

$$\overline{\Gamma_{(j,m)}\left(t_0 + T(q-1) + \frac{(p+2)}{2p}T_e^{(ave)}\right)} \in R \quad (27)$$

Moreover, the time compensation is executed by use of the linear extrapolation at time 260 calculated by the following formula (28), on the basis of the above mentioned formula (5), and the value which is expressed as the following formula (29) is predicted by use of simulation processing unit with compensation function 211. Further, display form (Z) means a predicted value at compensation time M which compensates the simulation processing time.

$$t = t_0 + T(q-1) + T_e^{(ave)}/p \quad (28)$$

[Definition 24]

$$\overline{\Gamma_{(j,m)}\left(t_0 + T(q-1) + \frac{(p+4)}{2p}T_e^{(ave)}\right)} \in R \quad (29)$$

Generally, the time compensation is executed by use of the linear extrapolation at a time calculated by the formula (30), on the basis of the above mentioned formula (5), and the value, which is expressed as the following formula (31), is predicted by use of simulation processing unit with compensation function 211. Further, the above mentioned display form (Z) means a predicted value at compensation time Δt which compensates the simulation processing time.

$$t = t_0 + r \cdot T(q-1) + T_e^{(ave)}/2p \quad (30)$$

[Definition 25]

$$\overline{\Gamma_{(j,m)}\left(t_0 + T(q-1) + \frac{(p+2r)}{2p}T_e^{(ave)}\right)} \in R \quad (31)$$

Moreover the detecting unit 217 executes the judgment at time 261, which is calculated by the following formula (32), on the basis of the above mentioned formula (27) which is predicted at the time 259 calculated by the above-mentioned formula (26). After determining a service, which should be controlled, by use of above mentioned formulas (12), (17) and (18), the evaluation condition adjusting unit 218 determines the amount of control operation tentatively, and re-predicts the following formula (33) by use of the simulation processing unit with compensation function 211. Further, the above mentioned display form (Z) means a predicted value at compensation time Δt which compensates the simulation processing time, and identifier c means evaluation after the control operation.

[Definition 26]

$$t = t_0 + T(q-1) + \frac{(p+2)}{2p}T_e^{(ave)} \quad (32)$$

$$\overline{\Gamma_{(j,m)}^C\left(t_0 + T(q-1) + \frac{(p+2)}{2p}T_e^{(ave)}\right)} \in R \quad (33)$$

Afterward, the control deviation, which has the same form as the above mentioned formula (12) and means evaluation after execution of the control operation and is expressed as the following symbol (M), is evaluated. In the case that all components of the control deviation are negative, there is no necessity to execute any control. In the case that not all are negative, the following formula (34) is executed and a next amount of control operation is evaluated.

[Definition 27]

$$\overline{Dv^C}_{(j,m)} \ldots (M)$$

$$q \leftarrow q+1 \quad (34)$$

Generally, the detecting unit 217 executes the judgment on the basis of the following formula (36) which is predicted at the time indicated by the following formula (35). After determining a service, which should be controlled, by use of above mentioned formulas (12), (17) and (18), the evaluation condition adjusting unit 218 determines the amount of control operation tentatively, and executes re-predicting with the following formula (37) by use of the simulation processing unit with compensation function 211. Further, display form (J) means a predicted value at compensation time Δt which compensates the simulation processing time, and the identifier c means evaluation after the control operation.

[Definition 28]

$$t = t_0 + T(q-1) + \frac{(p+2r)}{2p}T_e^{(ave)} \quad (35)$$

$$\overline{\Gamma_{(j,m)}\left(t_0 + T(q-1) + \frac{(p+2r)}{2p}T_e^{(ave)}\right)} \in R \quad (36)$$

$$\overline{\Gamma_{(j,m)}^C\left(t_0 + T(q-1) + \frac{(p+2r)}{2p}T_e^{(ave)}\right)} \in R \quad (37)$$

Afterward, the control deviation (display form (M)), which has the same form as one of the above mentioned formula (12) and means evaluation after executing the control operation, is evaluated. In the case that all components are negative, there is no necessity to execute any control operation.

A transient phenomenon in FIG. 20 will be described in the following. Usually, a desirable state is not always realized immediately, even if the control operation to the control object is executed. For this reason, a transient phenomenon in time domain occurs. A period from a time when the control operation is executed until a time when change of scalar quantity, which is expressed by a scalar function, becomes stable, is called a transient period. The same occurs in the control object 200. The transient period is express as constant τ. Time 257, which means a deemed time when the transient is regarded to be stabilized, is expressed as the following formula (38).

$$t = t_o + T(q-1) + T_e^{(max)} + \tau \quad (38)$$

A process to calculate each of the above-mentioned formulas (25) to (37) is corresponding to Step S108 in FIG. 15. While each of the formulas (25) to (37) has the same form as the above mentioned formula (6) has, each of the formulas (25) to (37) is the time compensation value.

Afterward, the simulation processing unit with compensation function 211 repeats the processes, which are corresponding to Steps S107 and S108 in FIG. 15, whole predetermined times. Further, the predicted state vector value 215 on the state of the control object 200 at an arbitrary point of time changes dependently on the setting steady-state value i13 of the compensation condition 210 as shown in FIG. 22.

The simulation processing unit with compensation function 211 activates the detecting unit 217 in order to evaluate the predicted state vector 215. An argument and input in the case is corresponding to the argument of the re-invoke command c15 in FIG. 13.

The detecting unit 217 holds beforehand the target state vector value 216 which is defined per management unit handled by the control object 200. The detecting unit 217 calculates the eigenvalue of priority beforehand.

Afterward, the detecting unit 217 executes the compensation for the delay time due to the simulation processing time on the basis of a vector value i17 identical to the group of vector values of group of target value 216, and a vector value i16 identical to the predicted state vector values 215, and then, predicts and calculates the control deviation matrix.

The detecting unit 217 judges the control condition on the basis of the control deviation. There are some criteria for judgment. In the case that the control deviation is not satisfactory according to the result of judgment on the control condition, the evaluation condition adjusting unit 218 is activated.

When the evaluation condition adjusting unit 218 is activated, necessary information for the activation such as the predicted value of compensation time, which is to compensate the simulation process time, of the control deviation matrix is delivered in an argument i18. Before the activation of the evaluation condition adjusting unit 218, it is judged whether iteration number of using the simulation processing unit with compensation function 211 is not less that the predetermined number within one sampling period for the control operation. The argument i18 is corresponding to the argument of the invoke command c17 in FIG. 13.

In the case that the iteration number of simulation, which has been executed already by the simulation processing unit with compensation function 211, is not less than the predetermined number p, the operation is regarded to be failed. Behavior at a time when operation is failed is not specified here.

On the other hand, in the case that the iteration number of simulation, which has been executed already by the simulation processing unit with compensation function 211, is less than the predetermined number p, the simulation processing unit with compensation function 211 is activated. In the case, the evaluation condition adjusting unit 218 determines an amount of control operation tentatively on the basis of the policy description unit 219.

When the evaluation condition adjusting unit 218 determines the amount of control operation tentatively, a method for selecting a control apparatus unit 223, which should be a candidate for control operation, out of a plurality of groups of control apparatus units, and a method for selecting contents of the operation method are important.

A method of rearranging the control deviation values and selecting a control apparatus unit 223, which handles a management unit related to the largest control deviation value among the management units handled by the control object 200 is exemplified, as the method for selecting the control apparatus unit 223, which should be the candidate for control operation, out of a plurality of groups of control apparatus units. However, another method is also applicable.

Moreover with regard to the method for selecting contents of the operation method, a method for determining a kind and size of the amount of control operation is important. The kind of the amount of control operation, which is described in the policy describing unit 219, is selected mainly among four methods.

The first method is to make capability of processing the physical phenomenon, which is related to the management unit, strong locally through moving the management unit related to the largest control deviation value among the management units handled by the control object 200, or making the control deviation value decreasing. This is corresponding to "control operation method by resource operation" mentioned above.

The second method is to make capability of processing the physical phenomenon, which is related to the management unit except the management unit flat and smooth, and to make capability of processing the physical phenomenon on the control object 200 improved as a whole, through moving the management unit which is related to the largest control deviation value among the management units handled by the control object 200. This is corresponding to "control operation method by rectification to cope with restriction" mentioned above.

The third method is to discard a part of physical phenomena on the control object 200 compulsively and to maintain the processing capability to permissible extent through making the largest control deviation value among management units handled by the control object 200 decreasing, in the case that it is recognized that a plurality of physical phenomena on the control object 200 occur beyond the permissible number. This is corresponding to "control operation method by compulsive discard" mentioned above.

The fourth method is to change the process order related to the management unit and to make capability of processing the physical phenomenon dispersed temporally through moving the management unit which is related to the largest control deviation value among the management units handled by the control object 200, or making the control deviation value decreasing. This is corresponding to "control operation method by rearrangement" mentioned above.

An example of the procedure related to the amount of control operation is corresponding to the procedure in FIG. 18. Since each amount of control operation, which is determined tentatively, is held as the candidate operation vector 221, the latest amount of control operation is recorded by an update information i23.

Whenever the simulation processing unit with compensation function 211 is called repeatedly until iteration number of calls reaches to the predetermined number, the update information i23 adds the designated contents and makes the designated contents severe.

The amount of control operation determined tentatively is calculated as i21 and afterward, the evaluation condition adjusting unit 218 generates the change condition vector value 212. Afterward, the evaluation condition adjusting unit 218 designates destination of reference in an argument i19 in order to make the change to be referred condition vector 212, and re-activates the simulation processing unit with compensation function 211.

After the simulation processing unit with compensation function 211 is activated, the simulation processing unit with compensation function 211 refers to a vector value i22 which is identical to the change condition vector value 212, and re-calculates the predicted state vector value 215 on the state of the control object 200, to which the control operation has been executed already, at the compensation point of time which compensates the simulation processing time.

The detecting unit 217 is activated again and judges the control condition on the basis of the re-calculated control deviation. In the case that the control deviation is satisfactory according to the judgment result on the control condition and furthermore, change of the control condition has been executed, the adjustment operating unit 220 instead of the evaluation condition adjusting unit 218 is activated. Necessary information in the case is delivered by an argument i24. The argument i24 is corresponding to the argument of the invoke command c18 in FIG. 13.

After the adjustment operating unit 220 is activated, the adjustment operating unit 220 obtains a vector value i25 from the candidate operation vector quantity 221 in order to instruct the actual amount of operation to the group of various control apparatus units. Afterward, the adjustment operating unit 220 converts the vector value i25 into a vector value i26 equivalent to the definite operation vector quantity 222 which means the final amount of control operation. Then, the adjustment operating unit 220 activates the control apparatus unit 223 with necessary information as an argument i27.

Usually, there exists a plurality of control apparatus units 223. Each control apparatus unit 223 extracts a required scalar quantity or required vector value i28 from the definite operation vector quantity 222 and executes each control operation. The control object 200 is controlled on the basis of the amount of control operation i29 of each control apparatus unit 223 and then, the desired state is obtained.

The required scalar value or required vector value i28 is corresponding to the control message c51 which is sent to the compulsive discard unit 50 in the operation proxy 48, or the control message c55 which is sent to the compulsive discard unit 56 in the proxy unit 35 in FIG. 12.

The activation control unit 205 activates the measurement state vector value processing unit 209 in a designated time cycle in order to maintain properly the compensation condition 210, the policy describing unit 219 or the like which are referred to at the prediction stage so that the simulation processing unit with compensation function 211 can predict and evaluate the state of the control object with high accuracy at the designated point of time. A required argument is delivered by i33 in the case.

When the measured state vector value processing unit 209 is activated, the measured state vector value processing unit 209 obtains a current value, accumulated value, average value or the like i31 on the group of parameters which composes and defines a plurality of groups of measurement statistic managed by the performance data managing unit 202. Moreover, the measured state vector value processing unit 209 obtains information such as formal meaning i32 on the category unit and the management unit handled by the control object 200 from the meta-data managing unit 201.

Afterward, the measured state vector value processing unit 209 checks account of the group of measured vector values, which is corresponding to the state vector value of the control object 200, on the basis of all events through going back to the past of all events, and calculates a vector value i34 which is identical to the value of measured state vector 213. Afterward, the measured state vector value 213 is generated.

Afterward, the measure med state vector value processing unit 209 activates the long-term compensation detecting unit 214. A required argument in the case is delivered by i36. The long-term compensation detecting unit 214 reads both the vector value i34 which is identical to the value of predicted state vector 213, and a vector value i37 which is identical to the predicted state vector value 215, which the simulation processing unit with compensation function 211 generates and which is related to the state of the control object 200 at the corresponding point of time, and compares both of vector values.

In the case that it is recognized that the policy describing unit 219 and the compensation condition 210 are caused an error due to the change depending on passage of time according to the comparison result, the long-term compensation detecting unit 214 generates correcting and updating information i38 to correct and update the compensation condition 210, and correcting and updating information i39 to correct and update the policy describing unit 219, and then, corrects and updates the compensation condition 210 and the policy describing unit 219.

As mentioned above, according to the exemplary embodiment of the present invention, it is possible to handle a complicated execution condition also, since the control is executed by use of the method that both the predicted state vector value which the simulation processing unit predicts and calculates p times at the future point of time, and the target state vector value whose control target is the SLA information are compared successively, and the control deviation is calculated, and then, necessity of executing the control operation is judged and detected. Structure of the control object and structure of the evaluation function and the execution function are clear. For this reason, according to the exemplary embodiment of the present invention, it is possible to solve each of problems mentioned above, that is, "lack of a correcting function and a verifying function of a control plan", "lack of an evaluation function of a proper control plan", and "lack of a control-oriented evaluation function and a control-oriented execution function"

Further, while the configuration, which includes the repository 6, is exemplified, it is not always necessary to include the repository 6.

[A Second Exemplary Embodiment of the Present Invention]

A second exemplary embodiment, which applies the present invention preferably, will be described in the following.

FIG. 24 shows a configuration of a service provision quality control device according to the exemplary embodiment of the present invention. The exemplary embodiment of the present invention shows a case that a service providing body holds the service provision quality control device based on agreed service level, and defines the service provision quality control device as the service.

Configurations of a work flow system 1, a work flow system 2, a work flow system 3, a Proxy system 4 and a monitoring system 5, are the same as ones in the first exemplary embodiment of the present invention. These are managed by a service delivery platform operating body and mash-up service operating body 110.

The service provision quality control device is connected to the job application systems 7 to 12.

An operation of the service provision quality control device is the same as one in the first exemplary embodiment of the present invention. The service providing body holds the service provision quality control apparatus. In the case that the service provision quality control apparatus is defined as a service, it is also possible to solve the problems mentioned above, that is, "lack of a correcting function and a verifying function of a control plan", "lack of an evaluation function of a proper control plan", and "lack of a control-oriented evaluation function and a control-oriented execution function" and furthermore, it is possible to maintain service provision quality based on the agreed service level which is agreed as a contract between a service receiving user who starts a business process, and a service provider who provides a business process and a group of services which are called by the business process, when a plurality of groups of job application systems are defined as a group of services, and arbitrarily associated by use of a work flow managing system and a business process managing system, and then, executed and operated as the business process.

[A Third Exemplary Embodiment of the Present Invention]

A third exemplary embodiment, which applies the present invention preferably, will be described in the following.

FIG. 25 shows a configuration of a service provision quality control device according to the exemplary embodiment of the present invention. The exemplary embodiment of the present invention shows a case that a service providing body holds the service provision quality control device based on agreed service level, and defines the service provision quality control device as a service.

Configurations of a work flow system 1, a work flow system 2, a work flow system 3 and a Proxy system 4, a monitoring system 5 and job application systems 7 to 12 are the same as ones in the first exemplary embodiment of the present invention. These are managed by an application service provider and service providing body 111.

An operation of the service provision quality control device is the same as one in the first exemplary embodiment of the present invention. The service providing body holds the service provision quality control apparatus. In the case that the service provision quality control apparatus is defined as the service, it is also possible to solve the problems mentioned above, that is, "lack of a correcting function and a verifying function of a control plan", "lack of an evaluation function of a proper control plan", and "lack of a control-oriented evaluation function and a control-oriented execution function" and furthermore, it is possible to maintain service provision quality based on the agreed service level which is agreed as a contract between a service receiving user who starts a business process, and a service provider who provides a business process and a group of services which are called by the business process, when a plurality of groups of job application systems are defined as a group of services, and arbitrarily associated by use of a work flow managing system and a business process managing system, and then, executed and operated as the business process.

Further, each of the above-mentioned embodiments is a preferable exemplary embodiment of the present invention, and the present invention is not limited to these exemplary embodiments.

While the case that the simulation is executed by use of the past state of amount of measurement statistic at the time previous to the sampling time by one sampling period is exemplified, there is no necessity to be limited to the sampling at the time previous to the sampling time by one sampling period. It is possible to execute the simulation by use of past state at a time before a predetermined period.

Thus, various modifications are applicable to the present invention.

This application is based on and claims the benefit of priority from Japanese Patent Application No. 2008-021544, filed on Jan. 31, 2008, the disclosure of which is incorporated herein in its entirety by reference.

The whole or part of the exemplary embodiments disclosed above can be described as, but not limited to, the following supplementary notes.

(Further Exemplary Embodiment 1)

A service provision quality control device whose object is to maintain service providing quality related to description of a whole work flow, or to maintain agreed service level which is contracted per plural users, on the basis of a function to integrate and monitor execution of a distributed component work flow of said whole work flow which maintains and manages and controls activation states of a group of plural job application systems, and definition of operation order, under an environment that a plurality of work flow managing systems, each of which is equipped with a work flow engine, manage and execute each of said component work flows independently and distributedly, characterized by including a service provision quality control device, comprising:

a means for storing agreed service level information which is defined as a target state vector value of a control target per description of said whole work flow and which indicates service providing condition of said whole work flow;

a measurement statistic data calculating means for calculating measurement statistic which can be measured and calculated with only statistical process and which is related to a component work flow or a service called by said component work flow;

a state observing means for sampling said measurement statistic in a predetermined sampling period and calculating a current state vector value, which is measurement statistic at the latest sampling time, and a past state vector value which is measurement statistic at a sampling time previous to said latest sampling time by a predetermined period;

a simulation processing means for predicting a group of state predicting vector values, each of which is composed of a component state vector and which has the same meaning as said target state vector value has, on the basis of said current state vector value and said past state vector value of said measurement statistic through compensating said group of state predicting vector values by extrapolation at a future sampling time;

a policy description managing means for managing policy description on a control operation;

a judging means for calculating control deviation after comparing sequentially said state predicting vector value, which is predicted by said simulation processing means, and said target state vector value, whose control target is said agreed service level, and judging whether a control operation is necessary or not;

an adjusting means for changing virtually an execution environment, which is described in said whole work flow, within own apparatus in the case that said control operation is required on the basis of said policy description managed by said policy description managing means, and re-executing said simulation processing means and said judging means afterward, and adjusting evaluation condition of said execution environment repeatedly until said control deviation becomes not larger than a predetermined value under the condition that iteration number is not larger than a predetermined number which is corresponding to an upper limit number; and a means for fixing change of said execution environment in the case that it is not judged that said control operation is necessary any longer on the basis of a result on adjustment of evaluation condition by said adjusting means.

(Further Exemplary Embodiment 2)

The service provision quality control device according to Supplement 1, characterized by comprising:

a means for collecting and managing description of said distributed component work flow; and a work flow synthesizing means for synthesizing collected description of distributed component work flow, and re-generating description of said whole work flow.

(Further Exemplary Embodiment 3)

The service provision quality control device according to Supplement 1 or Supplement 2, characterized in that:

said simulation processing means divides an average measurement evaluating period, which is permitted for measuring within said sampling period, into 2p periods (p is integer not smaller than 1) each of which has equivalent time length, and predicts said group of state predicting vector values through executing compensation p times at a future time, and said adjusting means adjusts evaluation condition of said execution environment above mentioned p times maximum.

(Further Exemplary Embodiment 4)

The service provision quality control device based on agreed service level according to any one of Supplement 1 to Supplement 3, characterized by comprising:

a means for converting said component work flow, which is not described in said standard form, out of said component work flows into a component work flow described in said standard form; and a means for managing description of said component work flow which is described in said predetermined standard form.

(Further Exemplary Embodiment 5)

The service provision quality control device based on agreed service level according to any one of Supplement 1 to Supplement 4, characterized by comprising:

a means for calculating equivalent data which is equivalent to a predicted result by said simulation processing means, by use of a procedure different from one by said simulation processing means;

a means for comparing a result predicted by said simulation processing means, and said equivalent data each other, and judging whether it is necessary to compensate at least one of said policy description and compensation condition which is referred to by said simulation processing means; and a long-term compensation means for correcting periodically at least one of said policy description and said compensation condition which is referred to by said simulation processing means.

(Further Exemplary Embodiment 6)

The service provision quality control device based on agreed service level according to any one of Supplement 1 to Supplement 5, characterized by comprising:

a means for specifying a place of bottleneck in consideration of priority on said agreed service level information, a value which evaluates complexity in composition of description of plural component work flows composing a whole work flow and complexity in composition of a group of services which is called by said component work flow, and a value of measurement statistic data which can be measured and calculated with only statistical process and which is concerned with a component work flow and a service called by said component work flow, in the case that said target state vector value and said state predicting vector value are compared each other to calculate control deviation.

(Further Exemplary Embodiment 7)

The service provision quality control device based on agreed service level according to any one of Supplement 1 to Supplement 6, characterized in that:

said policy description includes at least one of increasing or decreasing number of work flow engines tentatively, rectifying a process, which is in a bottleneck, through restraining temporarily to input a message to a service execution processing system which is realized by said work flow engine, and discarding said message; and said service provision quality control apparatus includes a means for restraining temporarily to input said message and a means for discarding said message within or adjacently to a plurality of work flow managing systems each of which is equipped with said work flow engine.

(Further Exemplary Embodiment 8)

The service provision quality control device based on agreed service level according to Supplement 7, characterized in that:

said policy description includes enabling to process a calling portion of said component work flow and a called portion of a service calling definition, which is called by said calling portion of said component work flow, dynamically and simultaneously so that said information of agreed service level can become satisfactory as a control target with each of the description of said whole work flow; and said service provision quality control apparatus includes a means to enable to process terminal service calling definitions simultaneously.

(Further Exemplary Embodiment 9)

A service provision quality control system, characterized by comprising:

a plurality of work flow processing apparatuses each of which includes a means for storing description on said component work flow and a work flow engine to execute said component work flow; and a service provision quality control apparatus based on agreed service level according to any one of Supplement 1 to Supplement 8.

(Further Exemplary Embodiment 10)

A feed forward type control method, characterized by comprising:

a process for defining measurement statistic data, which can be measured and calculated with only statistical process, out of a control object defined clearly and a physical phenomenon related to said control object, and for defining a target state vector value which is a control target of said control object and can not be measured directly;

a process for sampling said measurement statistic in a predetermined sampling period and calculating a current state vector value which is measurement statistic at the latest sampling time, and a past state vector value which is measurement statistic at a sampling time previous to said latest sampling time by a predetermined sampling period;

a process for simulating and predicting a group of state predicting vector values, each of which is composed of a component state vector and has the same meaning as said target state vector value has, on the basis of said current state vector value and said past state vector value of said measurement statistic after compensation by extrapolation at a future sampling time;

a process for calculating control deviation after comparing sequentially said state predicting vector value which is predicted in said simulation, and said target state vector value each other, and for judging whether a control operation is necessary or not;

a process for determining tentatively an amount of control operation so that said control deviation may become satisfactory;

a process for executing new simulation, which has the same meaning as said simulation has, after adding said amount of control operation determined tentatively, and calculating a state predicting vector value which is composed of a component state vector and which has the same meaning as said target state vector value has, and afterward calculating new control deviation through comparing said state predicting vector value with said target state vector value, and adding an amount of control operation determined tentatively and making condition strict repeatedly until said amount of control operation is fixed under the condition that iteration number is not larger than a predetermined number which is corresponding to an upper limit number, in the case that an additional amount of control operation is necessary; and a process for executing a control operation in the case that it is not necessary to add said amount of control operation.

(Further Exemplary Embodiment 11)

The feed forward type control method, according to Supplement 10, characterized in that:

an agreed service level information, which indicates service providing condition, is defined as said target state vector value of a control target; and a control operation, which makes said control deviation satisfactory, includes at least one of increasing or decreasing number of service execution processing systems, increasing or decreasing an amount of assignment of hardware resources, and increasing or decreasing of an amount of inputted messages.

(Further Exemplary Embodiment 12)

A service provision quality control method based on agreed service level, characterized by executing:

a process for defining agreed service level information, which has measurement statistic data which is concerned with a service and which can be measured and calculated with only statistical process, and which indicates service providing condition, as a target state vector value of a control target;

a process for calculating a current state vector value, which is measurement statistic at the latest sampling time, and a past state vector value which is measurement statistic at a sampling time previous to said latest sampling time by a predetermined period, on the basis of said measurement statistic data on said service;

a process for simulating and predicting a group of state predicting vector values, each of which is composed of a component state vector and has the same meaning as said target state vector value has, on the basis of said current state vector value and said past state vector value of said measurement statistic after compensation by extrapolation at a future sampling time;

a process for calculating control deviation after comparing sequentially said state predicting vector value, which is predicted in said simulation, and said target state vector value each other, and for judging whether a control operation is necessary or not;

a process for determining tentatively number of service execution processing systems, increase or decrease of assignment of hardware resources, and increase or decrease of amount of message restraint, as a control operation to make said control deviation satisfactory, in the case that said control operation is required;

a process for executing prediction again by new simulation, which is equivalent to said simulation, through adding virtually an operation, which is determined tentatively, to set number of service execution processing systems, and to increase or decrease assignment of hardware resources and to increase or decrease an amount of restrained input messages, and comparing said prediction result with said agreed service level, which indicates said service providing condition, to judge whether said prediction result satisfies said agreed service level, and executing virtually a new operation to set number of service execution processing systems, and to increase or decrease assignment of hardware resources, and to increase or decrease an amount of restrained input messages repeatedly until said agreed service level is satisfied under the condition that iteration number is smaller than a predetermined value which is corresponding to an upper limit value, in the case that an operation, which is to set number of service execution processing systems and to increase or decrease assignment of hardware resources and to increase or decrease an amount of restrained input messages, is necessary; and a process for executing actually a control operation to set number of service execution processing systems and to increase or decrease assignment of hardware resources and to increase or decrease a new amount of restrained input messages, in the case that said agreed service level is satisfied.

(Further Exemplary Embodiment 13)

A service provision quality control program based on agreed service level, characterized by making a computer work as:

a means for associating a group of events, which are generated when component work flow is executed, with a whole work flow clearly, and storing said group of events in an event storing means in association with a group of events except said group of events, under an environment that a plurality of work flow managing systems, each of which is equipped with a work flow engine, manage and execute independently and distributedly said component work flow of said work flow which maintains and manages and controls activation states of a group of plural job application systems and the definition of operation order;

a means for defining agreed service level, which indicates service providing condition, as a target state vector value of a control target per description of said whole work flow on the basis of a function to integrate and monitor execution of distributed component work flow;

a means for calculating measurement statistic data which can be measured and calculated with only statistical process and which is related to a component work flow and a service which is called by said component work flow.

a means, which is related to observing a state, for sampling data, which is calculated by said measurement statistic data calculating means, in a predetermined sampling period and calculating a current state vector value, which is measurement statistic at the latest sampling time, and a past state vector value which is measurement statistic at a sampling time previous to said latest sampling time by a predetermined period;

a simulation processing means for predicting a group of state predicting vector values, each of which is composed of a component state vector and which has the same meaning as said target state vector value has, on the basis of said current state vector value and said past state vector value of said measurement statistic through compensating said group of state predicting vector values by extrapolation at a future sampling time;

a means for managing policy description on a control operation;

a means for calculating control deviation after comparing sequentially said state predicting vector value, which is predicted by said simulation processing means, and said target state vector value, whose control target is said agreed service level, and for judging whether a control operation is necessary or not;

a means for increasing or decreasing tentatively number of work flow engines which execute specific component work flow in a plurality of work flow management systems, on the basis of policy description, and re-executing said simulation and said judgment whether said control operation is necessary or not after increasing or decreasing virtually number of said work flow engines which is determined tentatively, and adjusting a new evaluation condition, which is to increase or decrease number of work flow engines, repeatedly until said control deviation becomes satisfactory under the condition that iteration number is not larger than a predetermined number which is corresponding to an upper limit number in the case that it is judged that it is necessary to increase or decrease number of work flow engines newly; and a means related to an adjustment operation to change a process into a process for increasing or decreasing number of said work flow engines actually in the case that it is judged that said control operation is necessary no longer on the basis of a result on adjustment of evaluation condition by said adjusting means.

(Further Exemplary Embodiment 14)

The service provision quality control program based on agreed service level, according to Supplement 13, characterized by making said computer work as:

a means for collecting and managing description of distributed component work flow; and a work flow synthesizing means for synthesizing a plurality of descriptions of said distributed component work flow to re-generate a whole work flow.

(Further Exemplary Embodiment 15)

The service provision quality control program based on agreed service level, according to Supplement 13 or Supplement 14, characterized by making said computer work as:

a means for collecting description of said component work flow;

a means for managing description of said component work flow in a predetermined standard form; and a means to convert a component work flow, which is not described in said standard form out of said component work flows, into a work flow described in said standard form.

(Further Exemplary Embodiment 16)

The service provision quality control program based on agreed service level, according to any one of Supplement 13 to Supplement 15, characterized by making said computer work as:

a means for calculating equivalent data, which is equivalent to an predicted result by said simulation processing means, by use of a procedure different from one by said simulation processing means;

a means for comparing said predicted result and said equivalent data each other, and judging whether it is necessary to compensate at least one of said policy description and compensation condition which is referred to by said simulation processing means; and a long-term compensation means for correcting periodically at least one of said policy description and said compensation condition which is referred to by said simulation processing means.

(Further Exemplary Embodiment 17)

The service provision quality control program based on agreed service level, according to any one of Supplement 13 to Supplement 16, characterized by making said computer work as:

a means for specifying a place of bottleneck in consideration of priority on said agreed service level information, a value which evaluates complexity in composition of description of plural component work flows composing a whole work flow and complexity in composition of a group of services which is called by said component work flow, and a value of measurement statistic data which can be measured and calculated with only statistical process and which is concerned with a component work flow and a service called by said component work flow, in the case that said target state vector value and said state predicting vector value are compared each other to calculate control deviation.

(Further Exemplary Embodiment 18)

The service provision quality control program based on agreed service level, according to any one of Supplement 13 to Supplement 17, characterized in that:

said policy description includes increasing or decreasing of number of work flow engines tentatively, rectifying a process which is in a bottleneck through restraining temporarily to input a message to a service execution processing system by said work flow engine, and discarding said message; and said service provision quality control program makes said computer work as a means for restraining temporarily to input said message and a means for discarding said message within or adjacently to a plurality of work flow managing systems each of which is equipped with said work flow engine (Further Exemplary Embodiment 19)

The service provision quality control program based on agreed service level, according to any one of Supplement 18, characterized in that:

said policy description includes enabling to process dynamically and simultaneously a calling portion of said component work flow and a called portion of a service calling definition called by said calling portion of said component work flow so that said information of agreed service level can become satisfactory as the control target with each of the description of said whole work flow; and said work flow synthesizing means includes a function to enable to process terminal service calling definitions simultaneously.

(Further Exemplary Embodiment 20)

A service provision quality control program based on agreed service level, characterized by making a computer execute:

a process for defining agreed service level information, which has measurement statistic data whose control object is service providing quality, agreed service level contracted per plural service users or the like and which can be measured and calculated with only statistical process and which is related to a service, and which indicates service providing condition, as a target state vector value of a control target;

a process for calculating a current state vector value, which is measurement statistic at the latest sampling time, and a past state vector value which is measurement statistic at a sampling time previous to said latest sampling time by a predetermined period, on the basis of said measurement statistic data on said service;

a predicting process for predicting a group of state predicting vector, values, each of which is composed of a component state vector and has the same meaning as said target state vector value has, on the basis of said current state vector value and said past state vector value of measurement statistic after compensating predetermined times by extrapolation at a future sampling time;

a process for calculating control deviation after comparing sequentially said state predicting vector value, which is predicted, and said target state vector value each other, and judging whether a control operation is necessary or not;

a process for determining tentatively number of service execution processing systems, increase or decrease of assignment of hardware resources, and increase or decrease of amount of restrained input message, as a control operation, in the case that said control operation is required;

a process for executing new prediction again, which is equivalent to said prediction process, through adding virtually an operation, which is determined tentatively, to set number of service execution processing systems, and to increase or decrease assignment of hardware resources and to increase or decrease an amount of restrained input messages;

a process for judging whether said new predicted result satisfies said agreed service level information;

a process for executing virtually new operation to set number of service execution processing systems, and to increase or decrease assignment of hardware resources, and to increase or decrease amount of message restraint repeatedly until said agreed service level is satisfied under the condition that iteration number is smaller than a predetermined value which is corresponding to an upper limit, in the case that an operation, which is to set number of service execution processing systems and to increase or decrease assignment of hardware resources and to increase or decrease an amount of restrained input messages or the like, is necessary; and a process for executing actually control operation to set number of service execution processing systems and to increase or decrease assignment of hardware resources and to increase or decrease an amount of restrained input messages, in the case that said agreed service level is satisfied.

(Further Exemplary Embodiment 21)

A recording medium which records said service provision quality control program according to any one of Supplements 13 to 20.

BRIEF DESCRIPTION OF THE DRAWINGS

FIG. 25 exemplifies a schematic configuration in the case that an operation body out of service providing bodies, which provide a service provision quality control function and a service provision quality control system, is the application service provider (ASP),according to another exemplary embodiment of the present invention.

Figure 1:
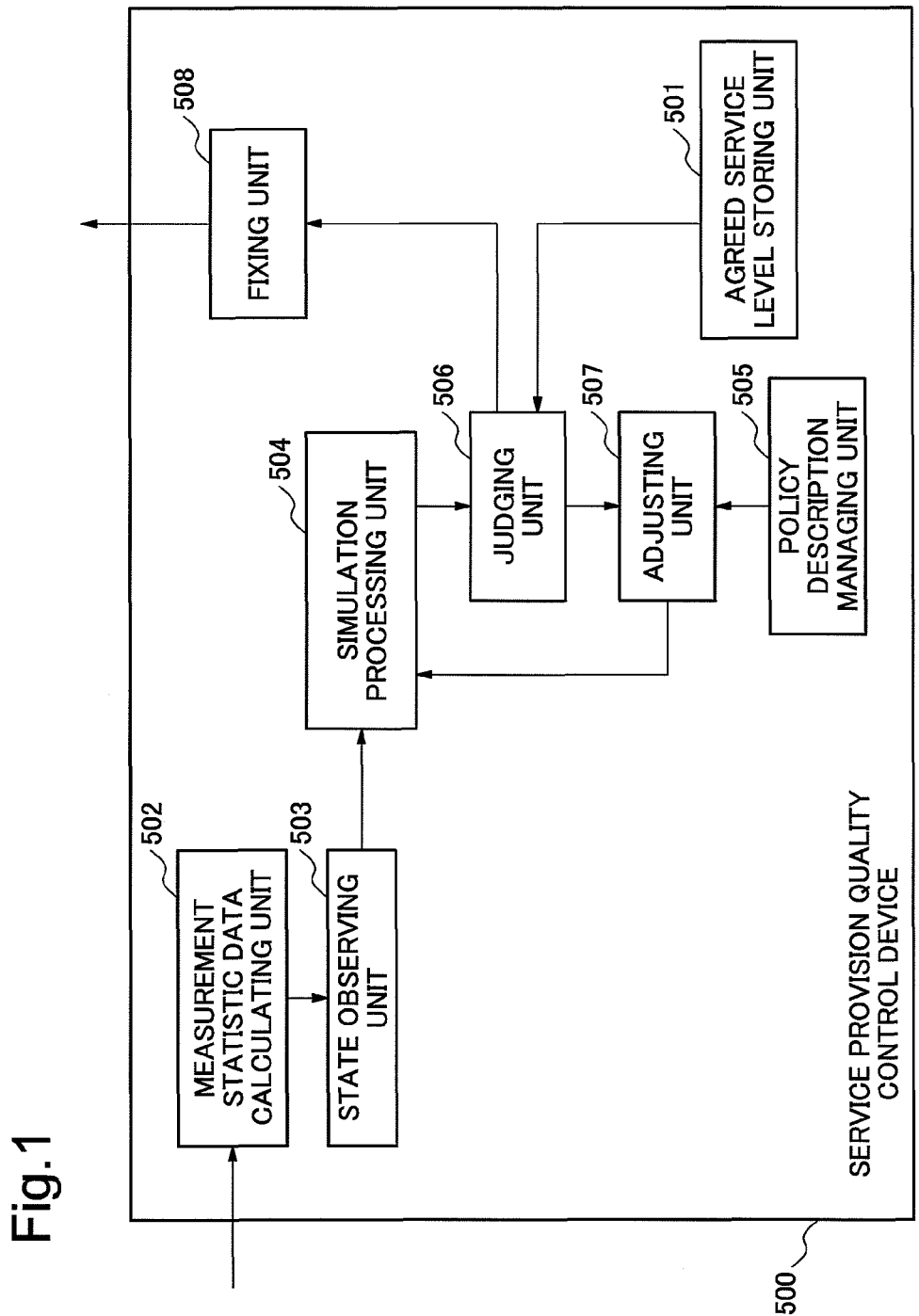
FIG. 1 shows a configuration of a service provision quality control device based on agreed service level according to the present invention.
Figure 2:
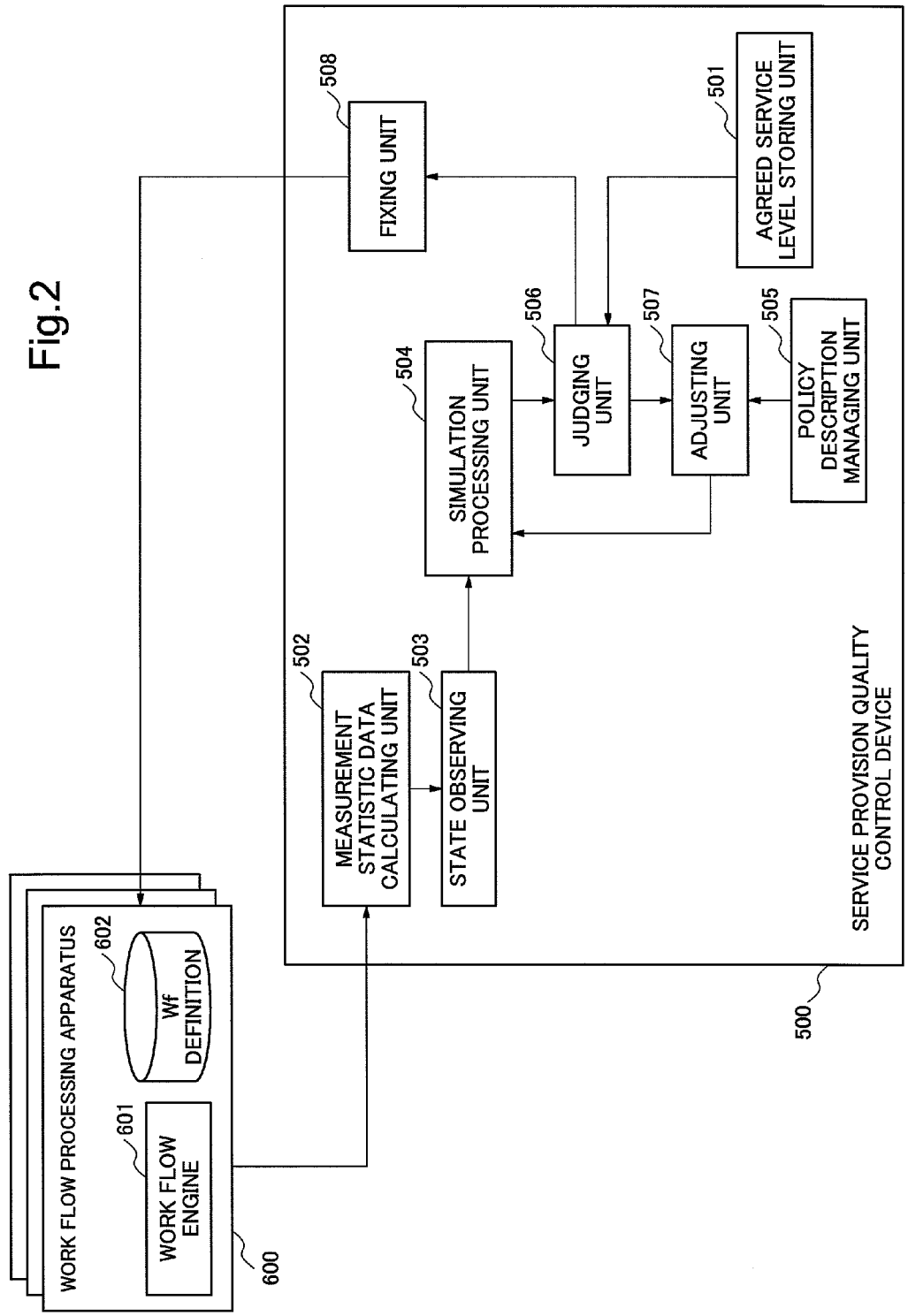
FIG. 2 shows a configuration of a service provision quality control system according to the present invention.
Figure 3:
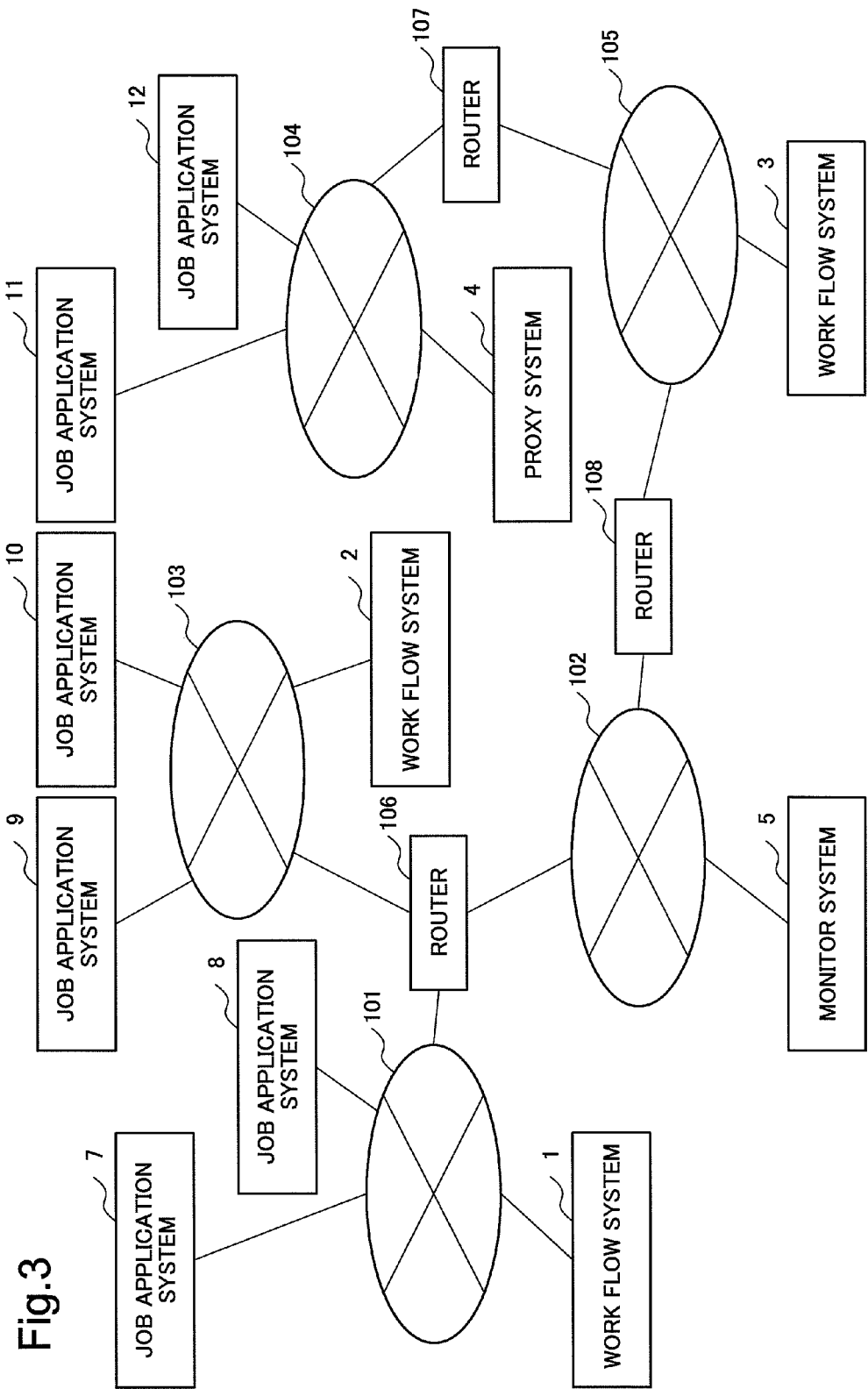
FIG. 3 is a diagram describing generally an environment to which the present invention is applied.
Figure 4:
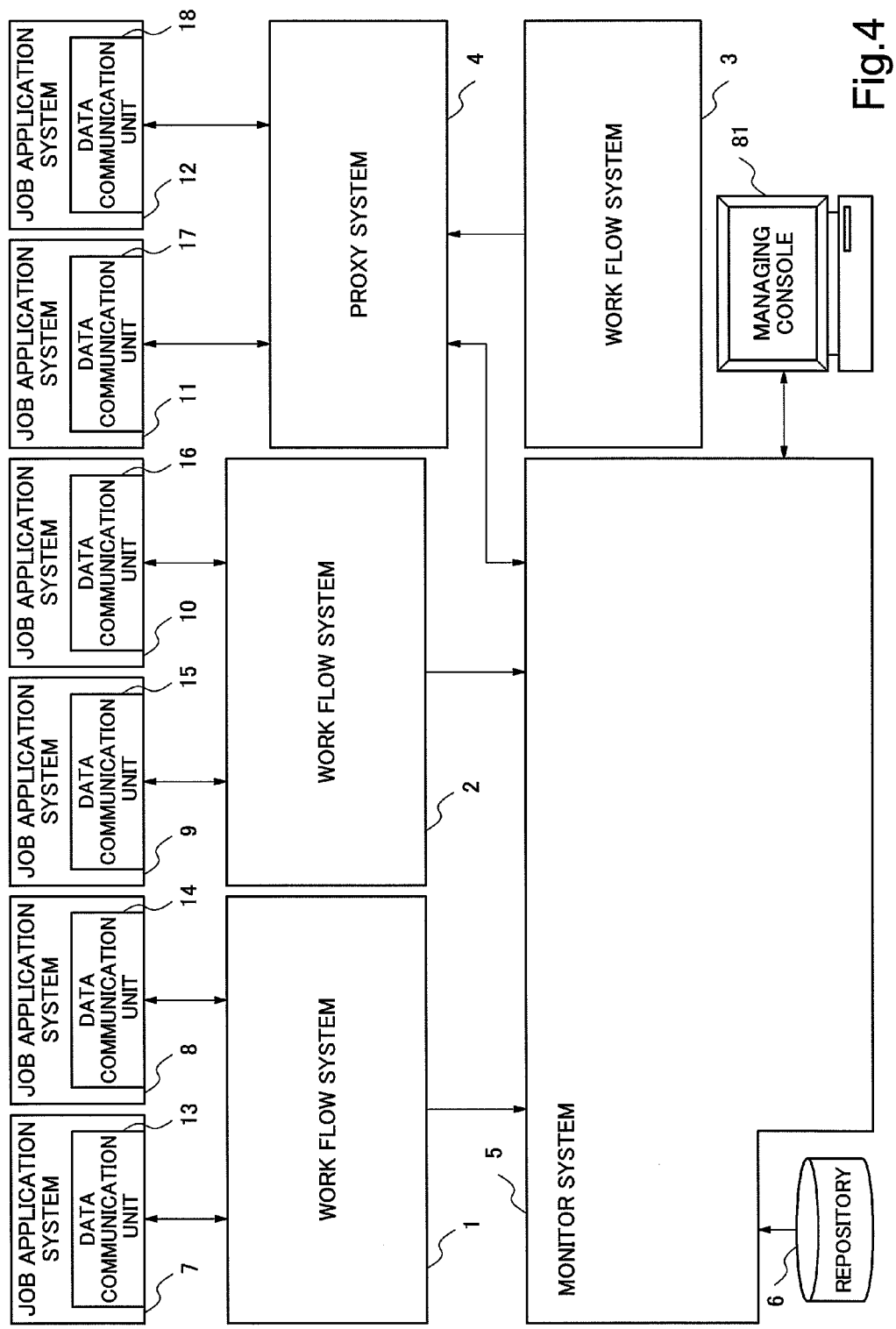
FIG. 4 is a diagram showing a configuration of a service provision quality control device based on agreed service level according to a preferable exemplary embodiment of the present invention.
Figure 5:
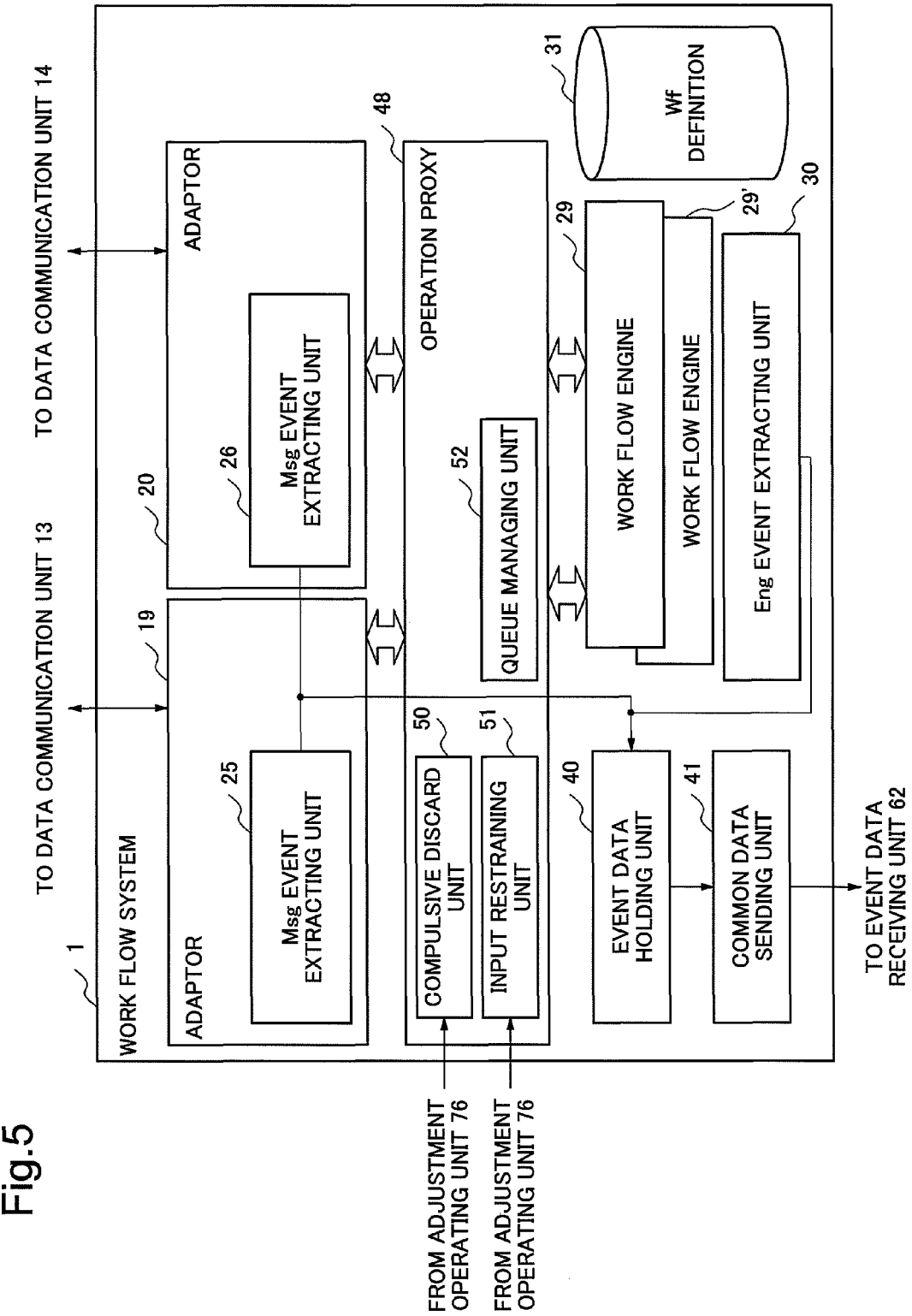
FIG. 5 is a diagram showing a configuration of the service provision quality control device based on the agreed service level according to the preferable exemplary embodiment of the present invention.
Figure 6:
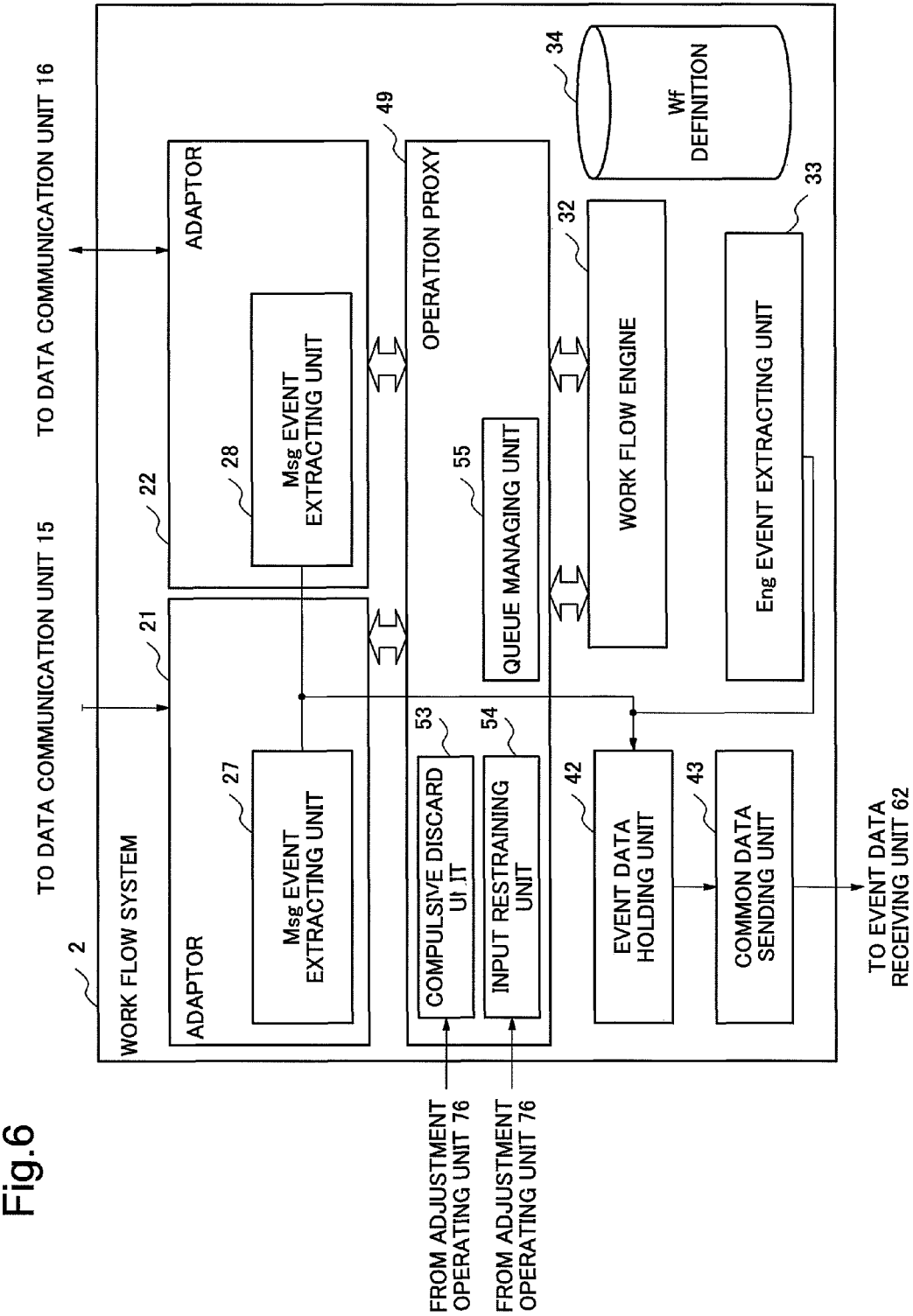
FIG. 6 is a diagram showing a configuration of the service provision quality control device based on the agreed service level according to the preferable exemplary embodiment of the present invention.
Figure 7:
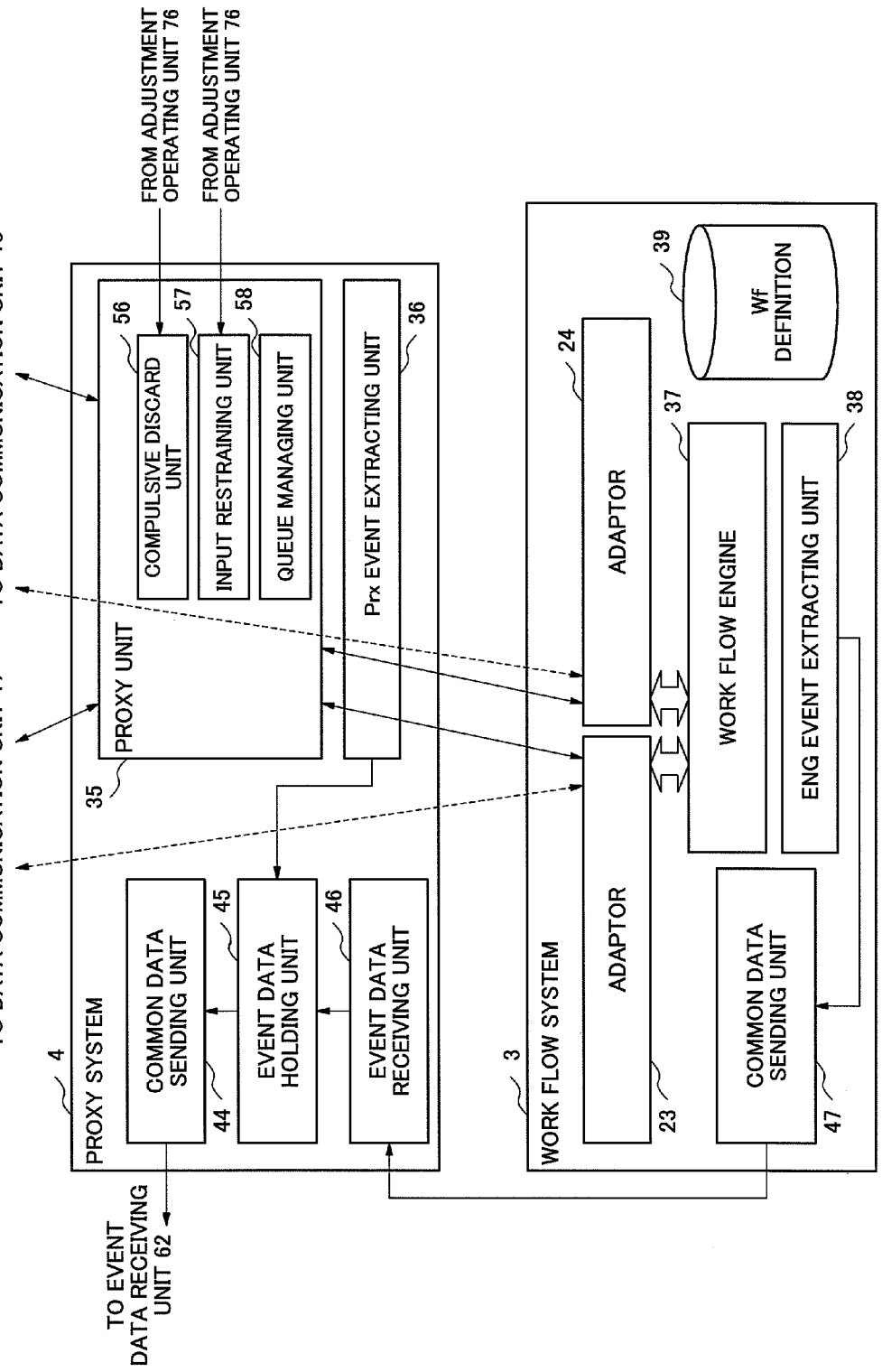
FIG. 7 is a diagram showing a configuration of the service provision quality control device based on the agreed service level according to the preferable exemplary embodiment of the present invention.
Figure 8:
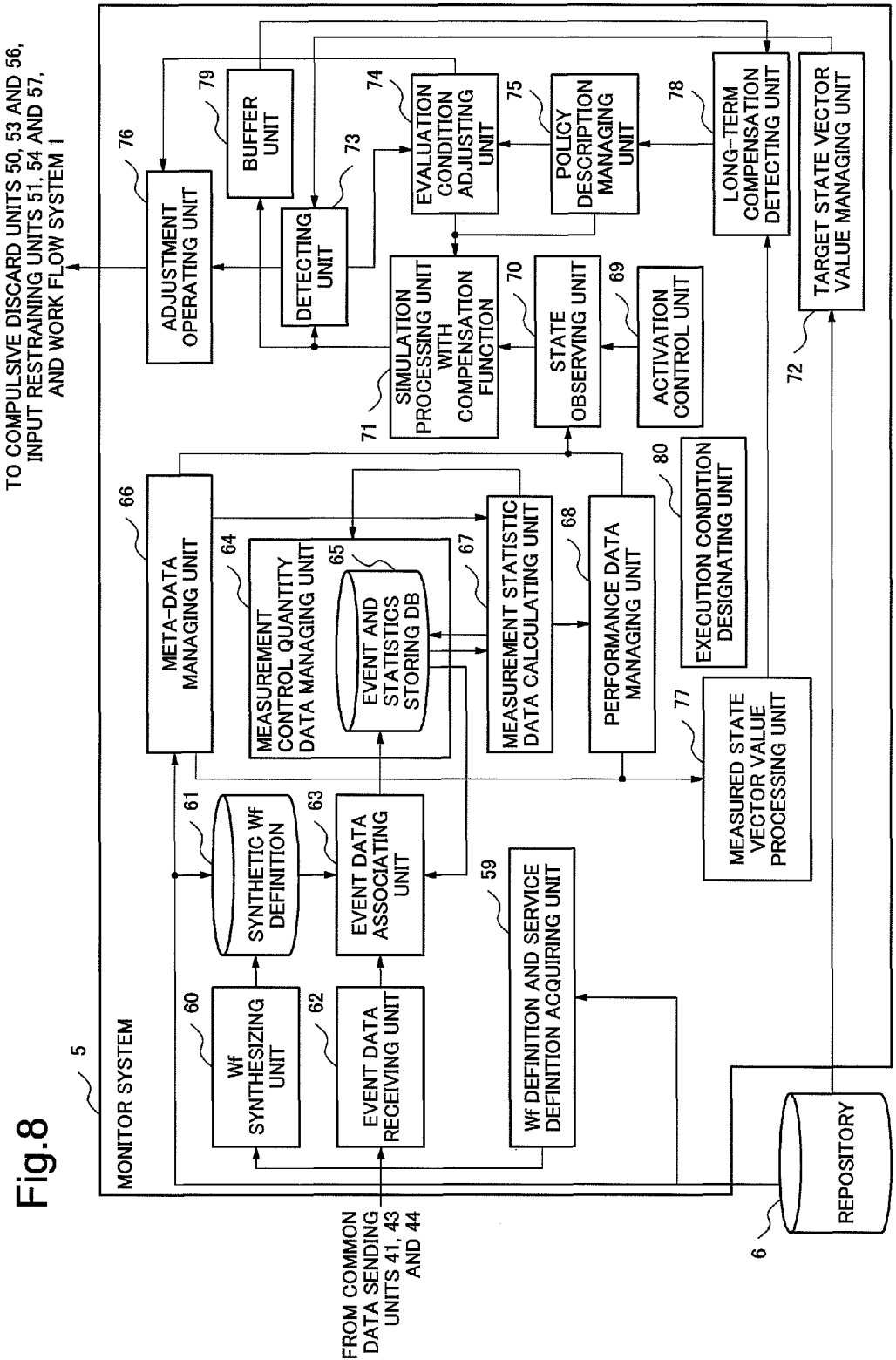
FIG. 8 is a diagram showing a configuration of the service provision quality control device based on the agreed service level according to the preferable exemplary embodiment of the present invention.
Figure 9:
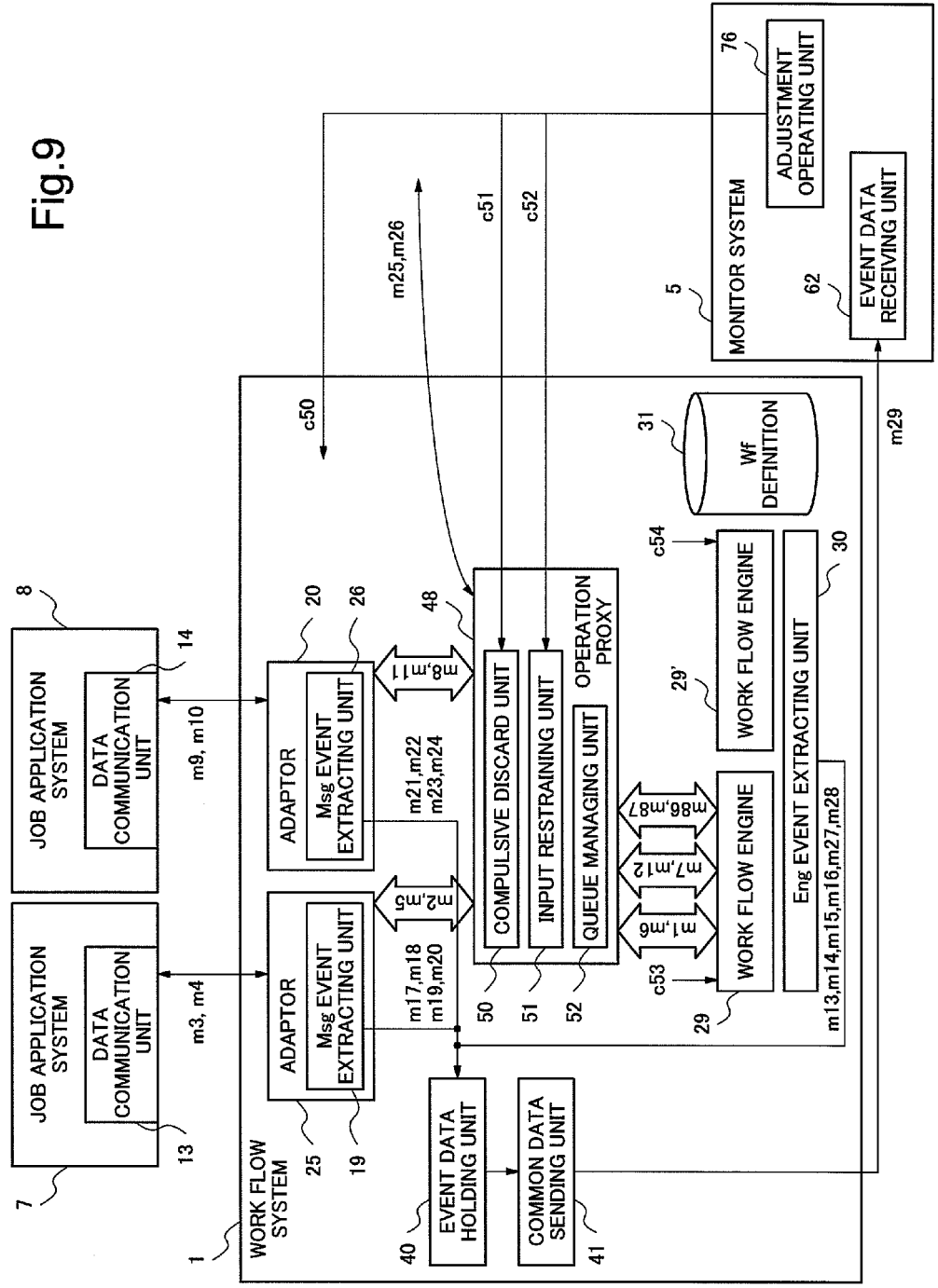
FIG. 9 shows an outline of a procedure executed at a time when event information is collected from a usual work flow engine, which is arranged distributedly, within the service provision quality control device in order to measure quality of service, according to the preferable exemplary embodiment of the present invention.
Figure 10:
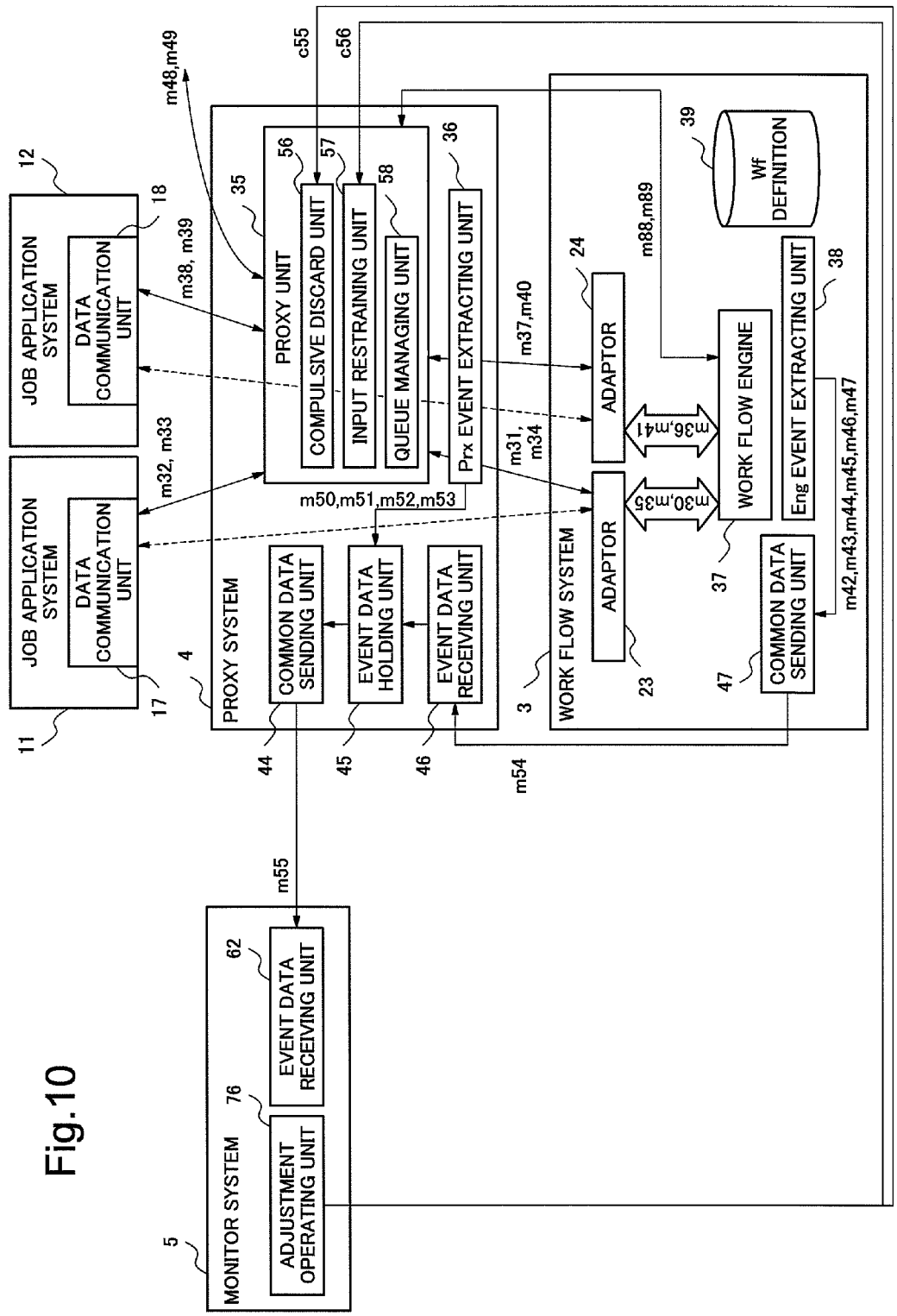
FIG. 10 show an outline of a procedure executed at a time when event information is collected from an existing work flow engine with original mounting via a Proxy system, within the service provision quality control device in order to measure quality of service, according to the preferable exemplary embodiment of the present invention.
Figure 11:
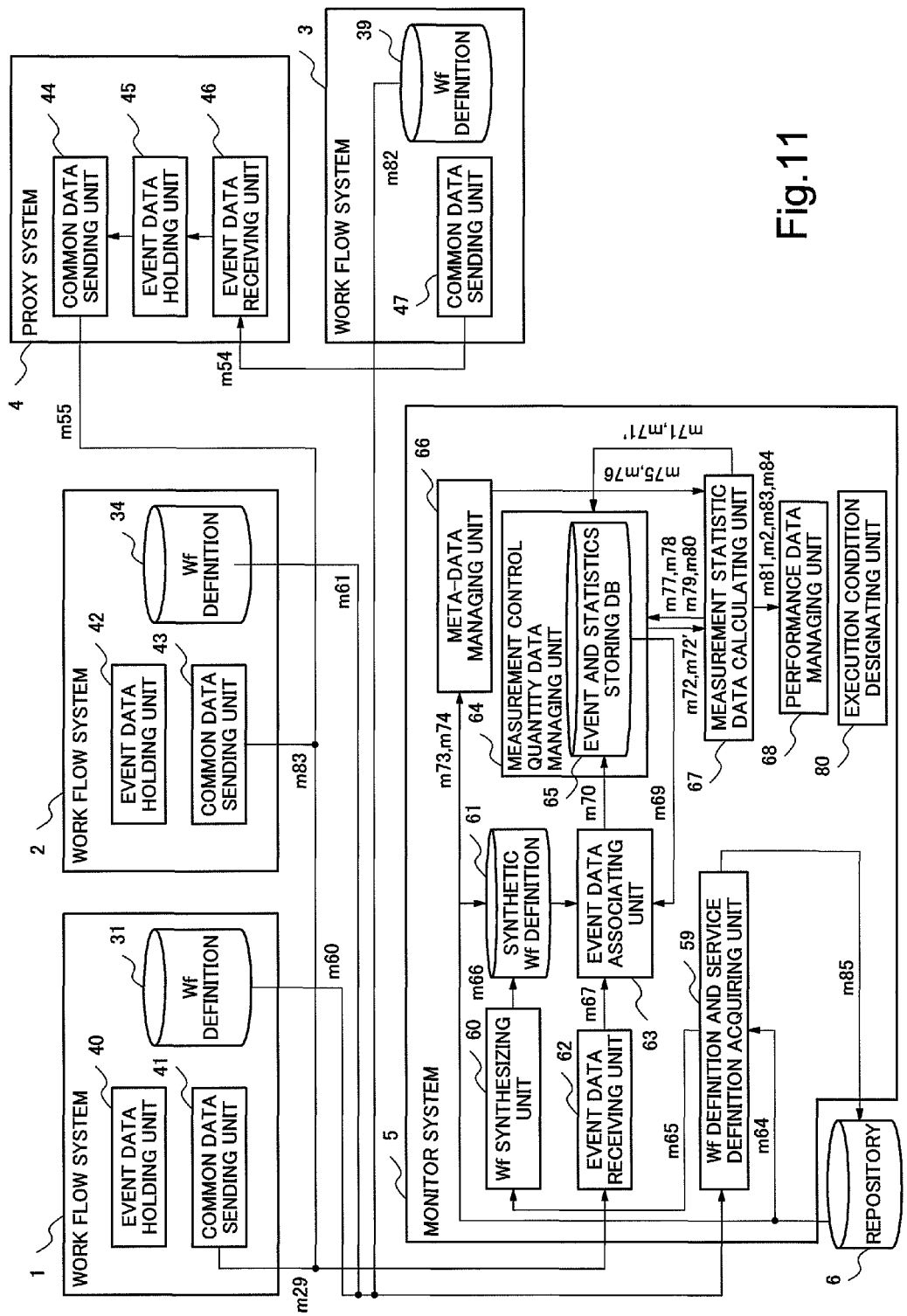
FIG. 11 shows an outline of a procedure executed at a time when a work flow definition, which is held independently in a work flow engine arranged distributedly, is collected and an integrated and synthesized Wf definition is generated, and a procedure for processing measured data to be used for control, within the service provision quality control device according to the preferable exemplary embodiment of the present invention.
Figure 12:
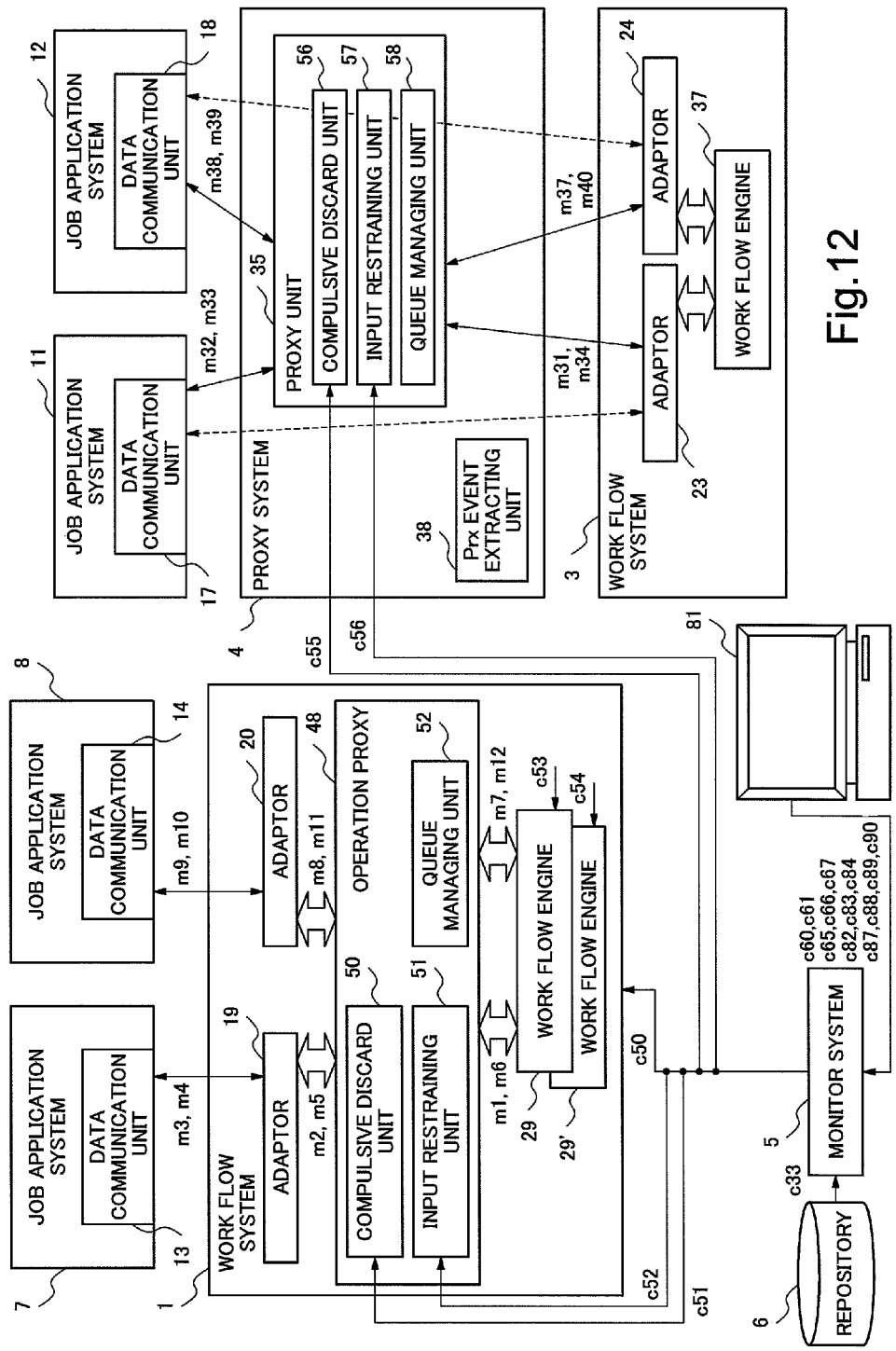
FIG. 12 shows an outline of a procedure executed at a time when a service provision quality control based on the agreed service level is executed, within the service provision quality control device according to the preferable exemplary embodiment of the present invention.
Figure 13:
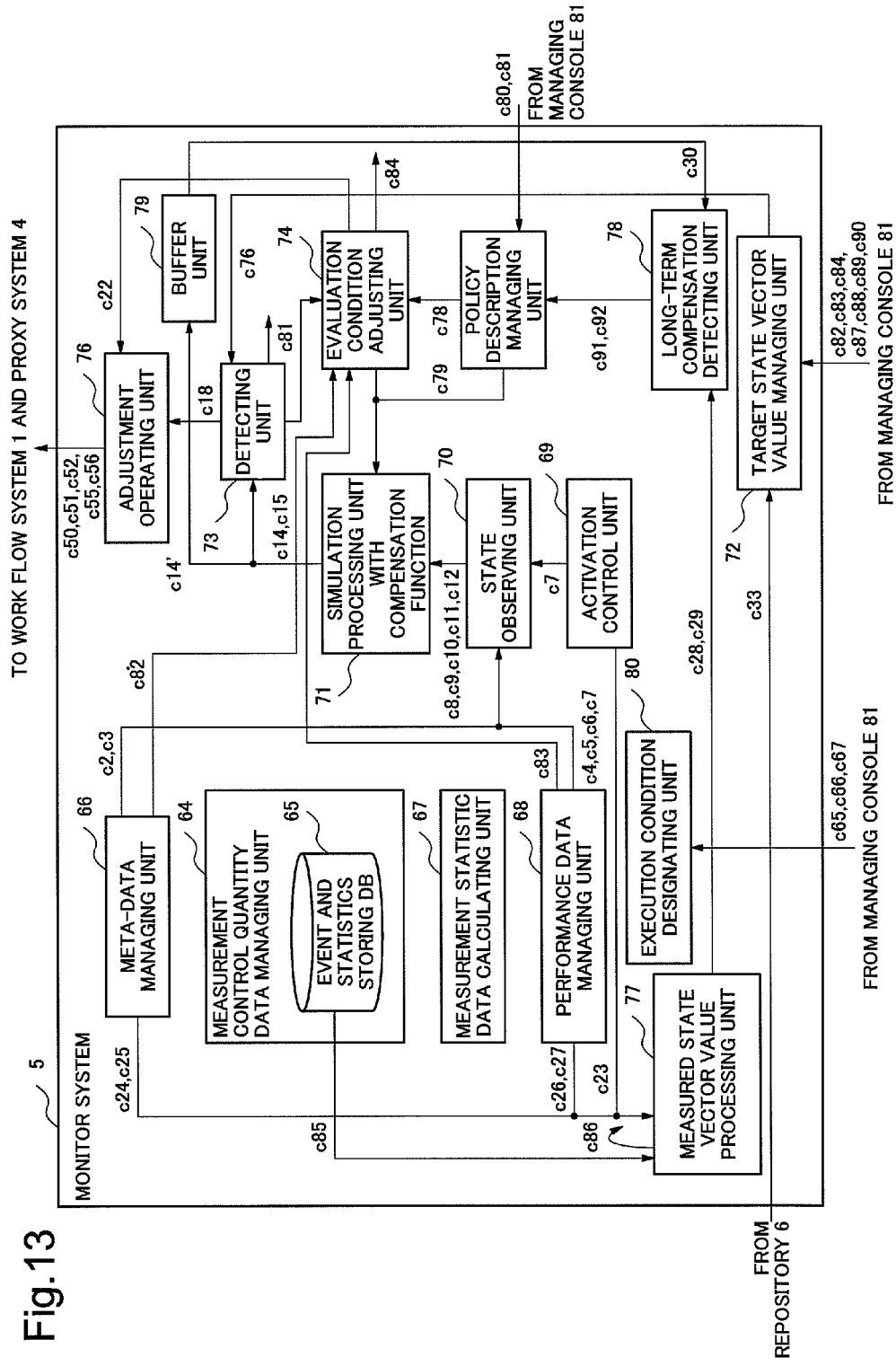
FIG. 13 shows an outline of a procedure executed at a time when the service provision quality control based on the agreed service level is executed, within the service provision quality control device according to the preferable exemplary embodiment of the present invention.
Figure 14:
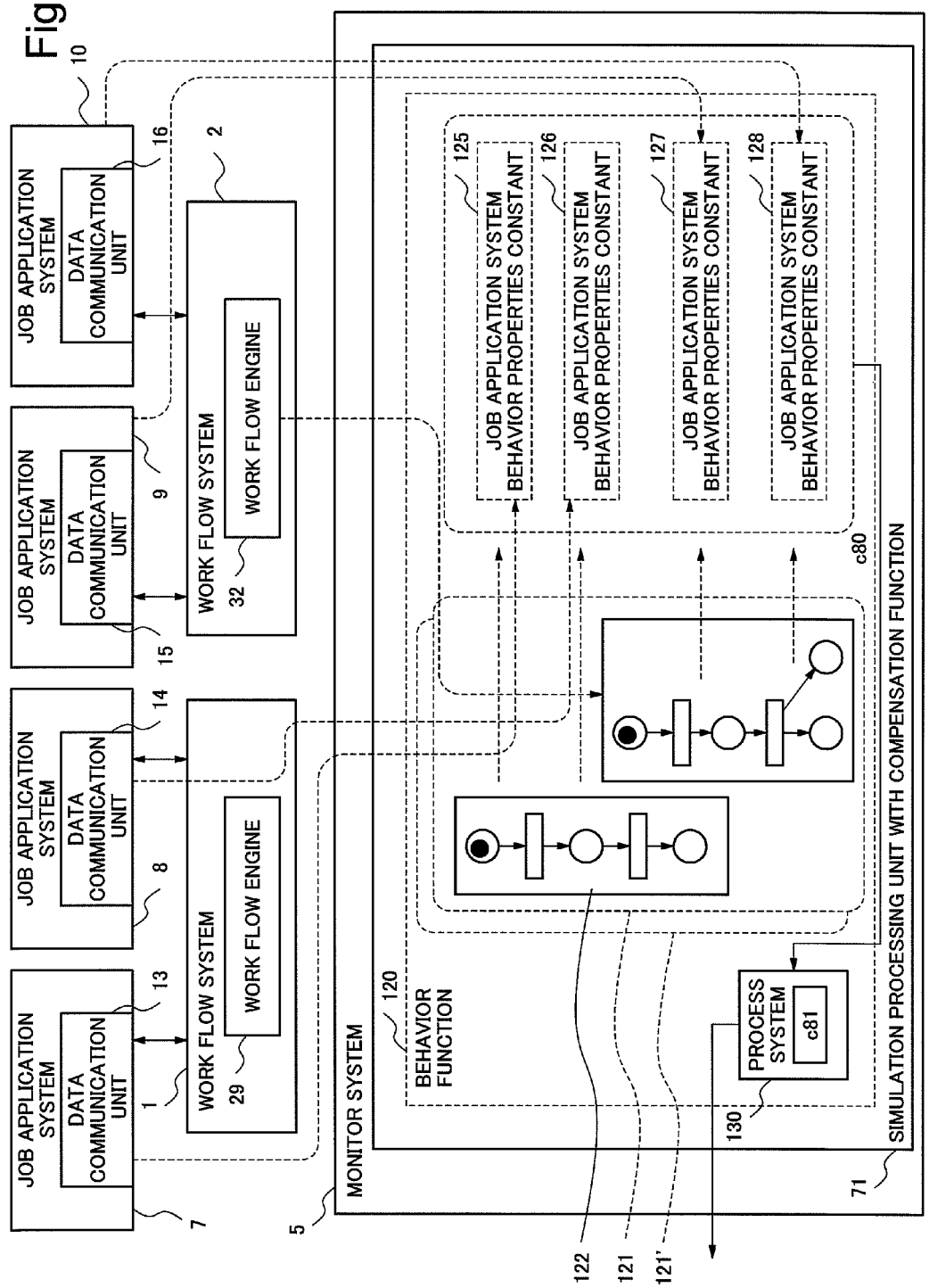
FIG. 14 is a schematic diagram showing a configuration of a simulation processing unit with compensation function which is used in the service provision quality control device, according to the preferable exemplary embodiment of the present invention.
Figure 15:
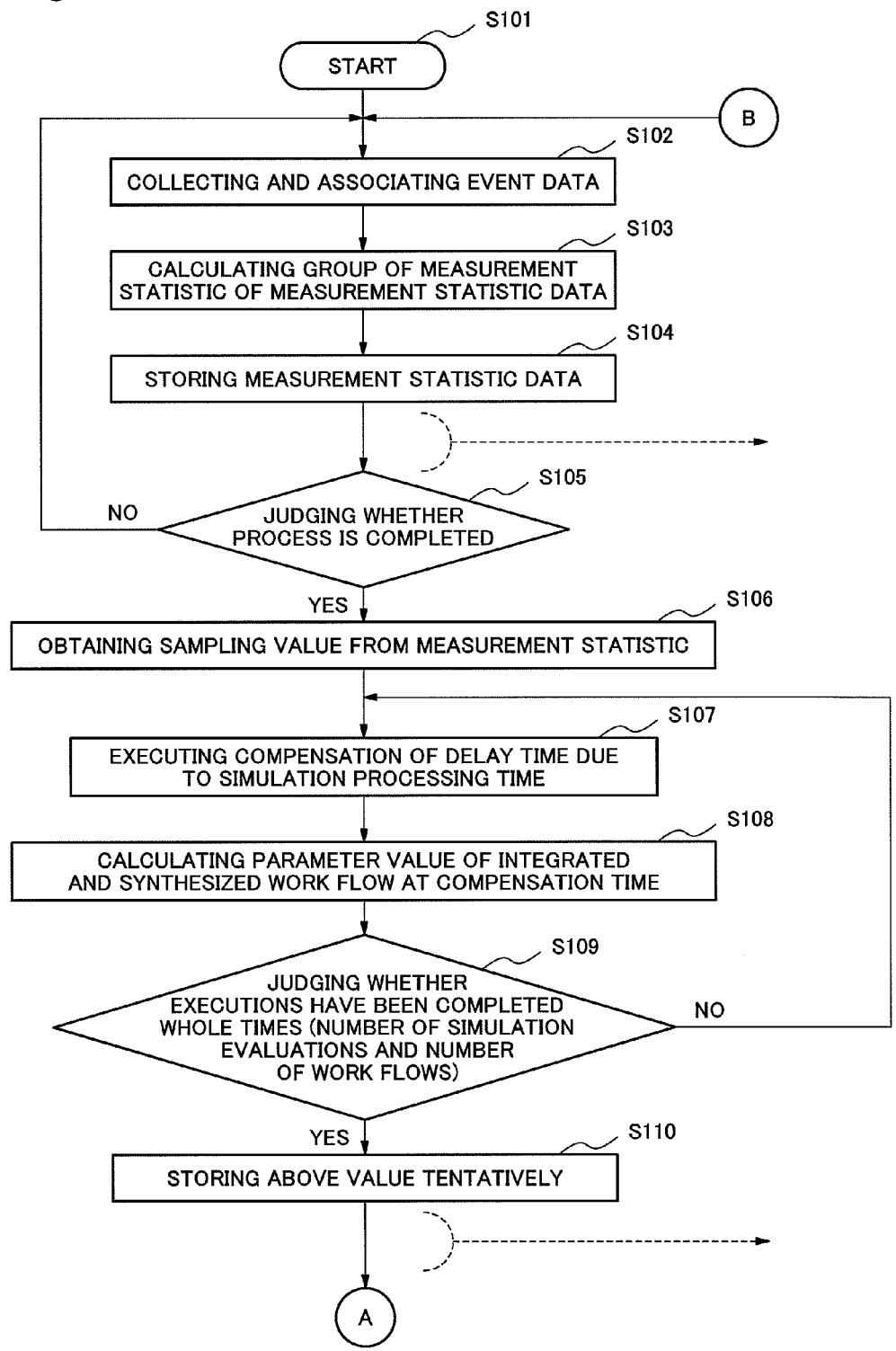
FIG. 15 is a flowchart showing an outline of a control procedure which is executed on the basis of a control method for executing the service provision quality control based on the agreed service level, according to the present invention.
Figure 16:
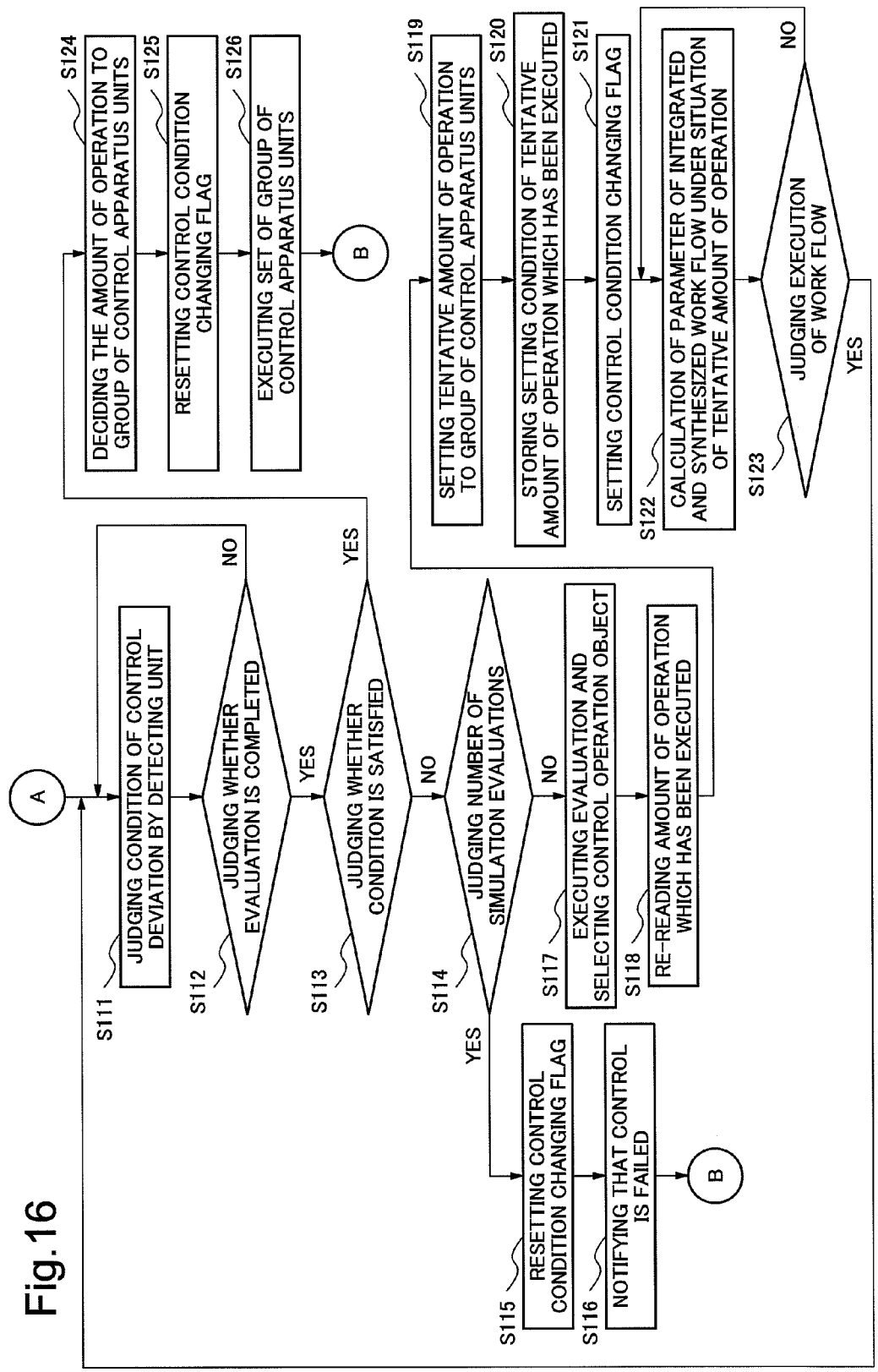
FIG. 16 is a flowchart showing an outline of a control procedure which is executed on the basis of the control method for executing the service provision quality control based on the agreed service level, according to the present invention.
Figure 17:
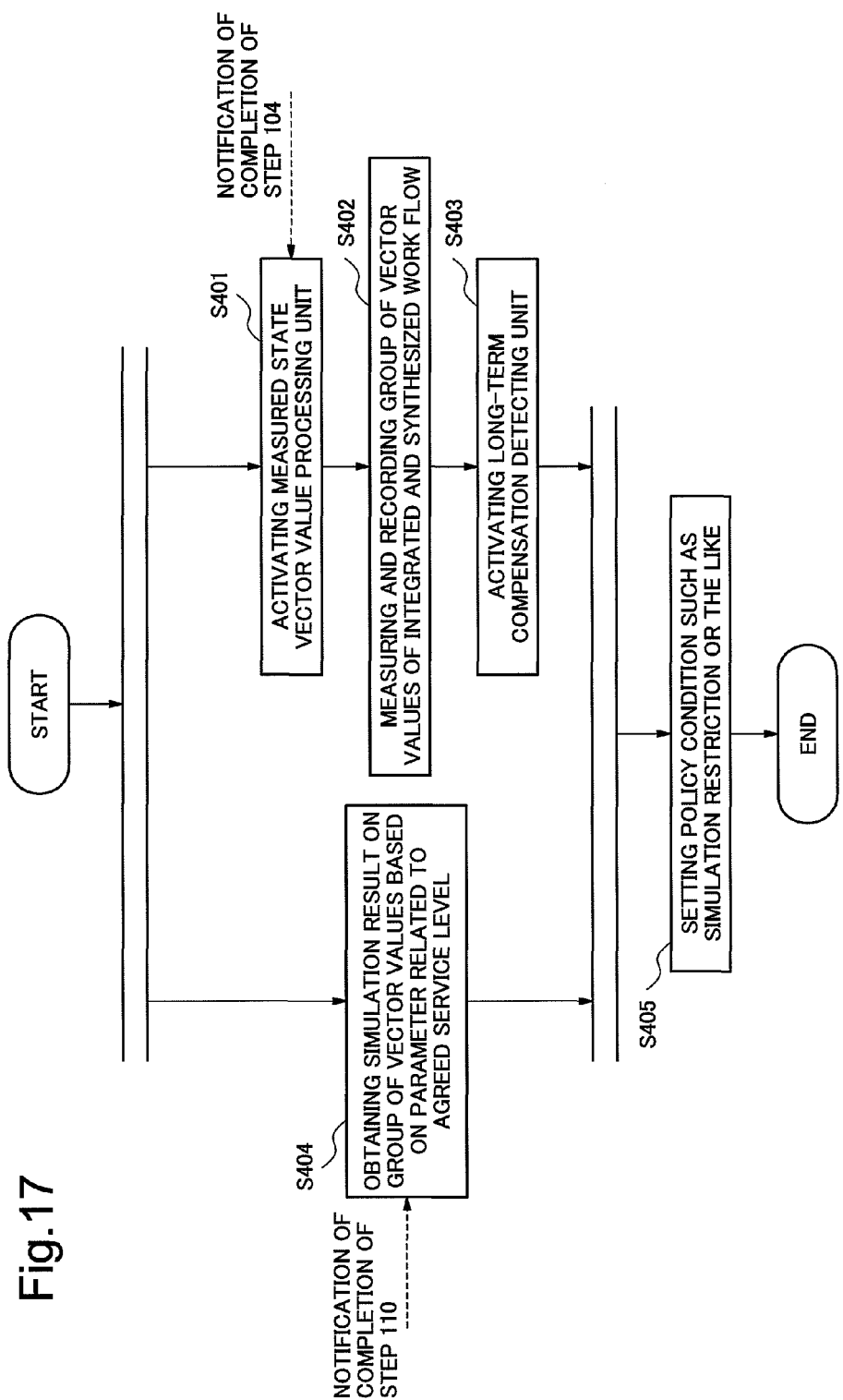
FIG. 17 is a flowchart showing an outline of a procedure executed at a time when a candidate for the operation, which should be executed, is selected on the basis of the control method for executing the service provision quality control based on the agreed service level, according to the present invention.
Figure 18:
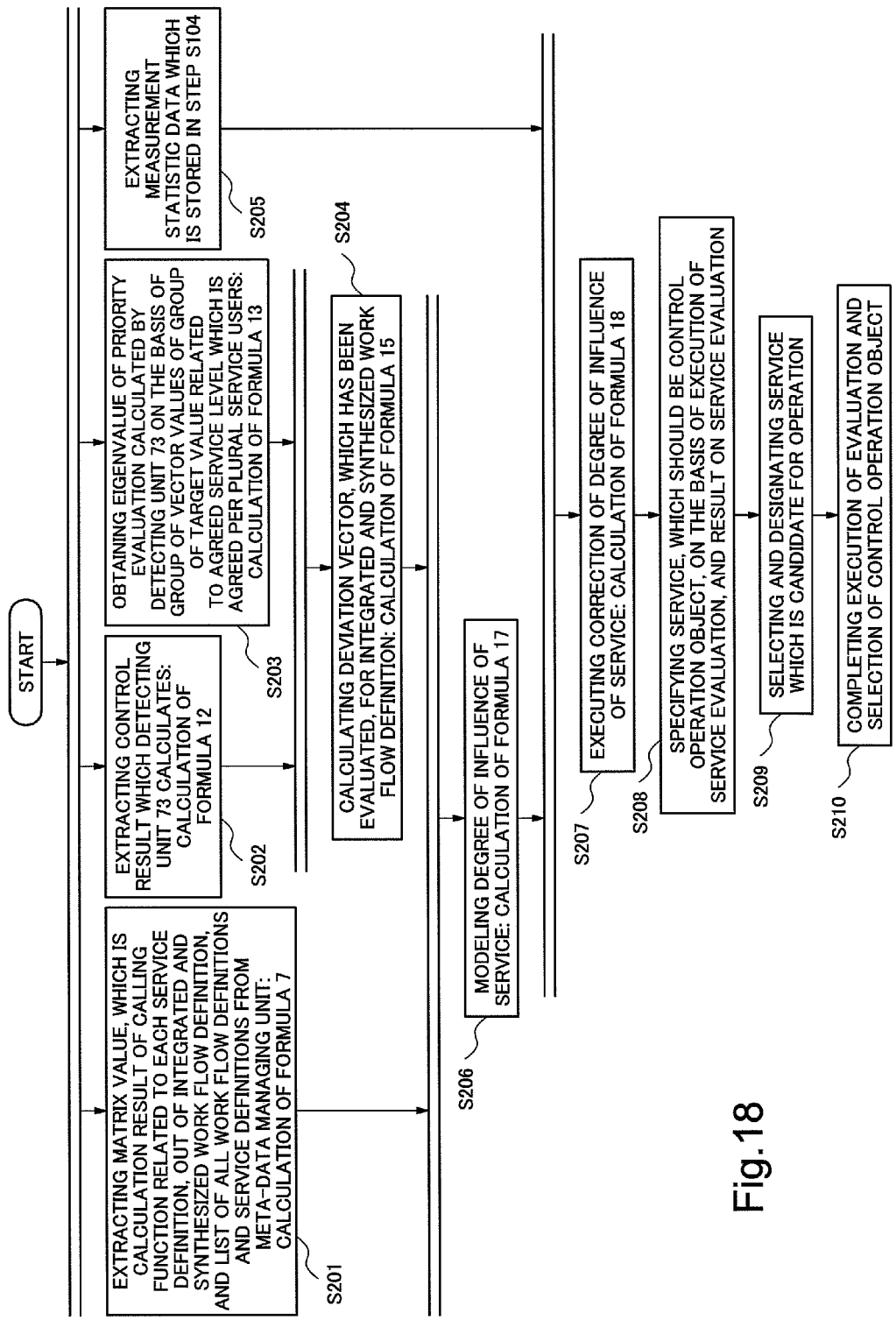
FIG. 18 is a flowchart showing an outline of a procedure for executing determination of a control operation on the basis of the control method for executing the service provision quality control based on the agreed service level, according to the present invention.
Figure 19:
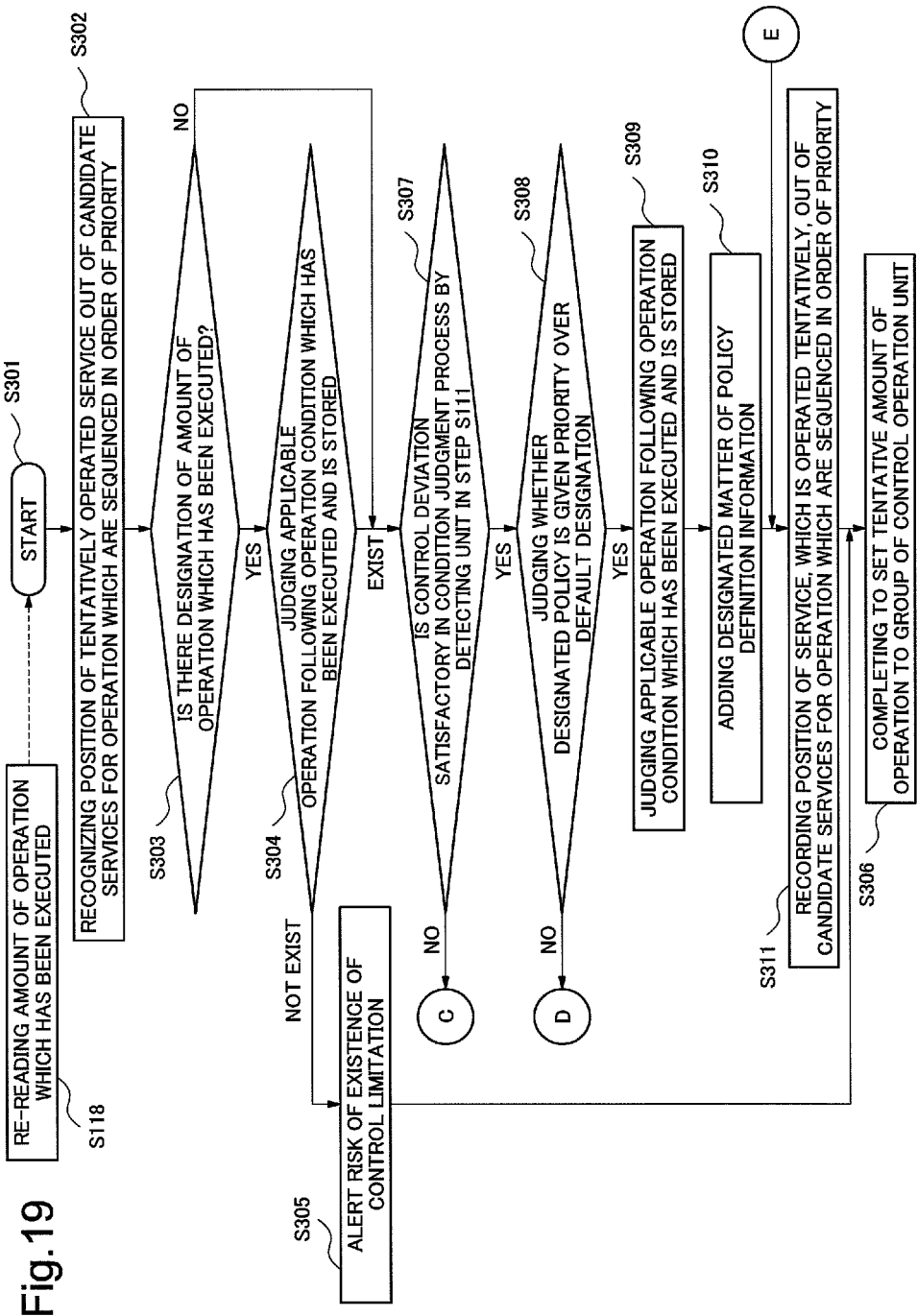
FIG. 19 is a flowchart showing an outline of a procedure for executing determination of the control operation on the basis of the control method for executing the service provision quality control based on the agreed service level, according to the present invention.
Figure 20:
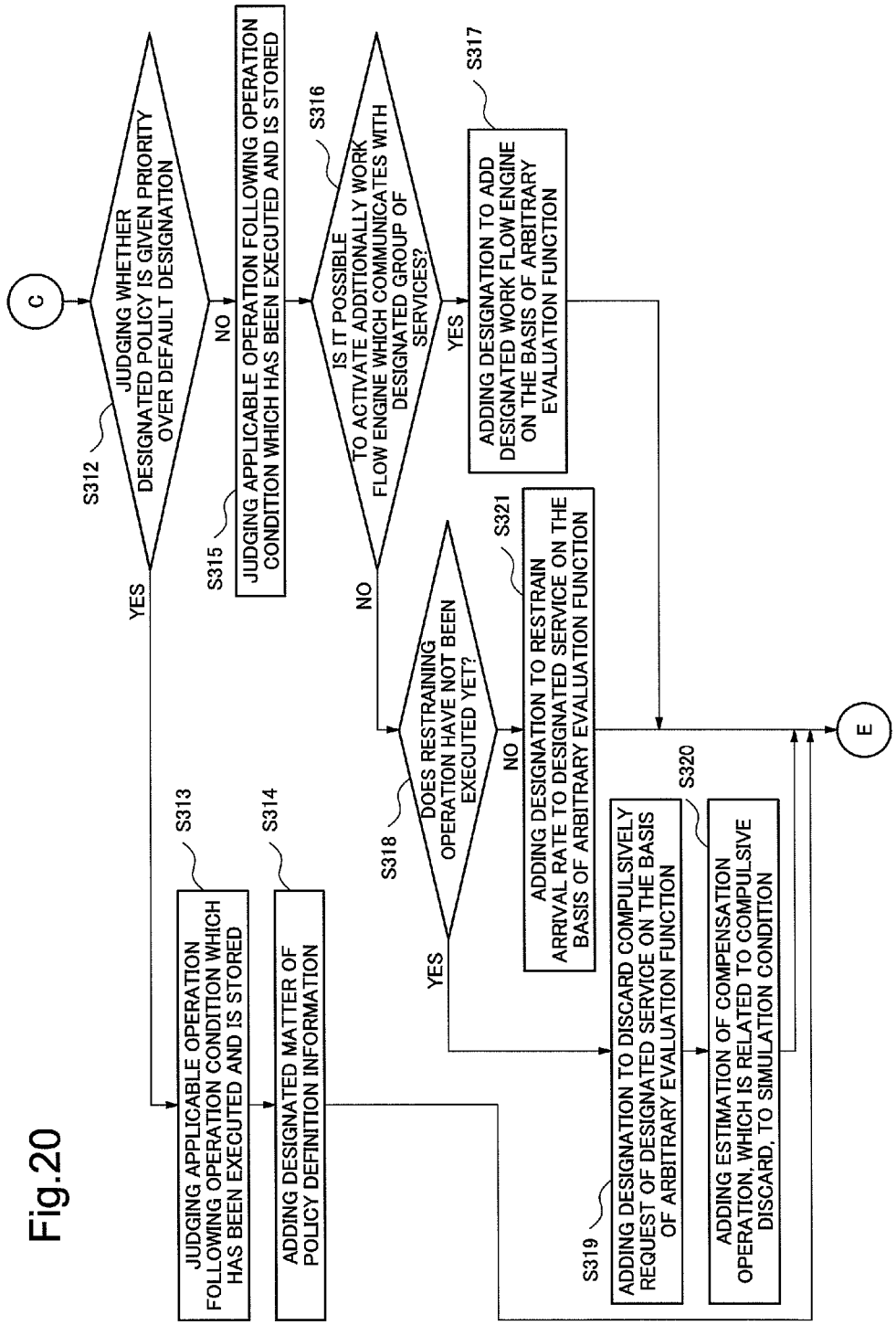
FIG. 20 is a flowchart showing an outline of a procedure for executing determination of the control operation on the basis of the control method for executing the service provision quality control based on the agreed service level, according to the present invention.
Figure 21:
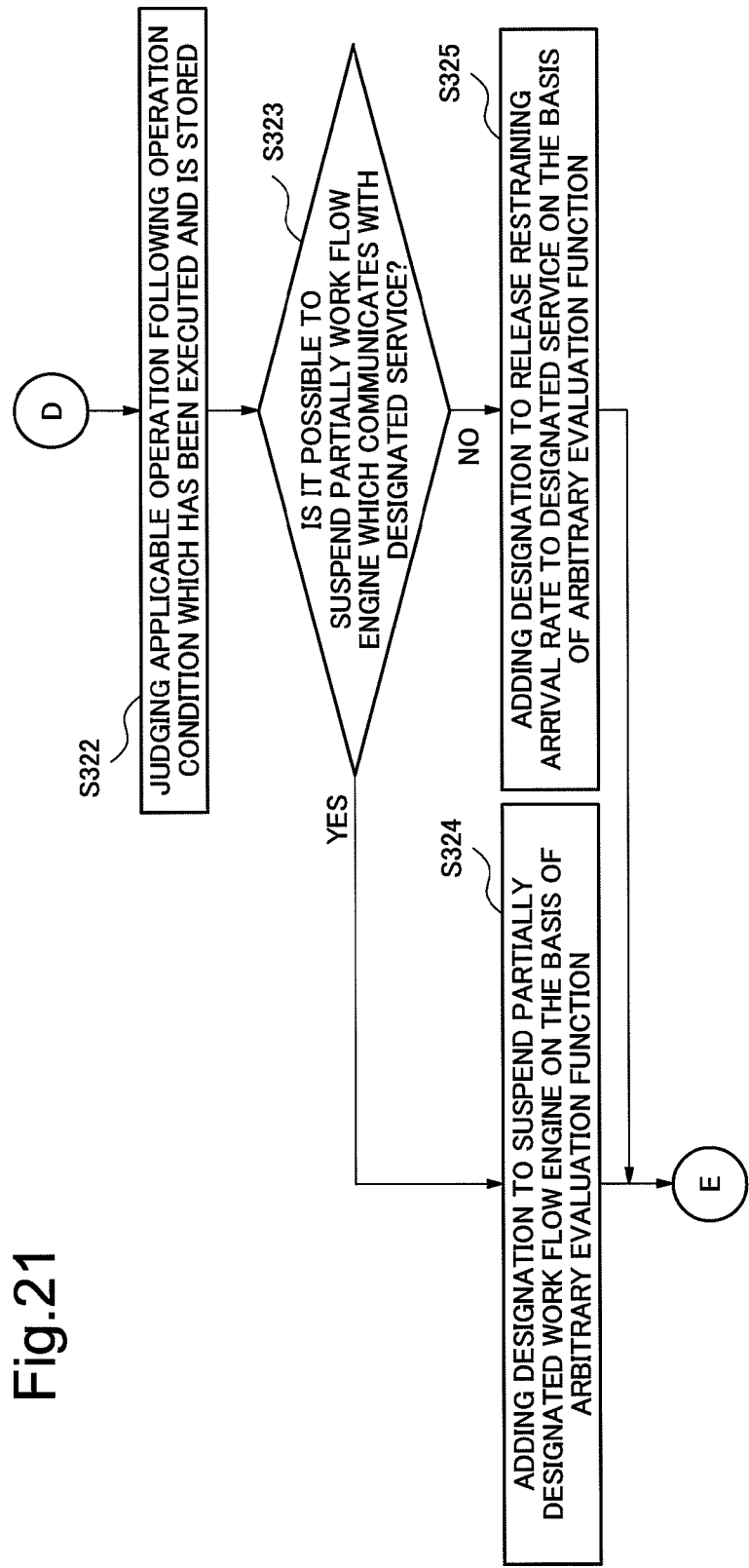
FIG. 21 is a flowchart showing an outline of a procedure for executing determination of the control operation on the basis of the control method for executing the service provision quality control based on the agreed service level, according to the present invention.
Figure 22:
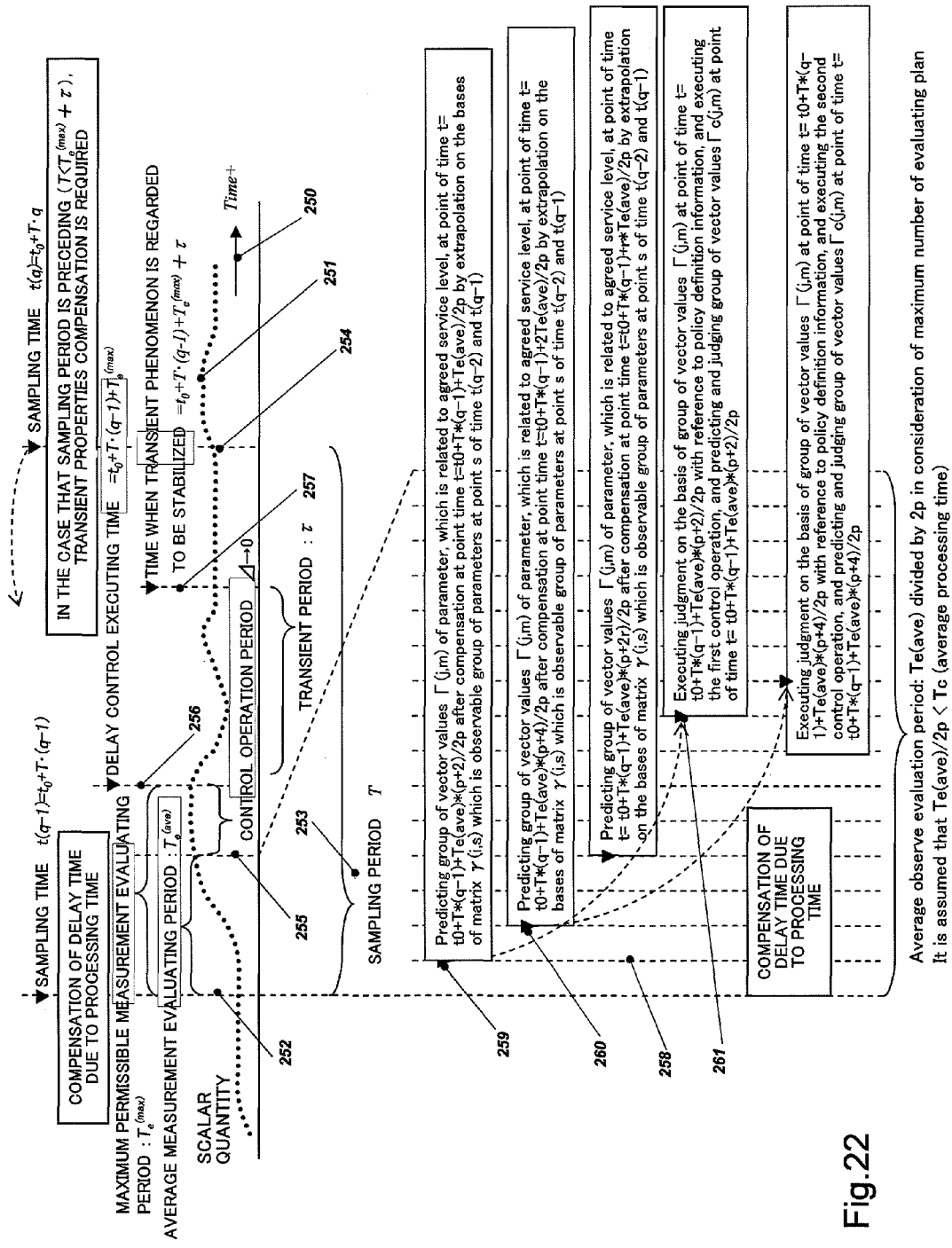
FIG. 22 is a schematic diagram showing time base behavior of process in the control method for executing the service provision quality control based on the agreed service level, according to the present invention.
Figure 23:
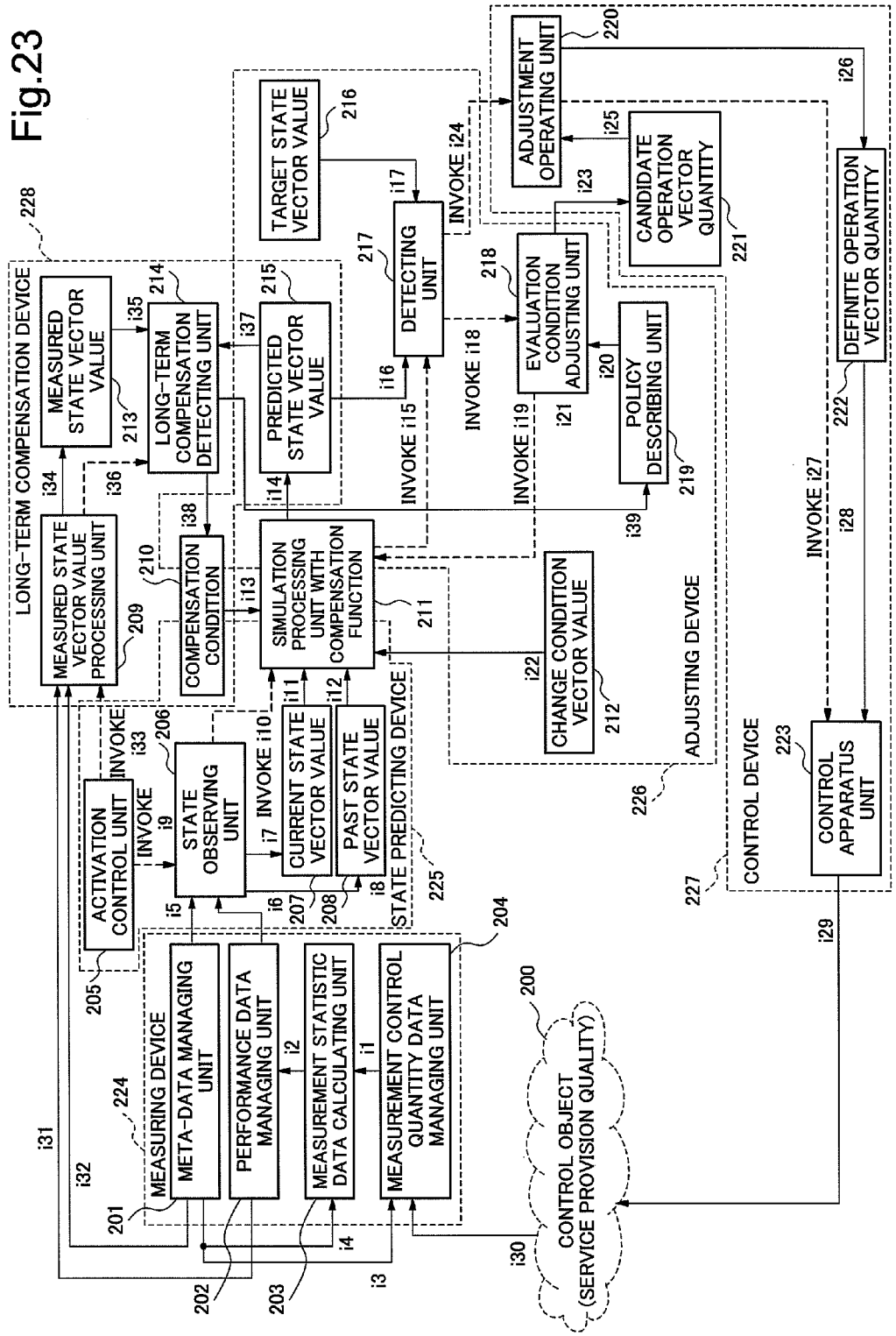
FIG. 23 is a block diagram to define the control method for executing the service provision quality control based on the agreed service level, according to the present invention.
Figure 24:
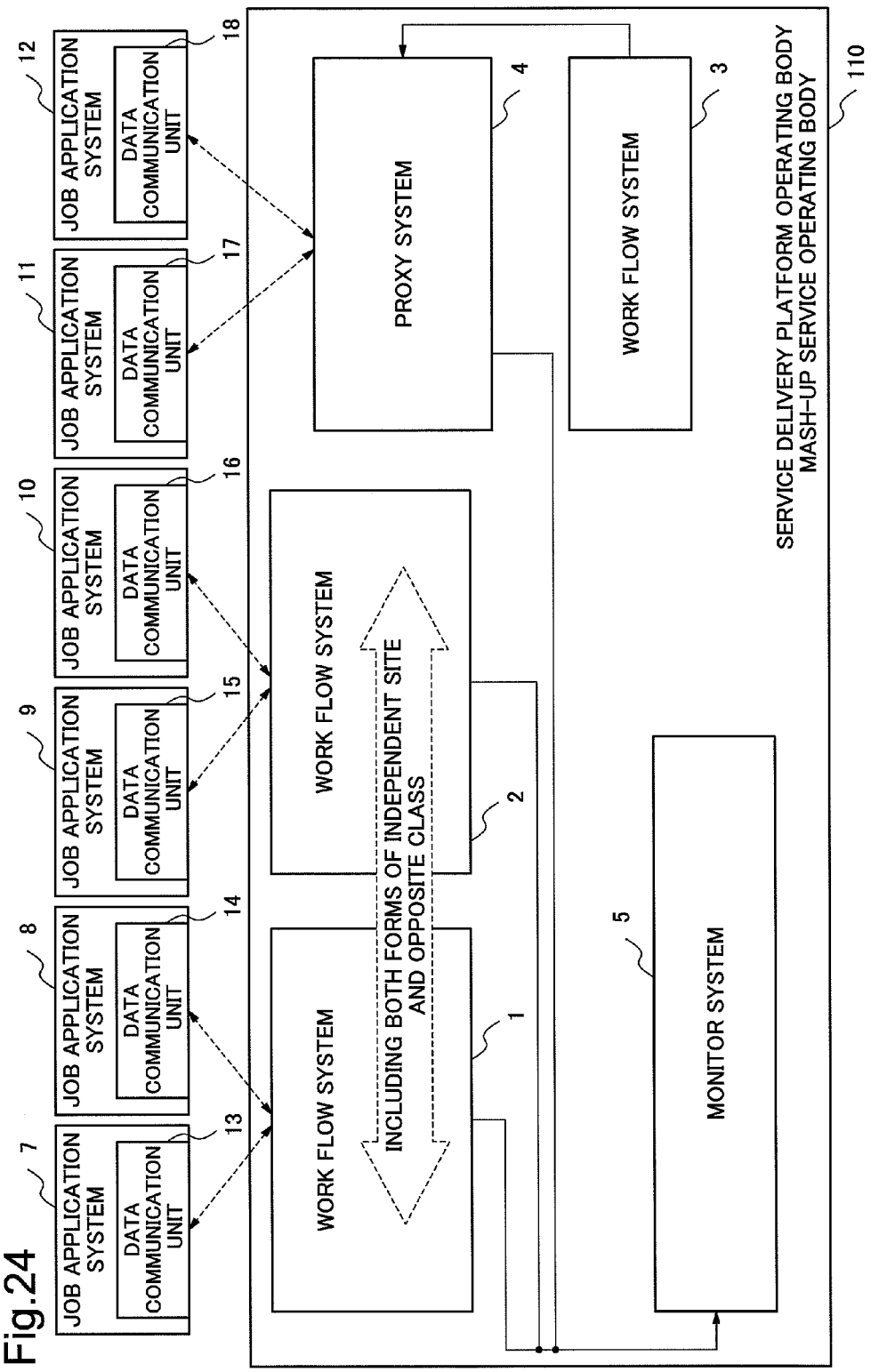
FIG. 24 exemplifies a schematic configuration in the case that an operation body out of service providing bodies, which provide a service provision quality control function and a service provision quality control system, operates service delivery platform (SDP), according to another exemplary embodiment of the present invention.

[Description of Code]
1, 2 and 3 Work flow system
4 Proxy system
5 Monitor system
6 Repository
7, 8, 9, 10, 11 and 12 Job application system
13, 14, 15, 16, 17 and 18 Data communication unit
19, 20, 21, 22, 23 and 24 Adaptor
25, 26, 27 and 28 Msg event extracting unit
29, 29', 32 and 37 Work flow engine
30, 33 and 38 Eng event extracting unit
31, 34 and 39 Work flow definition
35 Proxy unit
36 Prx event extracting unit
40, 42, 45 and 47 Event data holding unit
41, 43, 44 and 46 Common data sending unit
48 or 49 Operation proxy
50, 53 and 56 Compulsive discard unit
51, 54 and 57 Input restraining unit
52, 55 and 58 Queue managing unit
59 Work flow definition and service definition acquiring unit
60 Wf synthesizing unit
Synthetic Wf definition
62 Event data receiving unit
63 Event data associating unit
64 Measurement control quantity data managing unit
65 Event and statistics data storing DB
66 Meta-data managing unit
67 Measurement statistic data calculating unit
68 Performance data managing unit
69 Activation control unit
70 State observing unit
71 Simulation processing unit with compensation function
72 Target state vector value managing unit 73 Detecting unit
74 Evaluation condition adjusting unit
75 Policy description managing unit
76 Adjustment operating unit
77 Measured state vector value processing unit
78 Long-time compensation detecting unit
79 Buffer unit
80 Execution condition designating unit
81 Managing console
101, 102, 103, 104 and 105 Sub-network
106, 107 and 108 Router
110 Service delivery platform operating body and mash-up service operating body
111 Application service provider and service providing body
120 Behavior function
121 and 121' Sequential machine simulating unit
122 Group of component work flow models
123 Group of component work flow models
124 Service properties function calculating unit
125, 126, 127 and 128 Job application system behavior properties constant
130 Process system
200 Control object
201 Meta-data managing unit
202 Performance data managing unit
203 Measurement statistic data calculating unit
204 Measurement control quantity managing unit
205 Activation control unit
206 State Observing unit
207 Current state vector value
208 Past state vector value
209 Measured state vector value processing unit
210 Compensation condition
211 Simulation processing unit with compensation function
212 Change condition vector value
213 Measured state vector value
214 Long-term compensation detecting unit
215 Predicted state vector value
216 Target state vector value
217 Detecting unit
218 Evaluation condition adjusting unit
219 Policy describing unit
220 Adjustment operating unit
221 Candidate operation vector quantity
222 Definite operation vector quantity
223 Control apparatus unit
224 Measuring device
225 State predicting device
226 Adjusting device
227 Control device
228 Long-term compensation device
250 Horizontal axis
251 Curve
252, 254, 255, 256, 257, 259, 260 and 261 Time
253 Period
258 First unit time
c1 Activation request
c2 and c24 List of integrated and synthesized work flow definition
c3 and c25 Set of definition information on all work flow definitions and service definitions
c4 Calculation result on parameter 1 at current point of time
c5 Accumulated value and average value of parameter 1 until current point of time
c6 Calculation result on parameter 2 at current point of time
c7 Accumulated value and average value of parameter 2 until current point of time
c8 State matrix at sampling time
c9 State matrix at time previous to sampling time by one sampling period
c10 Set of definition information
c11 Set of integrated and synthesized work flow definition
c12, c17, c18, c23, c28, c60, c64, c65 and c89 Invoke command
c13 and c19 Policy definition information for control operation
c14, c14' and c30 Group of vector values meaning group of parameters on agreed service level
c15 and c20 Re-invoke command
c16 and c63 Group of vector values of group of target values on agreed service level
c21 and c22 Tentative control operation list designating information
c26 Calculation result of parameter 1 at current point of time and accumulated value and average value of parameter 1 until current point of time
c27 Calculation result of parameter 2 at current point of time and accumulated value and average value of parameter 2 until current point of time
c29 Group of measured vector values
c31 Policy description updating command
c32 Compensation condition formula updating command
c50, c51, c52, c55 and c56 Control message
c53 and c54 Control command
c61 Group of designated parameters
c62 Information on relative priority
c66 Group of parameter names and group of parameter values to be updated
c67 Response form designating Information
c80 Group of parameters
c81 Group of calculation parameters
c82 Data on matrix value which is corresponding to calculated number of calling service definition
c83 Measurement statistic data
c84 and c91 Alarm
c85 All event data
c86 group of measured vector values on state of agreed service level
c87 Specific information
c88 Relative information between groups of parameter values
c90 Response form designating information
i1 Data on event
i2 Group of parameters
i3 Information such as formal meaning
i4 and i10 Information
i5 Information such as formal meaning
i6 Current value, accumulated value and average value on group of parameters
i7 and i11 Current state vector value
i8 and i12 Past state vector value
i9 Activation request
i13 Setting steady-state value
i14 Predicted value
i16 and i37 Vector value identical to predicted state vector value
i11 Vector value identical to vector value of group of target value
i18, i19, i24, i27, i33 and i36 Argument
i21 Amount of control operation determined tentatively
i23 Update information
i25 Specific vector value i26 Vector value
i28 Required scalar value or required vector value
i29 Amount of control operation
i30 Event information
i31 Current value, accumulated value, average value or the like.
i32 Information of formal meaning on management unit or the like
i34 Vector value identical to measured state vector value
i38 and i39 Correcting and updating information
m1, m2, m3, m7, m8, m9, m25, m30, m31, m32, m36, m37, m38, m48, m86 and m88 Process request message
m4, m5, m6, m10, m11, m12, m26, m33, m34, m35, m49, m87 and m89 Process response message
m13, m14, m15, m16, m17, m18, m19, m20, m21, m22, m23, m24, m27, m28, m39, m40, m41 and m47 Event
m29, m54, m55 and m63 Event data transferring message
m42, m43, m44, m45, m46, m50, m51, m52 and m53 Event on message
m60, m61 and m62 Definition transferring message
m64 Work flow definition and information on service definition
m65 Information on work flow definition and service definition
m66 Set of integrated and synthesized work flow definition
m67 All data on event
m68 Service definition and process definition information
m69 Group of message instance
m70 Message instance
m71 and m71' Retrieve request
m72 And m72' List of event data
m73 Integrated and synthesized work flow definition
m74 Set of definition information
m75 List of integrated and synthesized work flow definition
m76 All work flow definitions and service definitions
m77, m78, m79 and m80 Update request
m81, m82, m83 and m84 Management request
m85 Inquiry

What is claimed is:

1. A service provision quality control device whose object is to maintain service providing quality related to description of a whole work flow, or to maintain agreed service level which is contracted per plural users, on the basis of a function to integrate and monitor execution of a distributed component work flow of said whole work flow which maintains and manages and controls activation states of a group of plural job application systems, and definition of operation order, under an environment that a plurality of work flow managing systems, each of which is equipped with a work flow engine, manage and execute each of said component work flows independently and distributedly, which comprises said service provision quality control device, comprising:

a storing unit which stores agreed service level information which is defined as a target state vector value of a control target per description of said whole work flow and which indicates service providing condition of said whole work flow;

a measurement statistic data calculating unit for calculating a measurement statistic which is capable of being measured and calculated with only statistical process and which is related to a component work flow or a service called by said component work flow;

a state observing unit for sampling said measurement statistic in a predetermined sampling period and calculating a current state vector value, which is measurement statistic at the latest sampling time, and a past state vector value which is measurement statistic at a sampling time previous to said latest sampling time by a predetermined period;

a simulation processing unit for predicting a group of state predicting vector values, each of which is composed of a component state vector and which has the same meaning as said target state vector value has, on the basis of said current state vector value and said past state vector value of said measurement statistic through compensating said group of state predicting vector values by extrapolation at a future sampling time;

a policy description managing unit for managing policy description on a control operation;

a judging unit for calculating control deviation after comparing sequentially said state predicting vector value, which is predicted by said simulation processing unit, and said target state vector value, whose control target is said agreed service level, and judging whether a control operation is necessary or not;

an adjusting unit for changing virtually an execution environment, which is described in said whole work flow, within own apparatus in the case that said control operation is required on the basis of said policy description managed by said policy description managing unit, and re-executing said simulation processing unit and said judging unit afterward, and adjusting evaluation condition of said execution environment repeatedly until said control deviation becomes not larger than a predetermined value under the condition that iteration number is not larger than a predetermined number which is corresponding to an upper limit number; and a fixing unit which fixes change of said execution environment in the case that it is not judged that said control operation is necessary any longer on the basis of a result on adjustment of evaluation condition by said adjusting unit; and a specifying unit configured to specify a bottleneck location in consideration of priority on said agreed service level information, a complexity value, and a measurement statistic value, when said target state vector value and sais state predicting vector value are compared each other to calculate control deviation.

2. The service provision quality control device according to claim 1, further comprising:

a collecting and managing unit which collects and manages description of said distributed component work flow; and a work flow synthesizing unit for synthesizing collected description of distributed component work flow, and re-generating description of said whole work flow.

3. The service provision quality control device according to claim 1, wherein:

said simulation processing unit divides an average measurement evaluating period, which is permitted for measuring within said sampling period, into 2p periods p being an integer not smaller than 1, each of which has equivalent time length, and predicts said group of state predicting vector values through executing compensation p times at a future time, and said adjusting unit adjusts evaluation condition of said execution environment p maximum times.

4. The service provision quality control device based on agreed service level according to claim 1, further comprising:

a converting unit which converts said component work flow, which is not described in said standard form, out of said component work flows into a component work flow described in said standard form; and a managing unit which manages description of said component work flow which is described in said predetermined standard form.

5. The service provision quality control device based on agreed service level according to claim 1, further comprising:
a calculating unit which calculates equivalent data which is equivalent to a predicted result by said simulation processing unit, by use of a procedure different from one by said simulation processing unit; a comparing unit which compares a result predicted by said simulation processing unit, and said equivalent data each other, and judging whether it is necessary to compensate at least one of said policy description and compensation condition which is referred to by said simulation processing unit; and
long-term compensation unit for correcting periodically at least one of said policy description and said compensation condition which is referred to by said simulation processing unit.

6. The service provision quality control device based on agreed service level according to claim 1, wherein:
the complexity value specifies complexity in composition of description of plural component work flows composing a whole work flow and complexity in composition of a group of services which is called by said component work flow, and the measurement statistic data value which is capable of being measured and calculated with only statistical process and which is concerned with a component work flow and a service called by said component work flow, when said target state vector value and said state predicting vector value are compared each other to calculate control deviation.

7. The service provision quality control device based on agreed service level according to claim 1, wherein:
said policy description comprises at least one of increasing or decreasing number of work flow engines tentatively, rectifying a process, which is in a bottleneck, through restraining temporarily to input a message to a service execution processing system which is realized by said work flow engine, and discarding said message; and
said service provision quality control apparatus comprises a restraining unit which restrains temporarily to input said message and a discarding unit which discards said message within or adjacently to a plurality of work flow managing systems each of which is equipped with said work flow engine.

8. The service provision quality control device based on agreed service level according to claim 7, wherein:
said policy description comprises enabling to process a calling portion of said component work flow and a called portion of a service calling definition, which is called by said calling portion of said component work flow, dynamically and simultaneously so that said information of agreed service level can become satisfactory as a control target with each of the description of said whole work flow; and
said service provision quality control apparatus comprises a unit to enable to process terminal service calling definitions simultaneously.

\* \* \* \* \*

UNITED STATES PATENT AND TRADEMARK OFFICE
CERTIFICATE OF CORRECTION

PATENT NO. : 8,966,492 B2
APPLICATION NO. : 12/865685
DATED : February 24, 2015
INVENTOR(S) : Shinji Kikuchi, Yoshihiro Kanna and Yohsuke Isozaki It is certified that error appears in the above-identified patent and that said Letters Patent is hereby corrected as shown below:

In the specification

Column 20, Line 40: delete "$^\forall cbp(cbp \in CBPB \subseteq 2^{EBP})$" and insert -- $^\forall cbp(cbp \in CBP \subseteq 2^{EBP})$ --

Column 44, Line 6: delete "$^\forall t(t \in R, t_0 \leq t)^\forall s(s \in S)^\exists \Delta t(\Delta t \in R); k_1 \overline{\gamma(t+\Delta t)} + k_2 \overline{Evs(t+\Delta t)}$"

and insert -- $^\forall t(t \in R, t_0 \leq t)^\forall s(s \in S)^\exists \Delta t(\Delta t \in R); k_1 \overline{\gamma(t+\Delta t)} + k_2 \overline{Evs(t+\Delta t)}$ --

Column 60, Line 60: delete "$\overline{f\mathbb{C}}$" and insert -- $f\mathbb{C}$ --

Column 60, Line 61: delete "$\overline{f\mathbb{C}}\cdot$" and insert -- $f\mathbb{C}\cdot$ --

Column 62, Line 43: delete "M" and insert -- Δt --

Column 80, Line 62: delete "i11" and insert -- i17 --

In the claims

Column 82, Line 41: In Claim 1, before "state" delete "sais" and insert -- said --

Signed and Sealed this
Twenty-seventh Day of October, 2015

Michelle K. Lee
*Director of the United States Patent and Trademark Office*